March 8, 1949.
A. T. CAHILL
2,463,597
ART OR METHOD AND MEANS FOR GENERATING MUSIC ELECTRICALLY
Filed Jan. 9, 1943
16 Sheets-Sheet 6
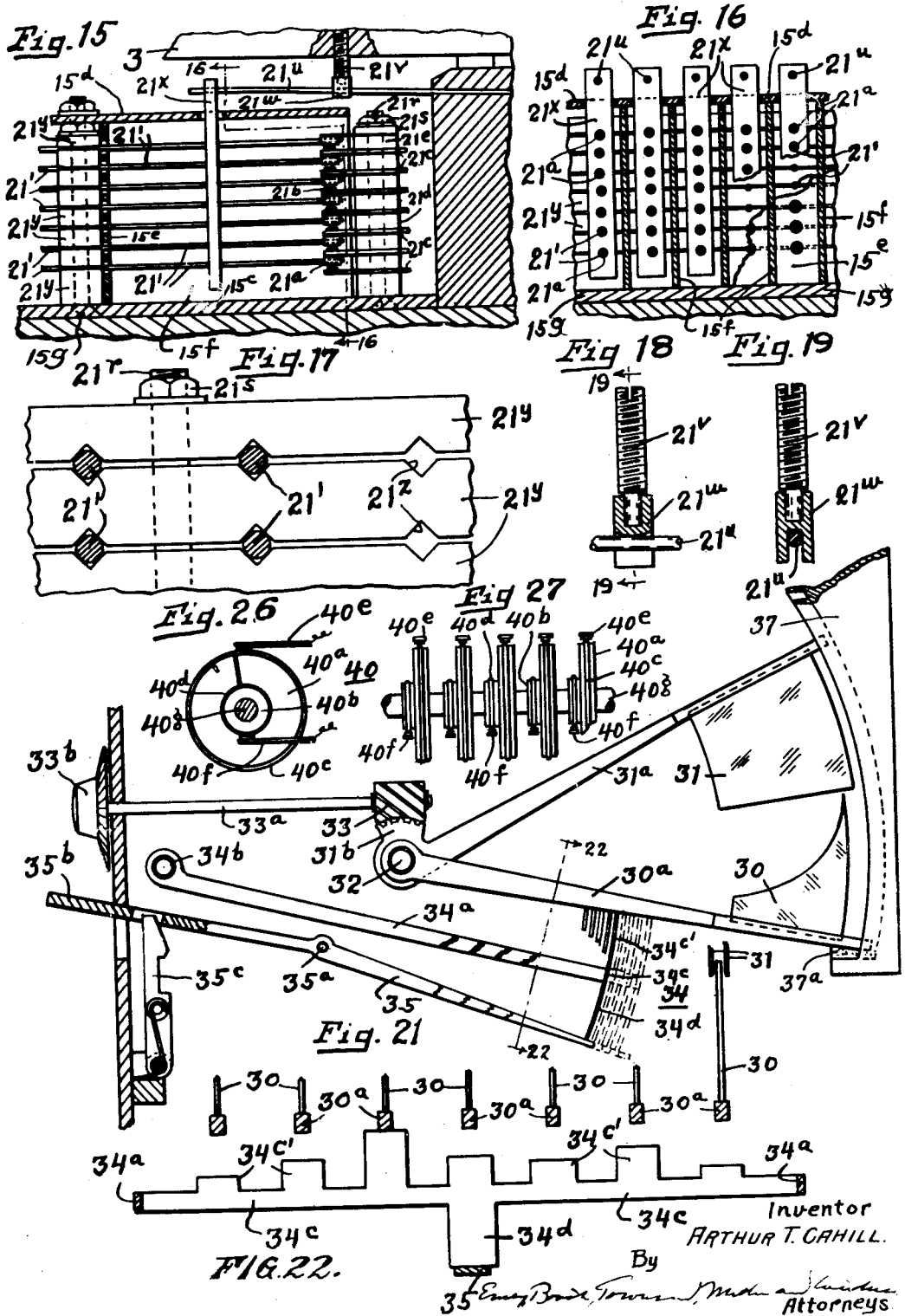
Inventor
ARTHUR T. CAHILL.
By
Attorneys

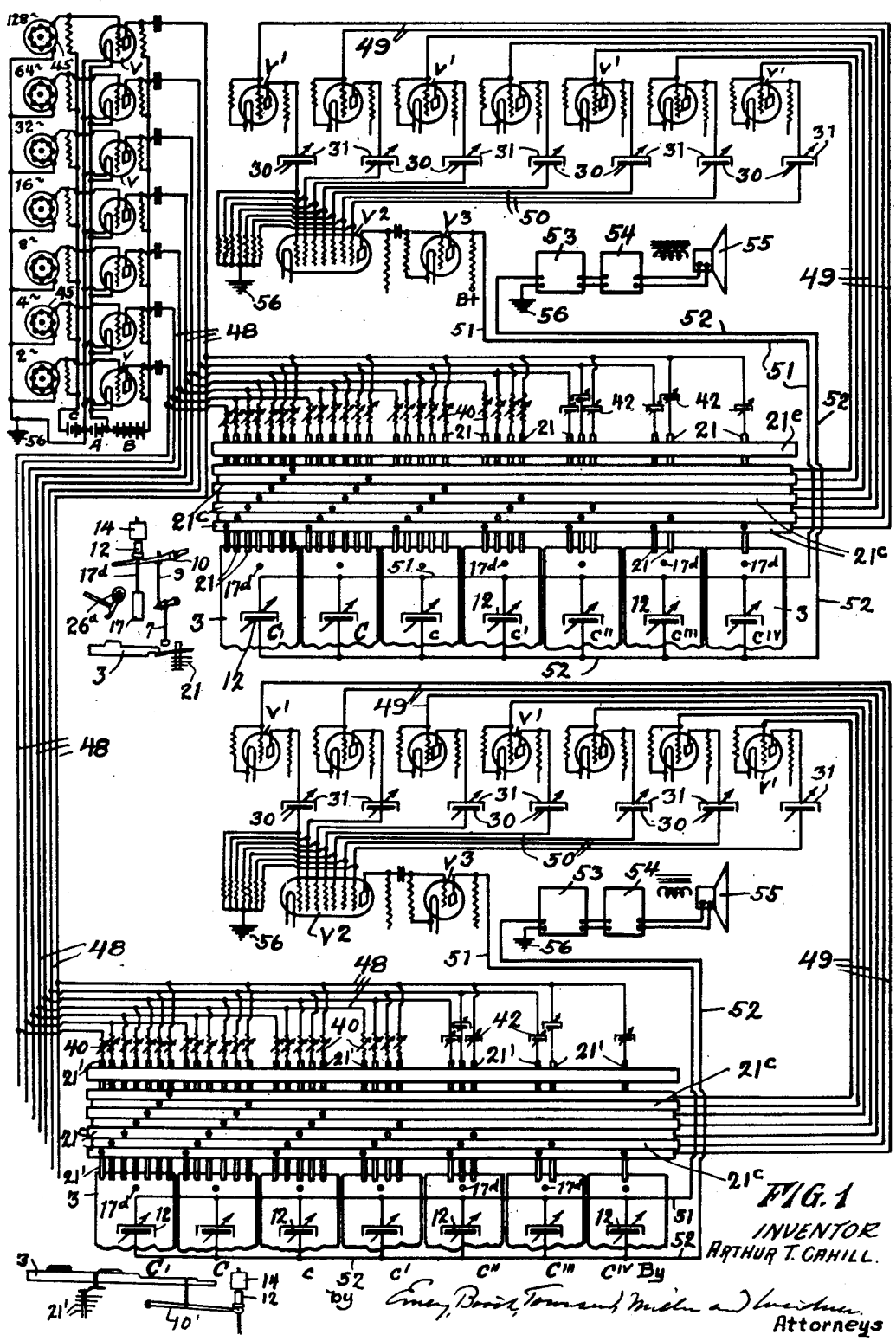

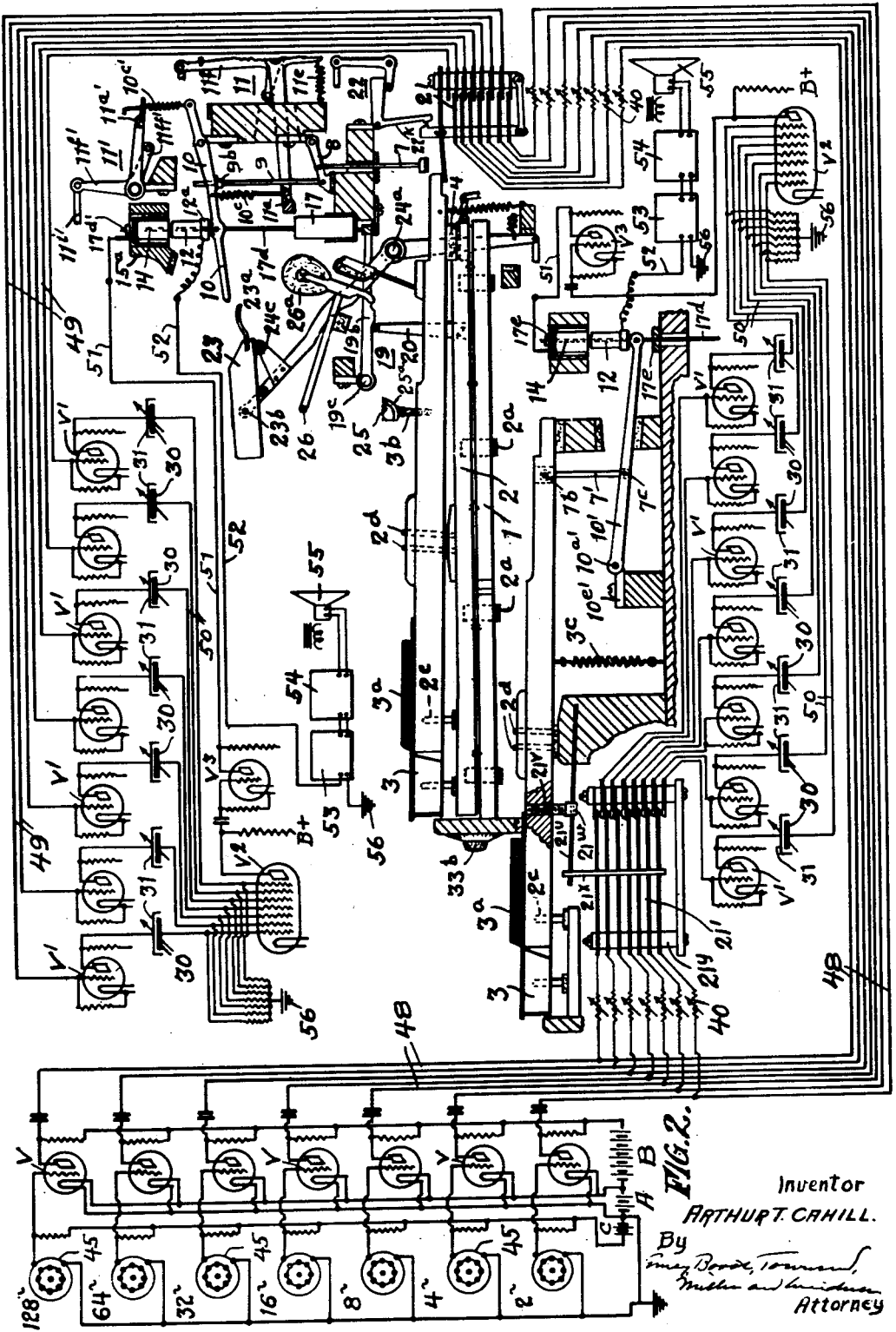

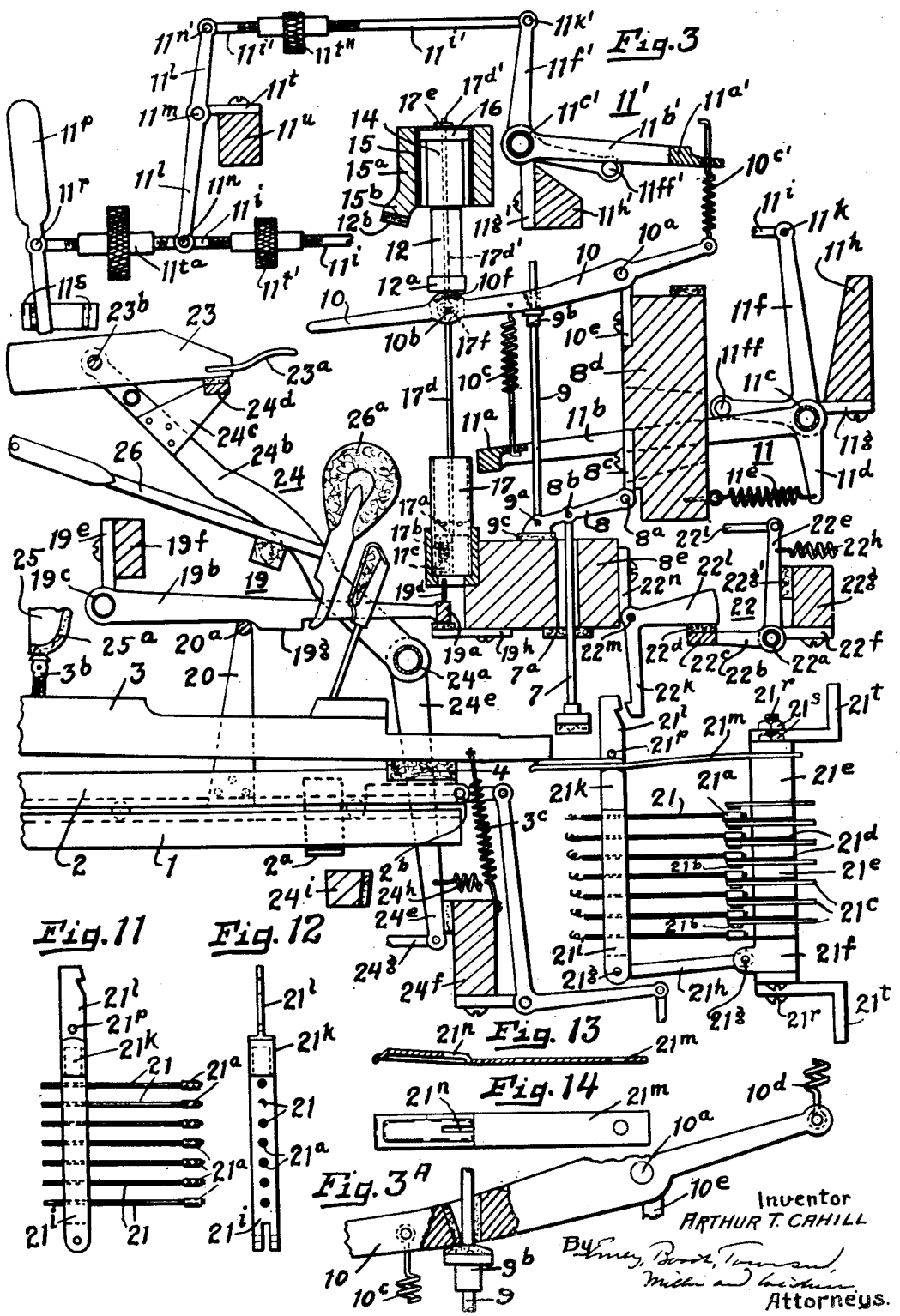

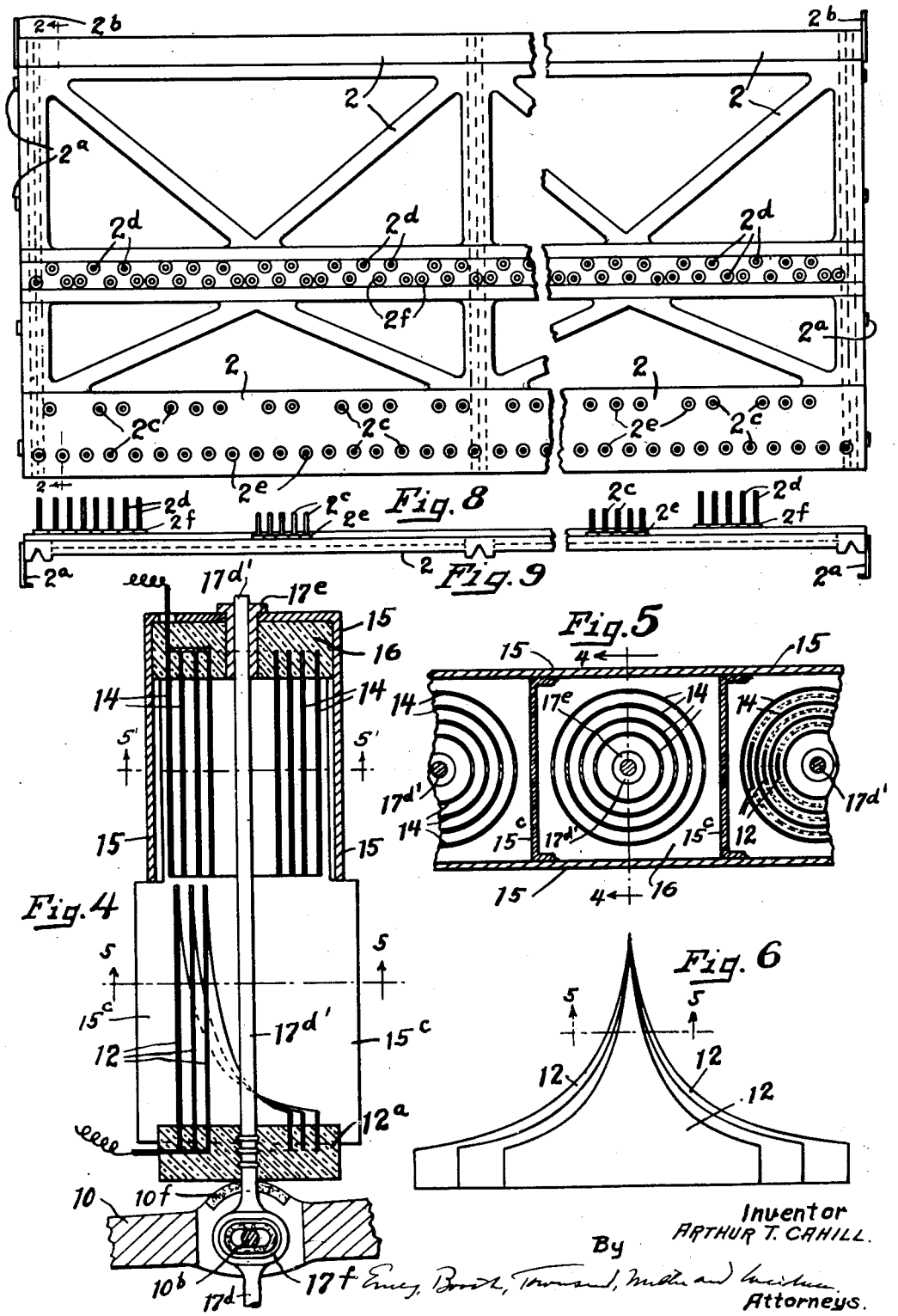

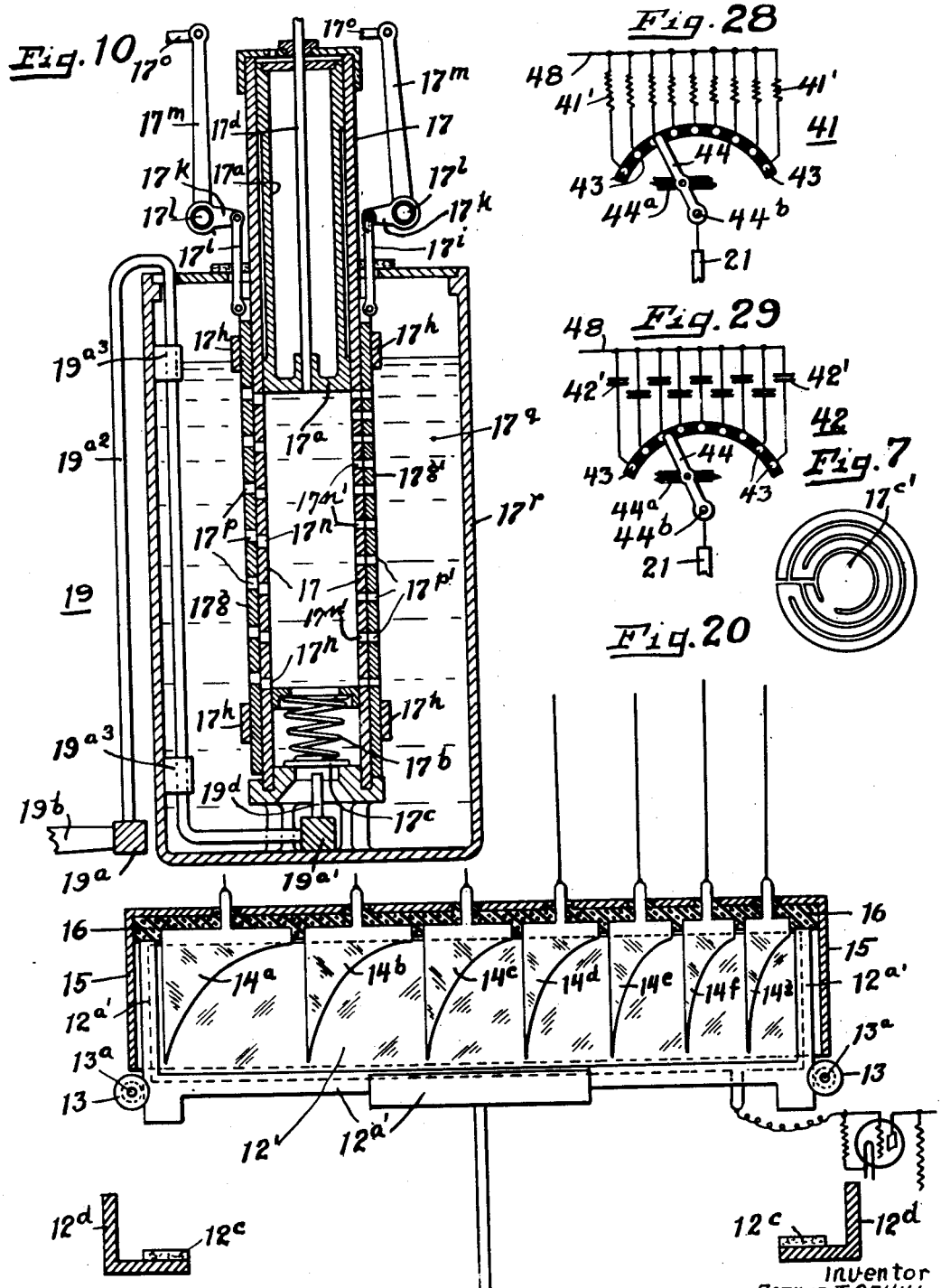

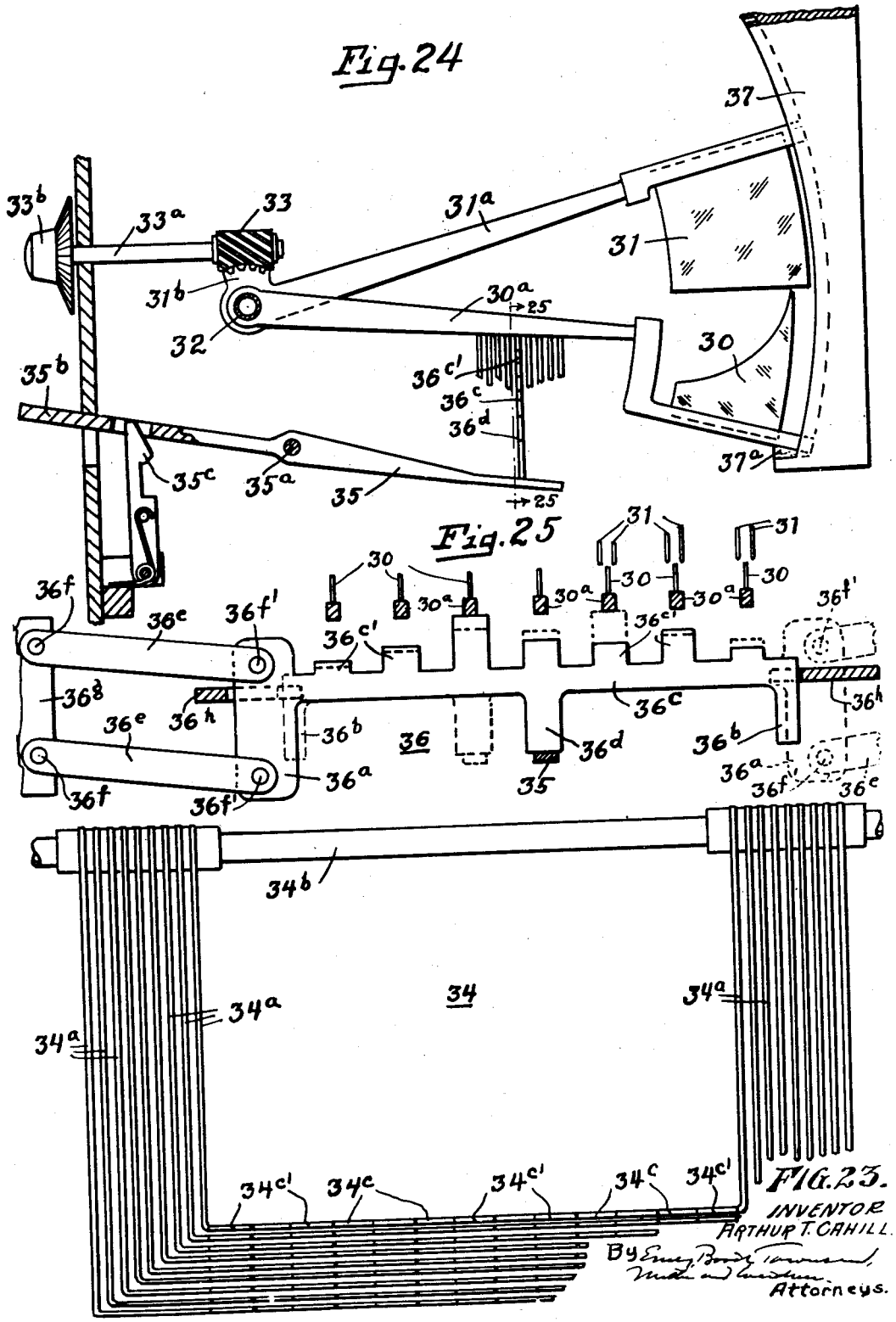

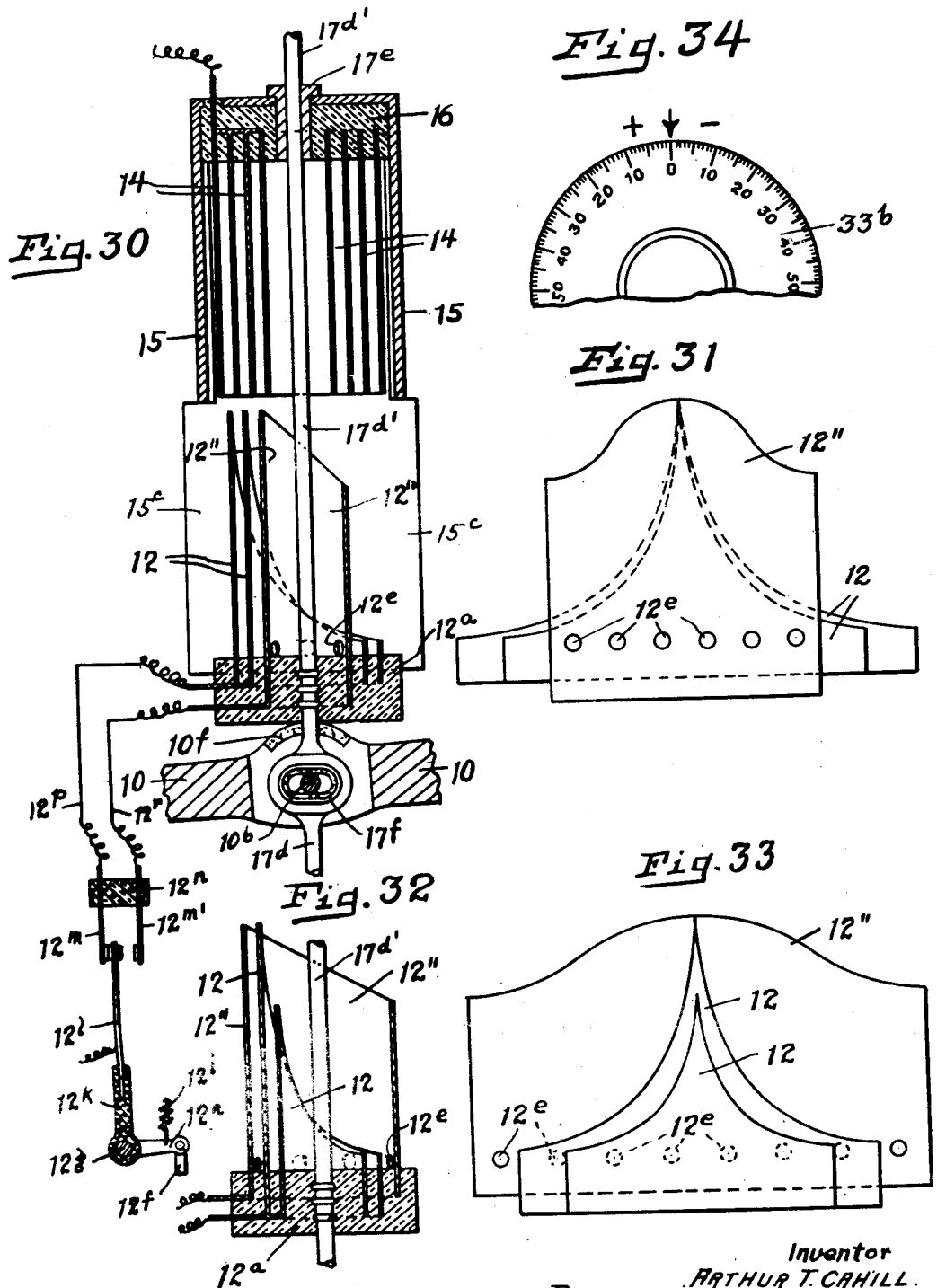

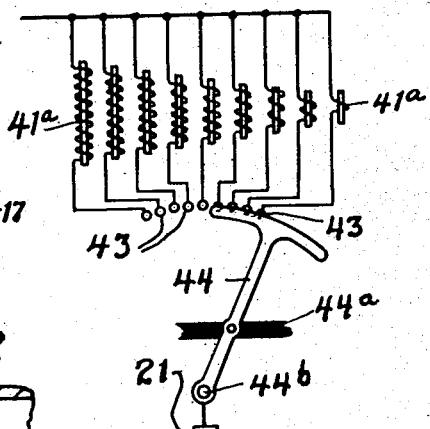
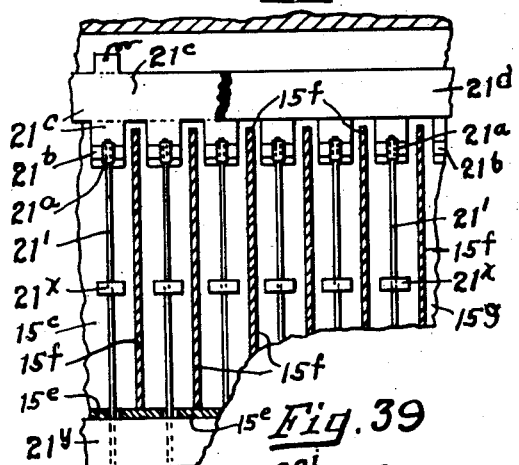
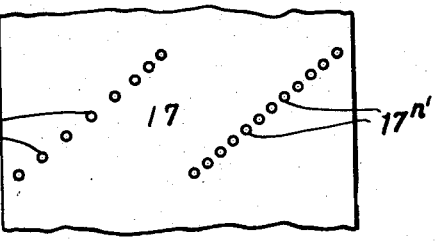
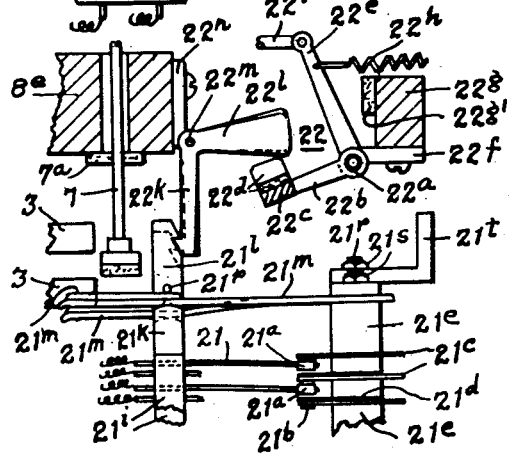
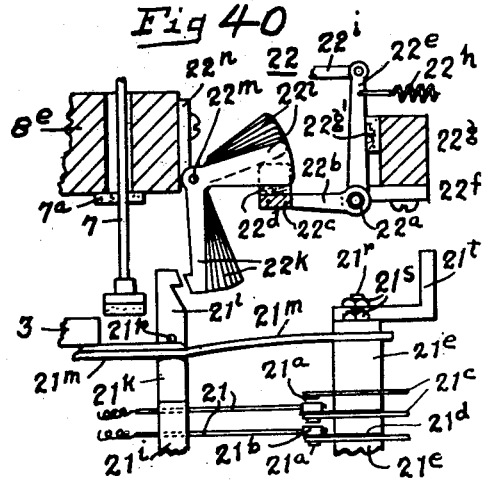

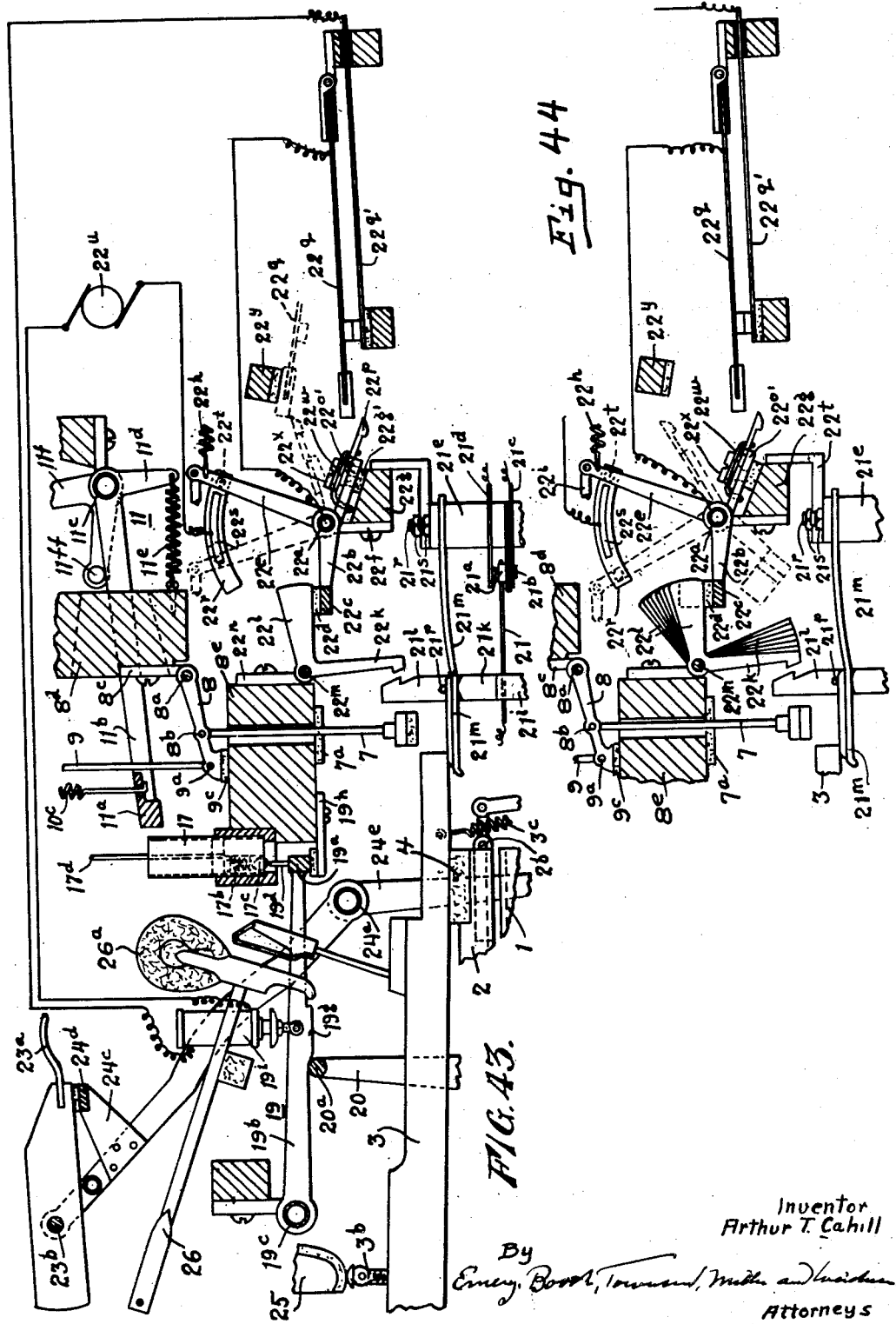

March 8, 1949.　　　　　A. T. CAHILL　　　　　2,463,597
ART OR METHOD AND MEANS FOR GENERATING
MUSIC ELECTRICALLY
Filed Jan. 9, 1943　　　　　　　　　　　16 Sheets-Sheet 12
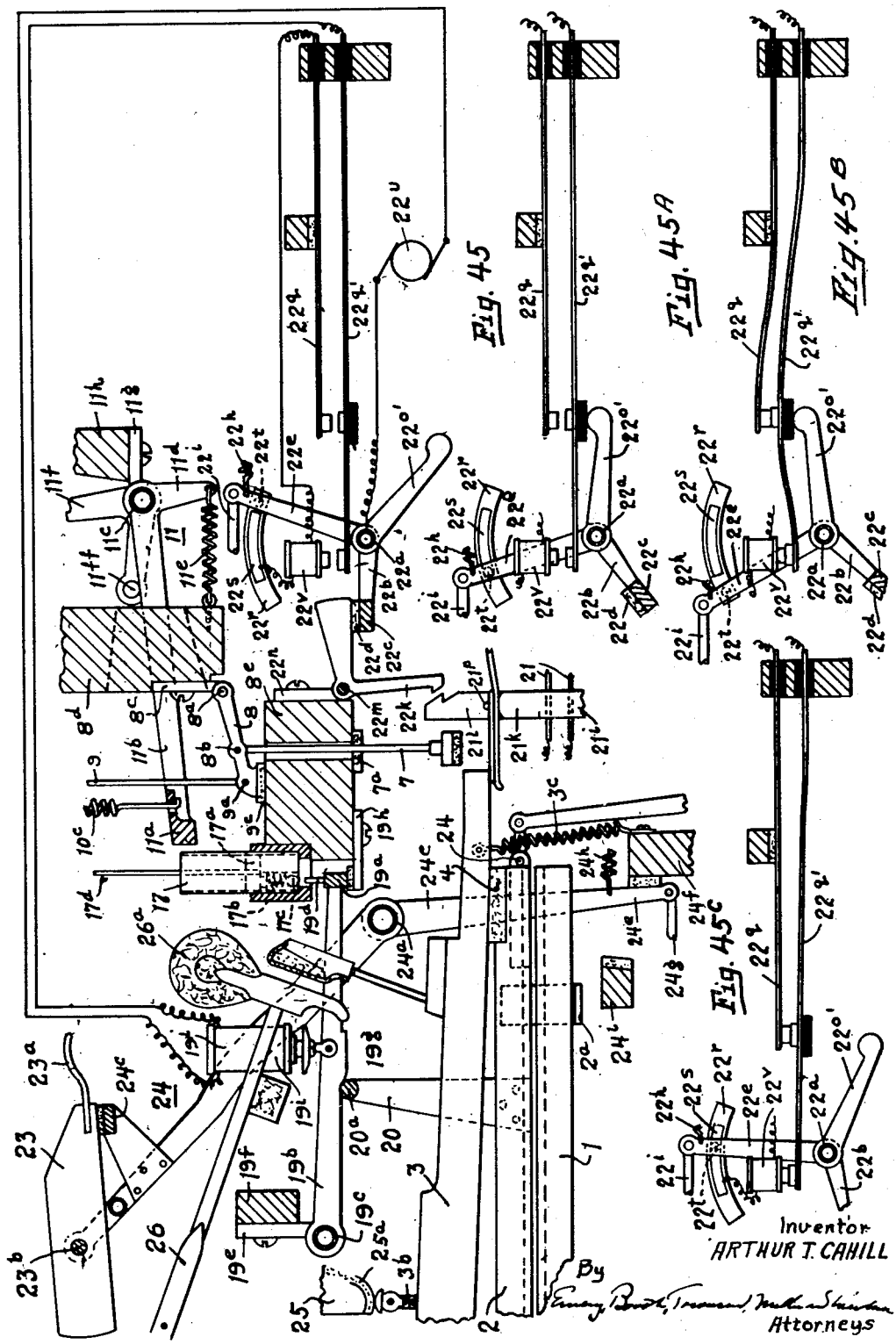
Inventor
ARTHUR T. CAHILL
By
Attorneys March 8, 1949.　　　　　A. T. CAHILL　　　　　2,463,597
ART OR METHOD AND MEANS FOR GENERATING
MUSIC ELECTRICALLY
Filed Jan. 9, 1943　　　　　　　　　　　　16 Sheets-Sheet 13
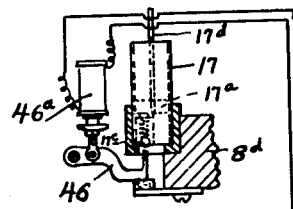
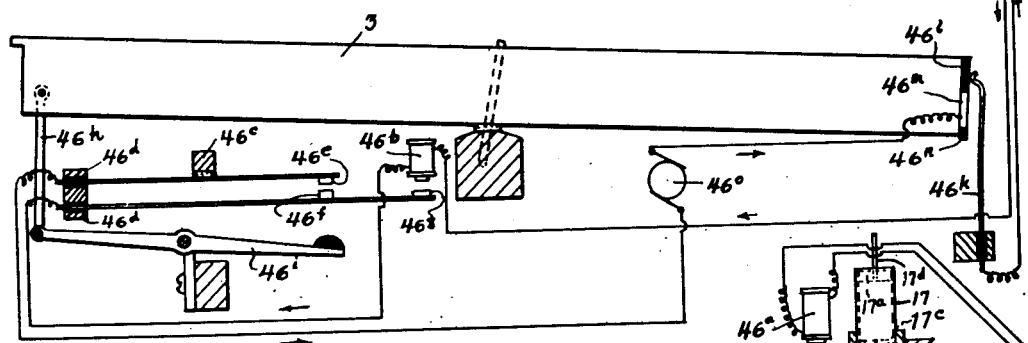
Fig. 46
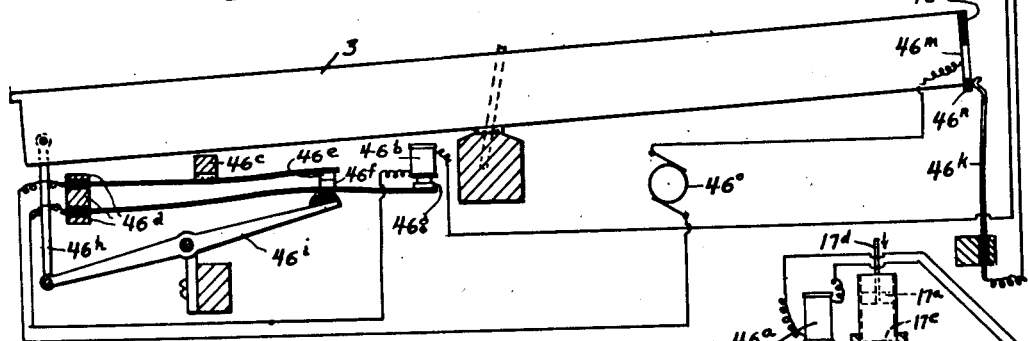
Fig. 46<sup>A</sup>
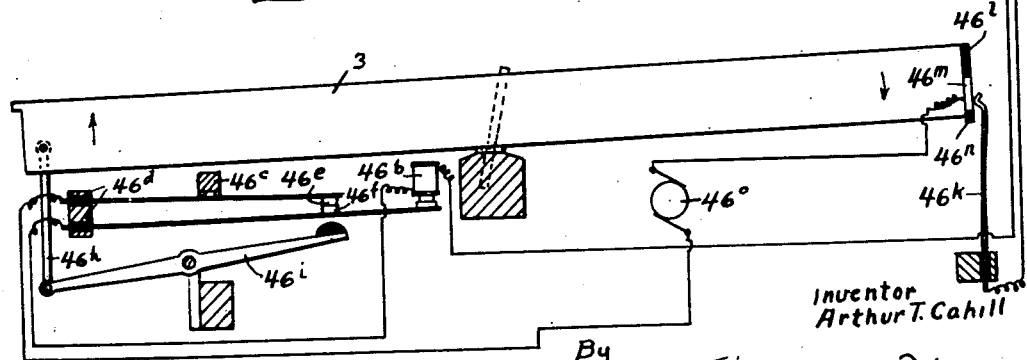
Fig. 46<sup>B</sup>
Inventor
Arthur T. Cahill
By
Emery, Booth, Townsend, Miller and Davidson
Attorneys.

March 8, 1949.　　　　A. T. CAHILL　　　　2,463,597
ART OR METHOD AND MEANS FOR GENERATING
MUSIC ELECTRICALLY
Filed Jan. 9, 1943　　　　16 Sheets-Sheet 14
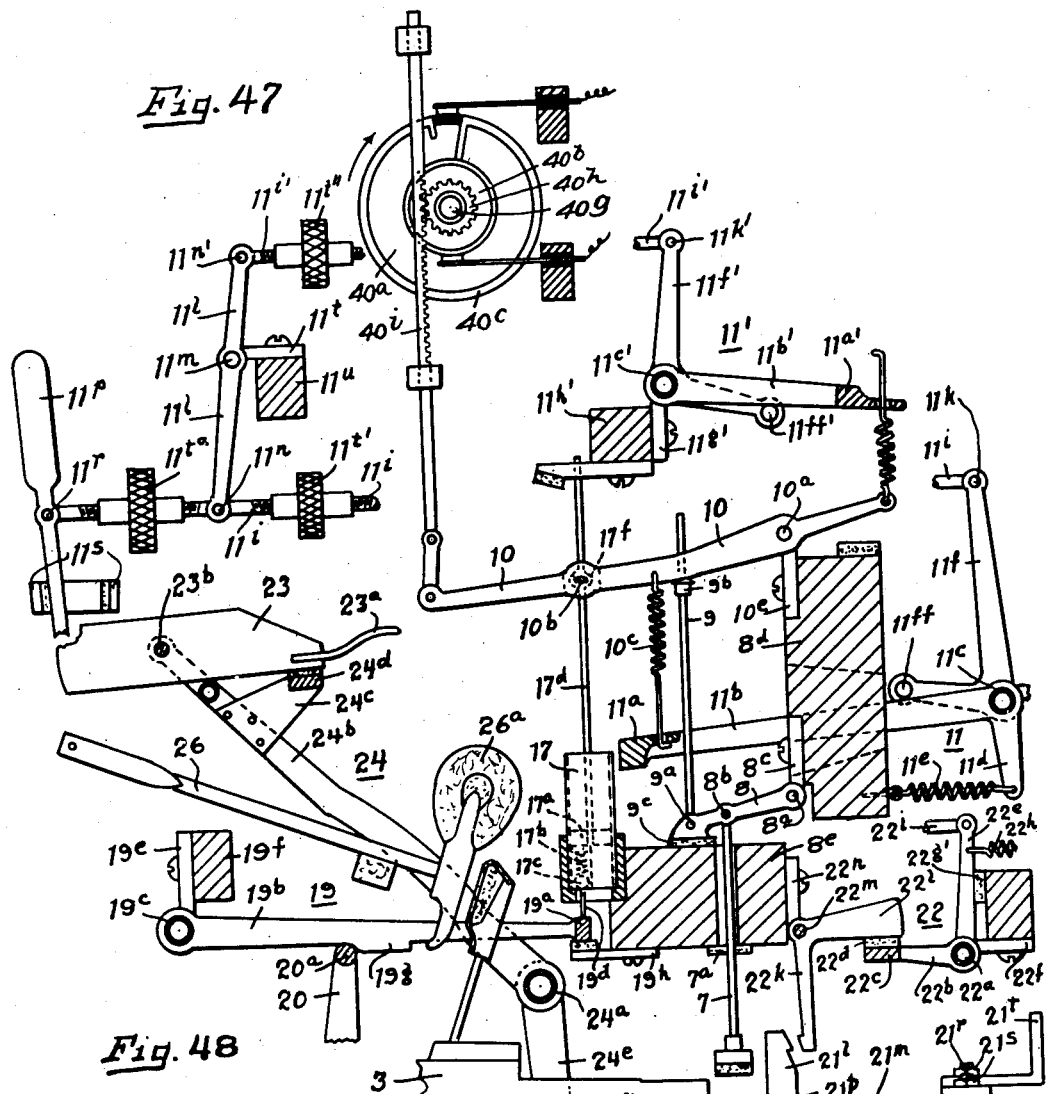
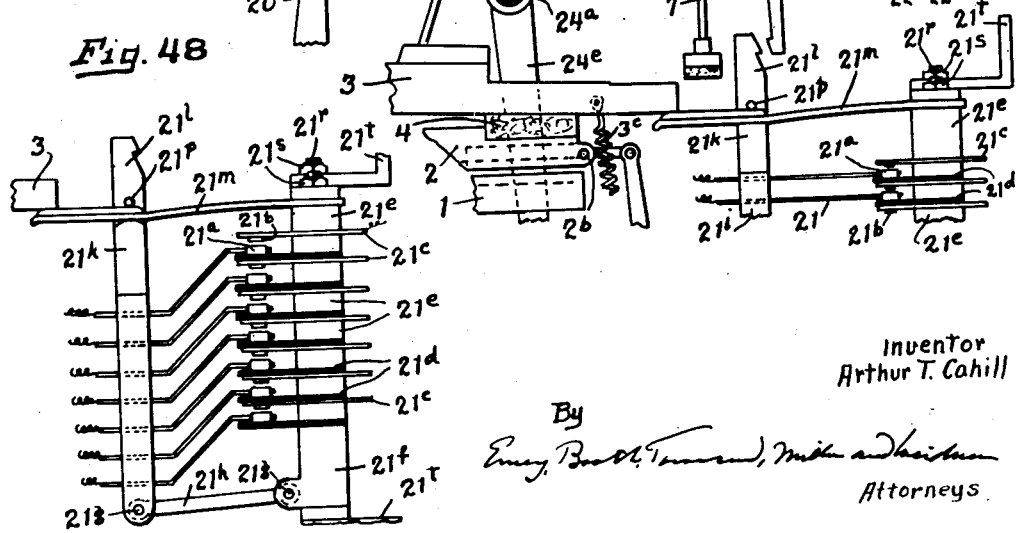
Inventor
Arthur T. Cahill
Attorneys Inventor:
ARTHUR T. CAHILL,
by Emery Booth, Townsend, Miller and Lowther
Attorneys.

March 8, 1949.  A. T. CAHILL  2,463,597
ART OR METHOD AND MEANS FOR GENERATING
MUSIC ELECTRICALLY
Filed Jan. 9, 1943  16 Sheets-Sheet 16

Inventor:
ARTHUR T. CAHILL
Attorneys

Patented Mar. 8, 1949

2,463,597

UNITED STATES PATENT OFFICE 2,463,597

ART OR METHOD AND MEANS FOR GENERATING MUSIC ELECTRICALLY

Arthur T. Cahill, Weehawken, N. J.

Application January 9, 1943, Serial No. 471,845

28 Claims. (Cl. 84—1.01)

This invention relates to improvements in the art or method of and means for generating music by electrical waves, blending them and controlling them with a delicacy and finish heretofore unknown, and then translating them into audible music, of which the following is a specification.

The objects of my present inventions are to create a more perfect and highly artistic musical instrument than any that is now on the market, whose results will be much more artistic even than the results which can be produced by the mechanism shown in my Patent No. 2,308,051, January 12, 1943.

This application is similar in many respects to my patent above referred to, but it embodies numerous new mechanisms and principles of operation, and thereby it can create many highly important artistic musical results which the apparatus illustrated and described in my previous application could not produce.

In order to make a disclosure so full that anyone skilled in the art can build an instrument from the same, I will now state at some length the objects of my inventions, and the chain of mechanisms I use to produce my results. Certain fundamental or underlying features pertaining to my invention, but over which my invention constitutes improvements herein set forth, are disclosed in the following patents to Dr. Thaddeus Cahill: No. 580,035, dated Apr. 6, 1897; No. 1,107,261, dated Aug. 18, 1914; No. 1,213,803, dated Jan. 23, 1917; No. 1,213,804, dated Jan. 23, 1917, and No. 1,295,691, dated Feb. 25, 1919.

It is the primary object of my inventions to provide an electrical musical instrument upon which any desired musical composition may be played with the finest musical finish, whether that composition was written for the piano, or the organ, or the instruments of the orchestra, or the orchestra itself, or a piano concerto. It is a further object of my inventions to give to the musicians power easily to create many new and meritorious musical effects never produced in the world before on any instrument. My instrument is capable of playing with the artistic finish of the piano, and has many new and very important powers of expression no piano has ever had. It can produce regular organ music, and also many new and very beautiful musical effects no pipe organ has ever produced. It also has much more artistic finish than even the bowed instruments, brasses, woodwinds, and percussion instruments of the orchestra; and with several manuals, and several musicians playing at the same time, can produce full orchestral effects of the highest quality, as well as great piano concertos.

Incidental to these broad objects of my inventions are numerous other objects, the attainment of which contributes materially to the achievement of the primary object. These objects and the results obtained appear more fully in the accompanying specification, and, briefly stated, include among other things the following:

I initiate electrical waves of the frequencies necessary to produce the musical scale, preferably by alternators as 45, 45, though any other method of producing electrical musical waves satisfactorily, may be used.

I provide means which prevent all back leaks or interactions through other generators, or sources of current as more and more tones are sounded, and so completely remove all of the very injurious voltage drops which these leaks cause, by having a source of vibrations, as a generator, etc., feed the grid of a vacuum tube, as a perfect one-way electrical valve. I thus compel all of my voltage to go forward productively, and without any loss or robbing of the tones whatever.

I also prevent, by the means mentioned above, all the voltage drop which results from drawing at one instant only one very soft tone, and the next instant many different very loud tones on different manuals, both as ground tones and as harmonics; each one of which is drawing, from the same source, thousands of times as much electrical energy as the soft tone, first mentioned above with the result of perfect addition.

I use a switch board of the type disclosed in the said Thaddeus Cahill patents, but modified slightly for shielding purposes, and also to prevent their being affected by accumulation of dust.

I completely eliminate all diaphragm crack or key thump, from any cause or of any kind whatever, by, feeding through each switch at the switchboards only the infinitesimal amount of voltage necessary to swing the grid of a small vacuum tube, possibly only one microvolt. I have thus removed and at trifling expense, the greatest curses of previous electrical musical instruments, robbing and diaphragm crack.

I provide means, aside from the above, for introducing my tones as softly as can be heard, and for swelling them up to maximum power with perfect smoothness and beauty.

I also provide means, aside from the above, for decreasing tones from maximum power to nothing, with perfect smoothness and beauty and without any diaphragm crack in either case.

Since the generator grid circuit is always closed, and since under these circumstances no grid leak is necessary, there cannot possibly be any voltage drop in the generator grid circuit, no matter how many tones are sounding.

I provide means which, even if I were using current instead of voltage, would make it impossible for me to have any shocks to the circuits, any transients, or any resulting diaphragm cracks of even the most microscopic amount, when my circuits are made and tones are taken.

I also provide means which, even if I were using current instead of voltage, would make it impossible for me to have any shocks to the circuits, any transients, or any resulting diaphragm cracks when my switches open, and cut off what if anything is left of the tones.

I provide means for automatically opening the inlet valve of a tone-controlling cylinder just as soon as its key starts upward, so that the movable plates will snap out of the condenser very rapidly and the tone sounding will drop or decay almost instantly, but very smoothly, and therefore only a minimum of current, if indeed any at all, will be flowing when the switchboard switches open.

I provide means which insure that my loud pedal when released shall not break all the tones at the same instant, but successively and very rapidly. I thus prevent any microscopic diaphragm disturbances I may possibly have from all combining into one. I thus make them occur successively, in which case all of them, but the last one, will be masked by the other tones that are still sounding.

I provide means for automatically opening the inlet valves of all my tone-controlling cylinders, just as soon as the loud pedal starts upward, so that the movable plates will snap out of the condensers very rapidly, and all tones sounding will drop or decay almost instantly, but very smoothly; therefore only a minimum of current, if indeed any at all, will be flowing when the switchboard switches open.

By the use of one or as many as may be necessary of the principles and mechanisms mentioned in column 2, lines 15 to 25 and 35 to 55, column 3, lines 5 to 45, above, I have forever removed every slightest trace of any diaphragm crack.

By inserting vacuum tubes in the lines feeding my harmonic controls, I accomplish two very important things. First, I raise the voltage high enough so that condensers of reasonable size can be used in my harmonic controls, and second, since the tubes are perfect one-way valves I absolutely prevent any interactions between the combining bus bars of the switchboard which would otherwise take place, with their resultant muddying and weakening of the music.

I provide means by which any set of harmonies, or all my sets of harmonies, can be introduced easily and quickly to a fraction of a per cent of the desired amount. This makes perfect tone building possible, and easy.

I provide means by which any one of a large number of beautiful tone qualities may be obtained instantly merely by touching a tablet.

I provide means by which any preset combination of tone may be changed almost instantly into a wide variety of beautiful tones.

I provide means for introducing all of my tones without any diaphragm crack whatever.

I also provide means for terminating my tones without any diaphragm crack whatever.

I provide means for introducing my tones with widely different forms of attack.

I provide means for carrying my different types of movable condenser plates in the same carrier.

I provide means for producing the delicately responsive individual tone touch control of the piano.

I provide means for simulating the drop or decay of the tones of the piano.

I provide means for making the tones drop very much faster than do the tones of the piano.

I provide means for holding the tones very much longer than the piano can.

I also provide means for easily altering the envelopes of the waves which create the tones, and therefore their types of endings.

I provide means by which the lengths of the lives of the tones decrease as they go up the scale, just as they do on the piano, and, I also provide means by which the higher tones can be maintained if desired as long as the low tones, which the piano cannot do.

I provide means by which with twelve generators and seventy-two tubes and tuned circuits, I can produce a very simple, cheap and artistic musical instrument whose tuning will be and always remain perfect.

I provide means by which a single movement of the hand conditions my instrument to play like a piano or to play like the instruments of the orchestra, or the orchestra itself, or my pipe organ which has vastly greater powers than any pipe organ.

I provide means by which piano music can be played with all the delicacy and beauty of the piano.

I provide means by which piano music can be played with all the delicacy and beauty of the piano, and with many new and beautiful kinds of expression and variations.

I provide means by which most if not all the instruments of the orchestra, and the full orchestra itself, can be played as well, and in most cases better, than the original instruments, and the technique to be mastered is but a small fraction of that required to play the original instruments.

I provide means by which a great piano concerto with orchestral accompaniment may be played with fine artistic finish.

I provide means, while still preserving the delicate individual tone touch control of the piano, for reversing the attack, therefore the tones will start very softly and gently and gradually grow to a maximum, and then decline like piano tones. This is an entirely new result.

I provide means by which my una corda, or soft pedal, cuts the tone down through a thousand imperceptible shadings, instead of by just one step.

I provide means by which my sustaining or loud pedal sustains all tones sounded while it is depressed, and cuts them off cleanly and without diaphragm crack when it is released.

I provide means to preserve the exact relationship between the vigor of the touch on the keys, and the power of the tones which a good grand piano has.

I provide means by a sympathetic pressure touch to preserve the exact relationship between the vigor of the touch on the keys and the power of the tones possessed by the bowed instruments, woodwinds, brasses, and percussion instruments of the orchestra.

I also provide means which make it easier to produce loud musical results on my instrument than it is on the piano, or the instruments of the orchestra.

I provide means, while still preserving the relationship between the vigor of the touch on the keys and the power of the sounds to enable the musician to get loud sounds with less effort than on the piano with the result that a woman with weak hands and a musical soul can create as great results as a man with powerful forearms and hands.

I provide means by which an organist can play on my instrument the first time he sits down to it. In addition to organ tones he will also have a wealth of beautiful tones which no organ has ever had before, gut string tones, steel string tones, woodwind and brass tones, etc., etc. He will also have almost limitless powers of expression which no organ and no other instrument of any kind whatever has ever had before, and with a very little practice he will be making music of a kind which no organist has ever made before.

I shield all necessary parts of my instrument, whether sources of vibrations, or carriers of vibrations, or controllers of vibrations, or combiners of vibrations, or breakers of the electrical circuits, etc., etc., from interfering vibrations, whether from their neighbors, or from outside sources, according to the best modern practice.

Further objects will appear from the following description, reference being had to the accompanying drawings.

In the drawings illustrating the selected embodiment of the mechanism of the invention:

Fig. 1 is a wiring diagram of one form of my electrical musical instrument;

Fig. 2 is an elevation, partly in section, of most of the working parts of my instrument, showing diagrammatically the electrical working parts and the connections to them;

Fig. 3 is a side elevation, partly in section, on a larger scale than that of Fig. 2, and shows more clearly the rear ends of the keys of the upper keyboard, with the mechanisms related thereto;

Fig. 3A is a side elevation partly in cross section of the part of the fly levers where push pieces pass through them, and it also shows means for imparting motion to the variable condenser plates, etc.;

Fig. 4 is a side elevation mostly in cross section of the variable condensers, and is taken on a part of the line 4—4 of Fig. 5 on an enlarged scale, and also shows shielding between the condensers;

Fig. 5 is a horizontal section taken on the line 5—5 of Fig. 4, looking upward from below, and in the right hand portion the upper parts of the movable condenser plates are shown as entered into the condenser;

Fig. 6 is a side elevation of three of the stampings for the movable condenser plates before being bent into tubular form;

Fig. 7 is a top view of a ribbon valve, so designed that a very slight suction will uncover a large port;

Fig. 8 is a top view of the movable metal keyboard frame;

Fig. 9 is a front elevation of Fig. 8;

Fig. 10 is a side elevation, mostly in section, on an enlarged scale, representing tone-controlling cylinders with their exhaust ports, exhaust port controlling slides, and main valve opening mechanism working in oil or other fluid contained in a trough;

Fig. 11 is a side elevation of a movable contact spring carrying bar showing contact springs for the upper keyboard in place, etc.;

Fig. 12 is a rear view of the same;

Fig. 13 is a section of one of the upper switchboard operating springs;

Fig. 14 is a top view of same;

Fig. 15 is a side elevation, partly in section of the switchboard mechanism, for the lower keyboard showing shielding, and also shows my method of shielding the switchboards;

Fig. 16 is a rear elevation taken on the line 16—16 of Fig. 15, partly in section of a part of the switchboard spring-clamping mechanism, and also of some of the spring actuators, also illustrating my shielding between tones;

Fig. 17 is an elevation partly in section, and is an enlarged view of a part of the switchboard spring-clamping mechanism;

Fig. 18 is a detail partly in elevation, and partly in section, of the tension adjusting screw and its slotted ferrule, which actuates a lower switchboard operating spring;

Fig. 19 is a section of the same on the line 19—19 of Fig. 18;

Fig. 20 is an elevation partly in section of one of the multiple plate harmonic voicing, combining and controlling condensers;

Figure 41:
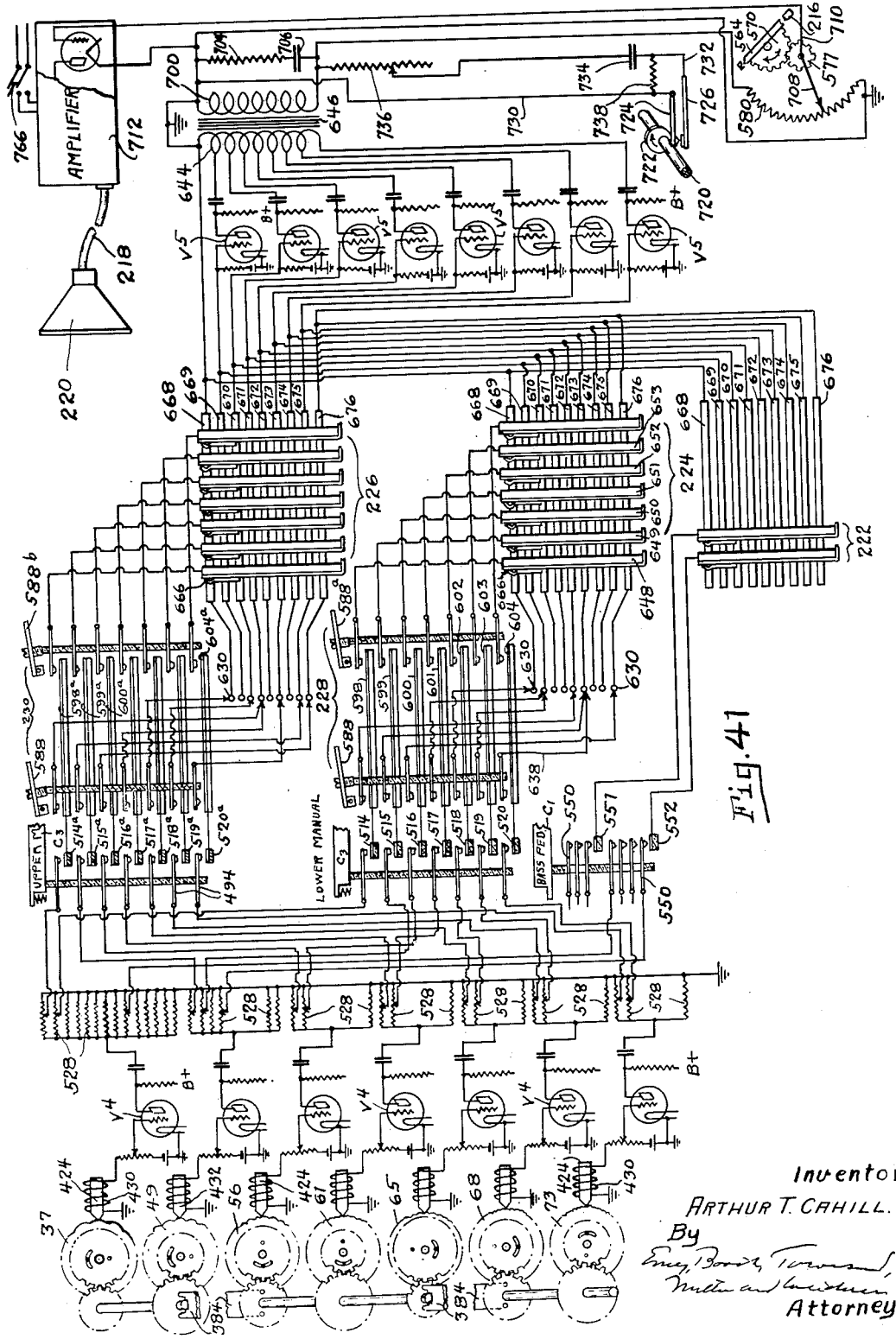
Figure 35:
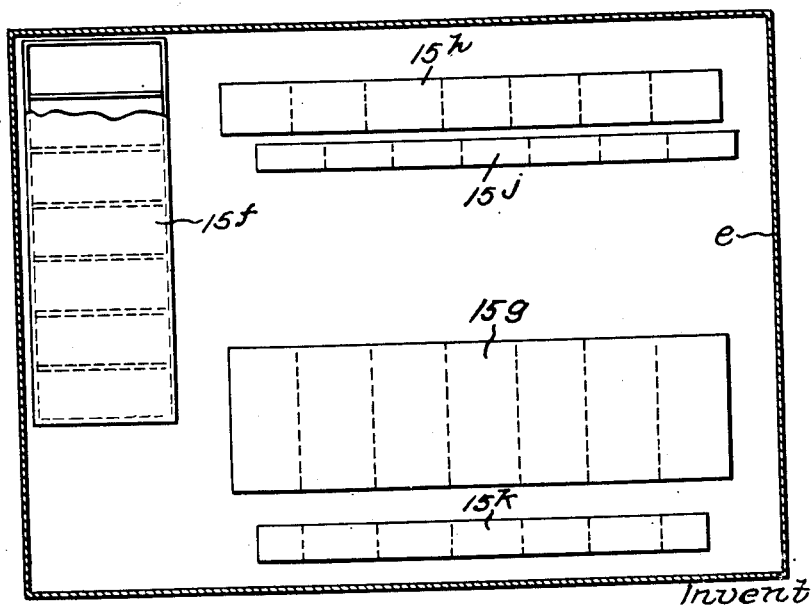

Figs. 21, 22, 23, 24 and 25 together illustrate two forms of mechanism for pre-setting different qualities of tone, and also means for changing any one of these qualities almost instantly, and therein Fig. 21 is a side elevation partly in section of one of the double acting harmonic controls in which both plates are movable;

Fig. 22 is an elevation partly in section on the line 22—22 of Fig. 21, of one of the stepped U-shaped movable harmonic-controlling frames;

Fig. 23 is a top view of the stepped U-shaped harmonic controlling frames;

Figs. 24 and 25 are modified or alternative constructions for accomplishing the same results as the mechanism illustrated in Figs. 21, 22 and 23, Fig. 24 being a side elevation partly in section illustrating means for controlling both the movable receiving plate and the quasi-stationary transferring plate or plates, and Fig. 25 being a side elevation partly in section, on the line 25—25 of Fig. 24, illustrating means for controlling the movements of the stepped harmonic-controlling strips;

Fig. 26 is an end elevation, and Fig. 27 is a side elevation of a part of a gang of revolving, smoothly acting, variable resistances, mounted on a common shaft;

Fig. 28 is a diagrammatic view of means for changing the power of each harmonic series through various steps for tone building purposes;

Fig. 29 is a similar diagrammatic view representing fixed condensers, whose capacities vary, instead of resistances;

Fig. 30 is an elevation, mostly in vertical cross section, similar in general to Fig. 4, but of a modified or alternative construction so far as the movable plates are concerned, and also illustrates my method for instantly shifting the current into either set of movable plates 12, 12 or 12″, 12″;

Fig. 31 is an elevation of the types of movable condenser plates in Fig. 30, before they have been formed into tubes, the same being intended for producing tones with different forms of attack;

Fig. 32 is an elevation mostly in vertical cross section of a modification in which one of the violin producing plates is much smaller and shorter than the other, serving to introduce the tone more gradually and smoothly, while the outside plate 12'' brings the tone on suddenly;

Fig. 33 is a view largely similar to Fig. 31;

Fig. 34 is an elevation of a dial, the lower part of which is broken away, it being numbered both ways from zero, one way being plus and the other way being minus;

Fig. 35 is a diagrammatic view, partly in section, showing a main shield covering all the live parts of the instrument, and a succession of sub-shields covering the other parts, or groups of parts, inside the main shield, which might interfere with each other;

Fig. 36 is a diagrammatic view somewhat similar to Figs. 28 and 29, but of an inductive harmonic control, or a voicing and harmonic control mechanism being connected in parallel;

Fig. 37 is a side elevation, on a larger scale, mostly in section, of one of my tone-controlling cylinders working in oil, the ports being disposed spirally, so as to shorten the cylinder as much as possible;

Fig. 38 is a side elevation of one of such cylinders which has been cut in two and straightened out, showing rows of exhaust ports, each with a different number, and differing spacing of ports;

Fig. 39 is a side elevation partly in section, it being a detail which shows that the front bar of the frame is not horizontal, but is at an angle to the horizontal;

Fig. 40 is a similar view, but showing a number of the bell crank latches in the positions they assume when the pedal is in its normal position, due to the fact that the front bar of the frame is at an angle to the horizontal;

Fig. 41 is a diagrammatic wiring drawing corresponding to Figs. 27 and 27a of Patent No. 1,956,350, dated April 24, 1934 to Laurens Hammond, consolidated onto one sheet, but showing vacuum tubes placed between the generators and the bus bars which feed the voicing resistances, and also showing tubes inserted between the conducting bars and the steps of the primary of the transformer;

Fig. 42 is a top view partly in section of a part of my lower switchboard, showing the notches cut into the bus bars and the insulation to allow the shielding partitions between each tone to pass well beyond the contact points;

Fig. 43 is an elevation partly in section in general, similar to the lower rear part of Fig. 3, and showing a detail of construction by which the inlet valves are all opened electrically and held open while the loud pedal is rising, thus permitting the movable plates to drop out of the condensers practically instantly, so eliminating diaphragm crack;

Fig. 44 is an elevation partly in section, and is a detail similar in general to Fig. 40. Like Fig. 43, it illustrates the electrical mechanism for opening the inlet valves as soon as the loud pedal starts upward, and also illustrates my method of opening the switches successively and rapidly.

Figs. 45, 45A, 45B and 45C are all elevations partly in section, and illustrate a variation of Fig. 43. There are two breaks and two magnets in series in the circuit, one a working magnet and one a holding magnet for maintaining contact while the loud pedal is rising.

Fig. 45 shows the parts in their normal positions when the loud pedal is up;

Fig. 45A shows the position of the parts when the pedal is nearing the bottom;

Fig. 45B shows the position of the parts when the pedal has reached the bottom and the contact springs are compressed;

Fig. 45C shows the position of the parts with the magnet still maintaining contact when the pedal has nearly reached the top. Just before the pedal reaches the top the contacts $22s$ and $22t$ will be broken and the parts will return to their normal positions.

Figs. 46, 46A and 46B are elevations partly in section, and illustrate a somewhat similar circuit arrangement. The circuit contains in series two breaks and two magnets, one a working magnet for opening the inlet valve $17c$ of a ton-controlling cylinder, and the other a holding magnet for holding the circuit closed while the key is rising. There is one such mechanism for every key.

In Fig. 46 I have shown the parts in their normal positions, both circuit breaks being open.

In Fig. 46A the parts are shown with the key depressed to the bottom, and in this position the contacts under the front of the key are closed but those at the rear of the key are open.

Fig. 46B shows the key part-way up when all contacts are closed and the working magnet has opened the main inlet valve of the tone controlling cylinder which lets the movable plates drop out of the condenser instantly. The holding magnet is holding its contacts closed and will continue to do so until the key has returned almost to the top and broken the rear circuit.

Fig. 47 is an elevation partly in section. It illustrates an alternative method, a resistance for controlling the tone, which may be used instead of my variable condenser.

Fig. 48 is an elevation of a modified form of my switchboard.

Figure 49:
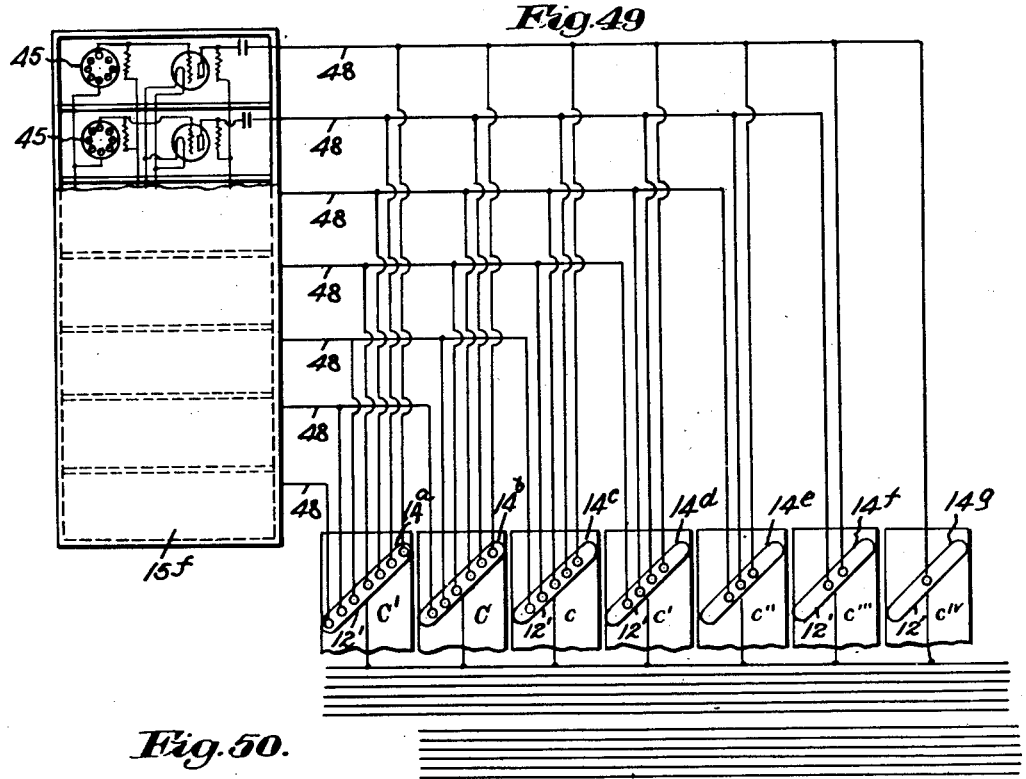

Fig. 49 is a wiring diagram of a very cheap, simple and meritorious form of instrument. It omits all voicing coils, all switchboards, all the tubes V', V', and all the harmonic controls 30 and 31, 30 and 31. The appropriate harmonic wires are led to the proper plates of my multi-plate condenser where they are both voiced as individual tones in a harmonic set, and also the power of the set controlled at the same time. They are all then combined without loss on interactions on the common pick-up whose movements at all times control perfectly the power and expression of the tone. The wires from the pick-up plates of all the octaves of a tone are then combined on a common conductor, and are then combined again in any appropriate way and led to the amplifier and loud speaker.

Figure 50:
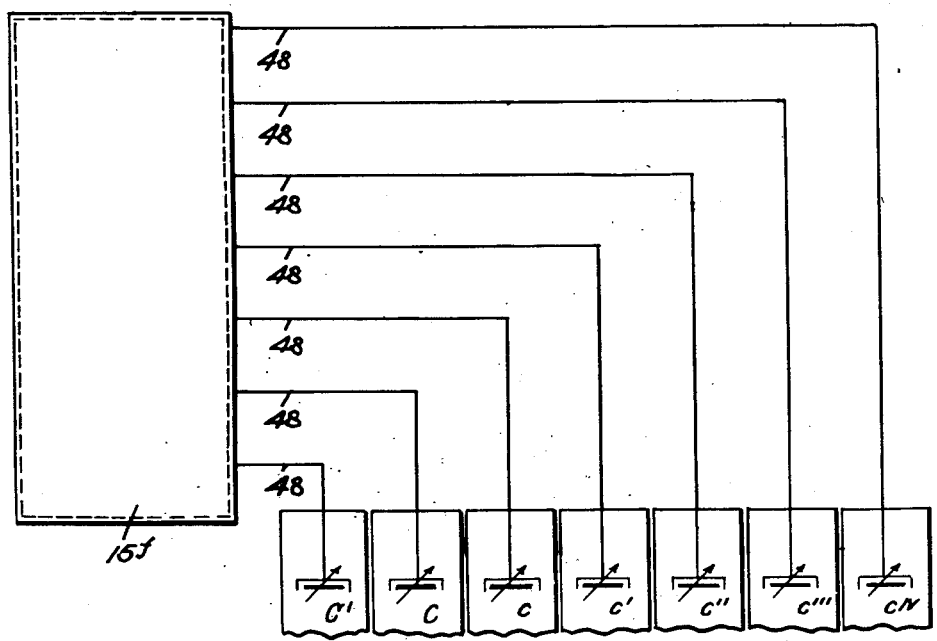

Fig. 50 is a wiring diagram of a still simpler and cheaper form of meritorious instrument. The sources of vibrations are so designed as to create a complex and rich tone. The wire from each generator is led directly to its key controlled variable condenser whose size voices it and from the pick-up plate of which it passes to a common lead for all the octaves of that tone. The leads from the various tones are then combined in any manner desired and are then led to the amplifier and loud speaker.

Figure 51:
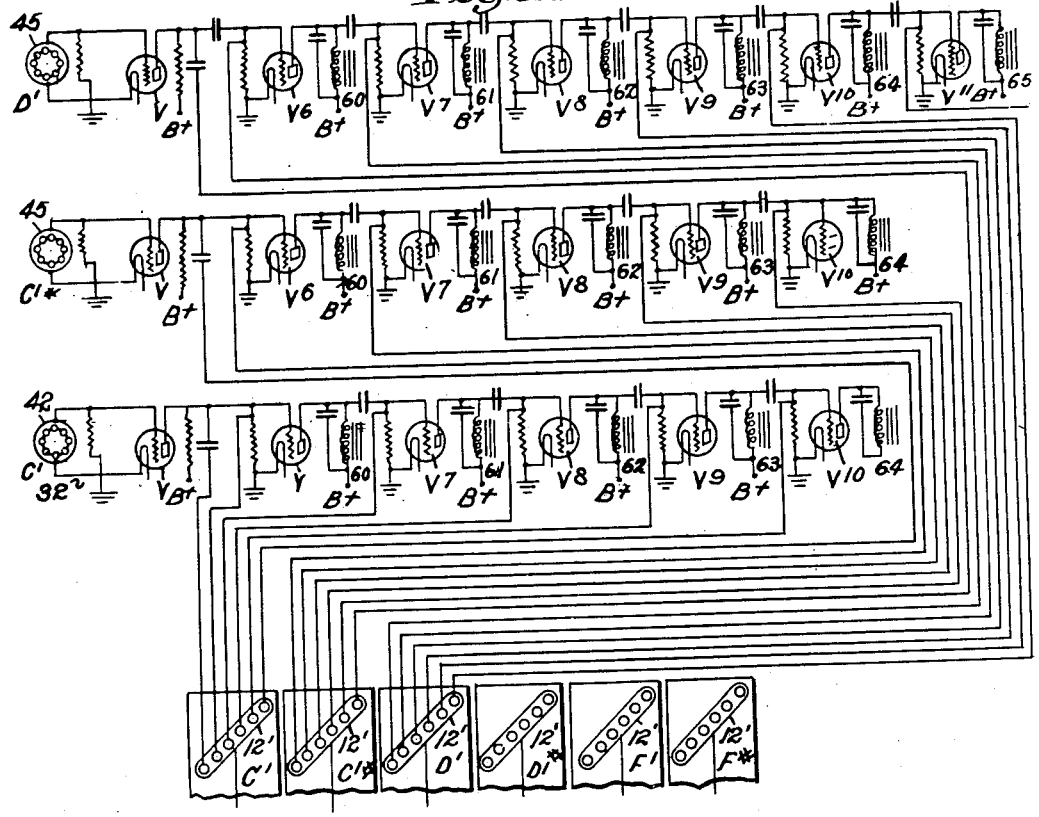

Fig. 51 is a diagrammatic view of a system where there are only twelve generators, one for each half tone of the octave. Each generator feeds a succession of tuned circuits in series, each circuit consisting of a tube, tuned by an inductance, capacitance and resistance so as to bring out of the harmonics of the generator tone.

Short description

Referring first to Figs. 2, 3, 8 and 9, the supporting rails for the movable keyboard frame are indicated at 1, 1, the movable keyboard frame at 2, and the movable frame-holding clips at 2a, 2a. On the frame 2 are provided extensions 2b, 2b, for moving the frame and the keyboard backward and forward. Key alignment pins are shown at 2c, 2c, and the key pivot pins at 2d, 2d. Felt washers around the front key pins 2c, 2c are shown at 2e, 2e, and those around the balance key pins 2d, 2d are shown at 2f. The white keys of the keyboard are indicated at 3, 3, the black keys at 3a, 3a and capstan screws at 3b, 3b. These capstan screws operate the piano action. At 3c, 3c I have indicated the key returning springs.

In Figs. 2 and 3 the felt return stop for the rear of the keys is represented at 4. I have indicated the push pieces of the upper keyboard for producing the varied musical expressions at 7, 7, and the guide for the said push pieces at 7a. At 7', 7' (see Fig. 2) I have indicated the pull pieces from the keys of the lower keyboard that operate the fly levers 10', 10'. Levers actuated by the push pieces 7, 7 are shown at 8, 8 having pivots 8a, 8a. The connecting pivots from the push rods 7, 7, to the levers 8, 8 are represented at 8b, 8b, and pivot supports for the levers at 8c, 8c attached to a rail 8d.

I have represented push-up wires at 9, 9 extending from the levers 8, 8 to the fly lever 10, 10. Connecting pivots between the levers 8, 8 and 9, 9 are shown at 9a, 9a. The push-up wires 9, 9 are attached to the levers 8, 8, resting upon a felt stop 9c on top of the bar 8e which also carries the tone-controlling cylinders 17, 17, bell crank supports 22n, 22n, felt guide 7a and felted stop plate 19h. Said fly levers 10, 10 pivoted at 10a, 10a are struck by the piano hammers 26a, 26a, hereinafter referred to, and in turn impart motion to the movable plate or plates, tubes or sections of tubes 12, 12, shown in Figs. 2, 3, 4, 5, 6, and a modified form whereof is shown in Figs. 30, 31, 32, and 33. The fly levers 10, 10, are provided with pivots indicated at 10b, 10b, which connect them with elliptical pieces 17f, 17f. The adjustable returning springs for the fly levers 10, 10, are indicated at 10c, 10c, and 10c', 10c'. The said fly levers 10, 10, are supported by pivot brackets 10e, 10e, and the fly levers 10', 10' are supported by pivot brackets 10e', 10e'.

When the keyboard is in its forward position, and the fly levers 10, 10 are struck upwards by the piano action hammers indicated at 26a, 26a, the returning springs 10c, 10c, and gravity ordinarily arrest their motion and return them to their normal positions, at a speed which is governed by the tone-controlling cylinders illustrated at 17, 17. If hit very hard blows, the fly levers 10, 10 will be arrested by the felted stop 12b on the downward extension 15b, of the variable condenser-carrying rail indicated at 15a. The said fly levers 10, 10, are supported by pivot brackets shown at 10e, 10e, attached to the rail 8d. When the keyboard is in its rearward position, and the inlet valves of the tone-controlling cylinders are blocked open by the pins 19d, 19d, the said fly levers 10, 10 will be returned by gravity and the springs 10c', 10c'.

I have indicated at 11 the spring tension adjusting frame, which is used in conjunction with the piano action. I have at 11a indicated the front bar of this frame, at 11b, 11b, the arms, and at 11c, the rear member completing the frame. I have at 11d represented a downward extension on the arm 11b, to which the frame-raising spring 11e is attached, and at 11f, is shown the upwardly extending arm of a bell crank whose forward extension carries a pin, indicated at 11ff, resting on the arm 11b, and which shoves the frame 11 downwards when the lever shown at 11p is pulled, so as to put tension on springs 10c, 10c, when the piano action is being used. At 11g, are indicated the hangers for said frame. They are mounted on the bar 11h. At 11i, I have shown the adjustable rod which moves the bell crank 11f, back and forth. At 11t', I have indicated a turnbuckle, by which the tension on the set of springs 10c, 10c, may be adjusted. At 11k, is indicated the pivot connecting rod 11i, with bell crank 11f. At 11¹, I have shown a lever which is attached by a pin 11m, to the hanger 11t, mounted on the bar 11u. I have at 11n indicated a pin connecting the lever 11¹, with the rod 11i; and at 11n', a pin connecting the lever 11¹ and the rod 11i' which is adjusted by the turnbuckle 11t'', and at 11p, I have indicated the pull handle, whose motions reverse the positions of the frames 11 and 11', as well as the positions of the keyboard. It also through the wires 19d, 19d, opens or closes the valves 17c, 17c. I have indicated the pivot which connects the lever 11p with the rod 11i, at 11r, and the stop for the handle 11p is shown at 11s.

I have at 11' indicated the frame and operating parts for putting a lighter tension on the springs 10c', 10c', when it is desired to play like the organ, any of the instruments of the orchestra, or the orchestra itself. I have at 11a', shown the rear bar of this frame, and at 11b', 11b' the arms, and at 11c', the front member of the frame. I have at 11f' represented the bell crank whose downwardly and rearwardly extending arm carries a pin 11ff', which raises the frame 11', and so puts tension on the springs 10c', 10c' when the handle 11p is shoved away from the operator. I have at 11g', 11g' represented hangers supporting this frame; at 11h', I have indicated the hanger supporting bar; at 11i', an adjustable rod connecting the lever 11¹, with the bell crank 11f' through the pins 11k' and 11n', and at 11t'' I have indicated a turnbuckle for the rod 11i'. At 11ta I have indicated a master turnbuckle on the rod 11t for changing the tension on the springs 10c and 10c' simultaneously.

The movable current-receiving plates are represented at 12, 12 in Figs. 1, 2, 3, 4, 5 and 6, and modified forms thereof in Figs. 30, 31, 32 and 33. The plates 12'', 12'', used when playing like the piano, introduce the tone instantly, while my specially shaped plates 12, 12, being those used when playing like the instruments of the orchestra, introduce and drop the tone gradually because of the peculiar form thereof, as shown more particularly in Figs. 4, 5, 6 and in 30, 31, 32 and 33. The movable condenser plates are indicated as fast in the plate holders 12a, 12a. The upper ends of the wires 17d', 17d' slide through guides shown at 17e, 17e fast in shield 15 and insulating blocks 16, 16. The lower ends of the wires indicated at 17d, 17d are fast in the plungers 17a, 17a of the tone-controlling cylinders 17, 17. The upper end of a wire 17d and the lower end of a wire 17d' are fast to an elliptical piece shown at 17f, which is slotted to receive the pin 10b that actuates a fly lever 10. These elliptical pieces have elongated felted slots which allow the pivot wires 10b, 10b to slide back and forth in the elliptical pieces as the levers 10, 10 move up and down, and so compensate for the arc movement of fly levers 10, 10, and allow the wires 17d, 17d and 17d', 17d' to move up and down in a straight line.

Referring again to the construction shown in Figs. 2, 3, 4, 5, 6 and 30, 31, 32 and 33, the said movable plates 12, 12 co-act with the said stationary current-transferring plates 14, 14, shields being provided as best shown at 15 and 15c in Figs. 4, 5, 20 and 30, and also at 15d, 15e, 15f and 15g in Figs. 15, 16 and 42. Desirably the plates 14, 14 are attached to insulated blocks 16, 16.

At Fig. 20 I have indicated one form of combining variable condenser, in which there are several transferring plates indicated at 14a to 14g, and one combining plate 12'. I have shown at 12a' the insulated frame in which the plate 12' is set, said frame sliding between guide wheels 13, 13, revolving on pivots 13a, 13a. I have at 12c, 12c shown felted stops on the stop rails 12d, 12d. The special transferring plates are shown at 14a, 14b, 14c, 14d, 14e, 14f and 14g. These plates are specially shaped so as to introduce the tone gradually and smoothly. They get smaller and smaller as the frequencies of the vibrations which they handle become faster and faster.

Referring to Figs. 2, 3 and 10 I have indicated tone controlling cylinders at 17, 17, the said tone-controlling cylinders having plungers 17a, 17a that move back and forth in them. These cylinders are provided with inlet valves closing springs 17b, 17b, and valves 17c, 17c, or I may provide, and have shown, very light spring washers 17c', 17c', Fig. 7, stamped so as to give them the utmost flexibility and which may be used in place of the ball valves.

Referring again to Figs. 3, 4 and 10 at 17d, 17d are shown the wires connecting the tone-controlling cylinder plungers with elliptical pieces 17f, 17f. Other wires 17d', 17d' are also fast to the elliptical pieces and to the insulation 12a, 12a. Their upper ends pass through bushings 17e, 17e, and so guide the condenser plates 12, 12. I have shown at 17e, 17e guides for wires 17d', 17d', and at 17f, 17f are shown elliptical pieces to which the upper ends of wires 17d, 17d, and the lower ends of wires 17d', 17d' are made fast by welding or otherwise. These elliptical pieces 17f, 17f are connected with fly levers 10, 10 by the pins 10b, 10b. At 17g, 17g and 17g', 17g', I have indicated my tone-controlling cylinder exhaust port-closing slide valves, and at 17h, 17h the guides for these slides. At 17i, 17i, are shown links connecting the slides 17g, 17g, and the short arms of bell cranks 17k, 17k, on shafts 17¹, 17¹. The long arms of the bell cranks 17m, 17m are moved by the rods 17o, 17o. I have at 17n, 17n, and 17n', 17n', indicated exhaust ports of the tone-controlling cylinders, at 17p, 17p, and 17p', 17p', I have represented the ports in the slide valves, and at 17q, oil or other free flowing liquid in trough 17r.

I have, in Fig. 10, indicated a modification of my inlet valve releasing frame 19 for use in an oil trough. It consists of a rear bar 19a, arms 19b, 19b, and a front member 19c, completes the frame. This frame is carried between supports 19e, 19e, fast to the support bar 19f, as shown in Fig. 3. I have at 19d, 19d, indicated the pins which when the frame is raised by the rod 20a, carried by the arms 20, 20, sliding when the keyboard is shoved backward under the cam-shaped extensions 19g, on the arms 19b, raise the frame and through the bar 19a', and the bent wires 19a², 19a², sliding in guides 19a³, 19a³, raises the bar 19a', and the wires 19d, 19d, which hold the valves open until the keyboard is returned to its forward position. I have at 19h shown a felt carrying stop plate, on which rests the rear bar of the frame 19 attached to the bar 8e.

Referring to Fig. 2, I have represented two slightly different forms of my switchboard mechanisms, one underneath the lower keyboard, the other back of the upper board. These structures are shown generally in Figs. 2, 3, and 15, and in detail in Figs. 11, 12, 13, 14, 16, 17, 18, 19, 20 and 42. In the upper keyboard, contact springs 21, 21 are set fast in a strip of plastic or other insulating material 21i. The wire from a generator, after passing through a vacuum tube, and being connected through a proper voicing resistance, impedance, or condenser, is connected to the appropriate spring 21 on the upper keyboard, and 21' on the lower keyboard. Strips of notched conducting metal 21c, 21c, and strips of notched insulation 21d, 21d, are held fast between other strips of insulating material 21e, 21e, and 21f by the bolts 21r, 21r, and nuts 21s, 21s. The metal strips 21c, 21c, on the face away from the insulation, carry thin and narrow strips of silver or other good electrical contacting material 21b, 21b. Likewise, the springs 21, 21 on their faces away from the insulating strips 21d, 21d, carry silver points, or short pieces of silver tubes 21a, 21a. The metal conducting strips 21c, 21c, and all the insulating strips 21d, 21d, 21e, 21e, and hanger bar 21f, are all hung and held fast between the brackets 21t, 21t, which are firmly attached to the main frame (not shown in the drawings). The shielding system for both switchboards is similar.

I have at 21g, 21g illustrated the pivots for the levers 21h, 21h, which with the springs 21m, 21m guide the spring holding bars 21i, 21i, in their movement. In the form of mechanism shown in the drawings for the upper keyboard, springs 21m, 21m, stronger than the aggregate of all the springs 21, 21 (which are very flexible), for a given note, will when the key is depressed, lift the bar 21i a short distance until the silver contact points 21a, 21a, on the ends of the springs 21, 21, come into contact with the silver strips 21b, 21b. At 21n, 21n, are indicated slots in springs 21m, 21m, through which the notched blade 21¹, on ferrule 21k passes. I have at 21p, 21p indicated pins holding springs 21m, 21m close to the shoulder of ferrule 21k.

I have at 21u, 21u, Fig. 15, indicated actuating springs for switches of the lower keyboard, at 21v, 21v adjusting screws for springs set in the keys, at 21w, 21w spring compressors slotted on the bottom to receive spring 21u, and drilled on top to receive the point of screw 21v, and I have indicated at 21x, 21x actuating strips in which the springs 21', 21' are fast. There are shown at 21y, 21y strips of insulating material having grooves 21z, 21z for holding the springs 21', 21' fast. It also shows my shielding method.

I have at 15, in Figs. 4, 5 and 20, indicated a U-shaped trough in which my variable condensers are mounted for shielding purposes. At 15c, 15c I have indicated shielding partitions in this trough between the condensers 14, 14, and extending all the way down to the bottom of the movable plates. I have in Figs. 15, 16 and 42 indicated the method of shielding my switchboards, so there shall be no transfer of electricity from the various harmonic wires representing a note, to any other note, and particularly so that there shall be no transfer of energy when the notes are made or broken at the switchboards between one note and another. I have at 15f indicated the bottom of this partial box, the top at 15d, the front at 15e, and the partitions between notes at 15c, 15c.

I have at 22, Figs. 3, 39 and 40, and modified forms thereof shown in Figs. 43, 44, 45, 45a, 45b and 45c, shown the sustaining pedal frame which consists of a rear member 22a, arms 22b, 22b, and a front bar 22c; and at 22d I have shown a felt stop on the bar 22c, for the weighted ends of bell cranks 22', 22'. There is shown at 22e the upwardly extending arm of the bell crank frame 22, at 22f the hangers for frame 22, attached to the supporting rail 22g, which carries the felted stop 22g'; at 22h the returning spring for the frame 22, and at 22i the rod from the loud pedal which moves the frame. I have at 22k, 22k shown the downwardly extending arms of bell cranks 22', 22', which terminate in notched latches, and at 22', 22' I have illustrated the horizontal weighted arms of latches; at 22m the bearings for these latches, while at 22n, 22n I have shown the hangers for the bearings for the latches.

I have at 23, in Fig. 3, indicated my momentum pieces for reversing the piano effect, at 23a, the tongues interposable between the piano hammers 26a, 26a, and the fly levers 10, 10, and at 23b, the pivot rod which carries them, and on which they oscillate. I have at 24 represented the momentum piece carrying frame, which consists of a rear bar or tube 24a, upwardly extending arms 24b, 24b, which carry extensions 24c, 24c, on which are mounted a felted rail 24d, on which the momentum pieces rest. There is represented at 24e, a downwardly extending arm which receives motion through the pull rod 24g; at 24f, a felted stop rail for the frame in its normal position; at 24i, a felted stop rail against which the frame is arrested when the tongues of the momentum pieces are underneath the fly levers 10, 10, and at 24h the returning spring. I have at 25, see Figs. 2 and 3, represented part of the whips of the piano action and at 25a, the leather or felt interposed between them and the capstan screws 3b, 3b. The rest of the action except the hammer shanks 26, 26, and the hammers 26a, 26a, have been omitted for lack of room, and because it is well-known in the art, and is no part of my invention.

I have at 14a, 14b, 14c, 14d, 14e, 14f, and 14g, in Fig. 20, indicated specially shaped transferring plates of my voicing, controlling and combining condensers which may be connected with the sources of vibrations 45, 45, or the vacuum tubes V, V. There is one of these condensers for each tone in the instrument, and a separate plate in each condenser for each harmonic series which the instrument contains. As the vibrations of each harmonic series are higher than the last, each set of plates is made smaller so as to transmit the right amount of current. In this way the power of each harmonic series may be made of just the right strength to produce a very beautiful and rich tone. I have a series of plates for each harmonic set. They differ by very slight amounts, and all the tones in a harmonic set can be voiced by using the proper size of plate. If the tone is too loud use a smaller size of plate, and if it is too weak use a large plate. As will be seen from the drawing the plates are specially shaped so as to introduce the tone very softly and gradually swell it up smoothly to maximum power. All the various vibrations are combined without loss or interactions on the common pick-up plate 12' whose movements control the power of the tone with the utmost delicacy as long as it is sounding, and drop it as smoothly and beautifully as it was taken. By the use of these special condensers all necessity for voicing means and all the switchboards, and all the condensers 12 and 14, and all the harmonic controls 30 and 31, 30 and 31, with all their appurtenant parts are eliminated.

I have at 30, 30 in Figs. 21, 22 and 24 indicated specially shaped movable condenser plates with mechanisms for operating the same. The movable condenser plates 30, 30 and the quasi-movable condenser plates 31, 31 form variable condensers for governing the power of the harmonics. The movable plates 30, 30 are carried on arms indicated at 30a, 30a which oscillate on the supporting rod 32. They normally rest on the felted stop 37a until an actuating tablet 35b is depressed when they are, or may be, thrown upward more or less by the arm 35 of the tablet 35b. The plates 31, 31 carried on the arms 31a, 31a normally rest against the upper felted stop 37 (broken away in the drawings). By turning its corresponding dial represented at 33b, any plate may be moved up or down, and so that harmonic may be weakened or strengthened as desired. The arms 31a, 31a terminate in short vertical arms shown at 31b, 31b, which are cut to receive worms indicated at 33, 33. When the dials 33b, 33b, are turned they through the rods indicated at 33a, 33a, and the worms 33, 33, impart motion to the condenser plates 31, 31, which therefore move more or less up or down. There are several of these mechanisms (dials, shafts, worms, sections of wormwheels, arms, and upper condenser plates), one for each harmonic series in the instrument. There are nine U-shaped frames 34 with arms 34a, 34a, rear stepped strips 34c, 34c, and steps 34c', 34c', which operate the condenser plate carrying arms 30a, 30a, each of which can be made to produce almost any tone desired.

I have at 34, in Fig. 23, indicated my mechanism for giving motion to the plates 30, 30; the parts 34a, 34a, being the arms of U-shaped frames, which may oscillate on the rod 34b; and 34c, being the back members of these frames which are cut accurately into steps of unequal heights 34c', 34c'. These steps are equal in number to the number of sets of harmonics in the instrument. The height of each of these steps varies, as indicated in Figs. 22 and 25, and so governs the power of the different harmonic series. These steps are accurately cut, and the variation in the height of the steps is such that each frame represents a different quality of tone. I have at 34d represented the downwardly extending projection on these frames, each of which rests on its own lever 35, and are moved by same. Merely by touching one of nine tablets 35b, 35b on each manual, any one of nine different qualities of tone may be obtained instantly. The lever 35, pivoted at 35a, 35a, and terminating in tablets 35b, 35b, at the console, are held down, when pressed down by the spring pressed latches 35c, 35c.

Figs. 24 and 25 illustrate a modified construction, in which a straight strip 36c, is substituted for the bent frames 34c of Figs. 21, 22, and 23. The steps 36c', 36c', on these strips are like those on frames 34c, carefully calculated, and accurately cut, to give the proper harmonic strengths to produce the tones desired.

The stampings 36c, are carried by two arms 36e, 36e, attached to supports 36g, by the pivots 36f, 36f. These arms are also attached to the downward extension 36a, of stamping 36c, by pivots 36f', 36f'. This extension 36a, and the smaller extension 36b, at the opposite end of the stamping, slide in guiding combs 36h, 36h. In order to crowd them into smaller space, every other stamping is reversed; this puts the arms 36e, 36e, which carry the stampings 36c, 36c, at opposite ends, and enables them to be crowded closer together. The arms 34a, 34a, and the rod 34b, on which they oscillate have been omitted from these figures, since they are not necessary in this modification, everything else remaining the same.

I have at 40, in Figs. 26 and 27, indicated a set of lightly revolving variable resistances, there being one such resistance for each tone of the scale. There are shown at 40a, 40a insulated grooved discs, each of which carries a smaller insulated grooved disc 40b, on one side. Around each disc 40a, is stretched a resistance wire 40c, one end of which is fast in the disc 40a, and the other end of which is attached to the slip ring 40d, in the groove on the small disc 40b. One brush 40e, rests on the resistance wire 40c, and the other brush 40f, rests on the slip ring 40d. They are all mounted fast on the rod 40g, which is controlled from the keyboard.

I have at 41, Fig. 28, represented diagrammatically a set of fixed resistances of varying resistance 41', 41'. One end of the wire from each resistance is connected to a contact button 43, the other end of each resistance being connected to the common lead 48. A lightly moving contact lever 44, pivoted at 44b slides over the contact buttons 43, 43. Each of the levers 44, 44, is connected to a common insulating bar 44a, which imparts similar movement to them all.

I have at 42, Fig. 29, indicated a set of fixed condensers of varying capacities 42', 42', and at 43, 43, I have indicated a set of contact buttons. One wire from each condenser is connected to a contact button, the other wire being connected to the common lead 48. The lever 44, pivoted at 44b, slides lightly over the contact buttons 43, 43. Each of these levers is connected to an insulating bar 44a, which imparts similar motion to all of them. The levers 44, 44, which turn on the pivots 44b, 44b, are each connected to its own spring 21, or 21', of the switchboards.

Fig. 30 is largely similar to Fig. 4. It, however, shows two shaped movable plates 12, 12 for introducing the tone gradually, and one shaped movable plate 12'', for introducing the tone more rapidly for percussive effects. I have also indicated at the lower left hand side of Fig. 30, one of my methods for instantly shifting the current from the set of variable condenser plates 12, 12, which introduce the tones gradually, to the set of plates 12'', 12'', which introduce the tones more rapidly, practically instantly. The rod indicated at 12g, carries a shaped bar of insulation indicated at 12k, in which are set springs 12¹, 12¹. Each spring 12¹, 12¹, is connected to its own generator 45. There is a spring 12¹, and a movable plate carrier 12a for every tone in the instrument. These springs indicated at 12¹, 12¹ play between two sets of conducting springs indicated at 12m, 12m, and 12m', 12m', which are set in an insulating bar 12n. Every one of the springs 12m, 12m is connected to the two shaped plates in the carrier 12a, which the spring 12¹ represents. Conversely, every spring in the set of springs 12m', 12m' is connected to the tube indicated at 12'', which the spring 12¹ represents. The conducting springs 12¹, 12¹, carry silver points on each side of their free ends, and the springs 12m, 12m, and 12m', 12m' also have contacts of silver or other good contacting material attached to their inner surfaces. At 12n, I have indicated the arm, which when moved downward by the pull of the link 12f, throws the contact springs 12¹, 12¹ over against the set of springs 12m', 12m', thus making contact with the condenser plates 12'', 12'' for producing piano tones. When the link 12f is released, the spring 12i throws the contact springs 12¹, 12¹ over against the other set of conducting springs 12m, 12m which throws the current into the shaped movable plates 12, 12, for introducing and dropping the tones very gradually. It also shows my method of shielding the movable plates, and the way the shielding partitions 15c, 15c extend downwards beyond the bottom of the shielding trough 15.

Fig. 31 is a side elevation illustrating the stampings for the plates 12, 12, and the plate 12'', with its vent holes 12e, 12e, for releasing trapped air, before the plates have been rolled into tubes.

Fig. 32 so far as the movable condenser plates are concerned, is largely similar to that part of Fig. 30, except that since there is but one tube indicated at 12'', it has been placed outside of the sections of tubes 12, 12, because piano tones are very powerful when taken, and in this position it has a much greater area than when placed inside as illustrated in Fig. 30. Also the trapped air will be vented better when it is on the outside.

I have indicated at 12, 12, and 12'' in Fig. 33, a side elevation of the stampings for these plates before being bent into tubes. The vent holes 12e, 12e for releasing the trapped air are clearly shown.

At 33b in Fig. 34, I have indicated an elevation of one of my dials 33b, the lower part of which is broken away, for controlling the power of my harmonics. When turned pluswards, it throws the condenser plate 31 down over the condenser plate 30, so increasing the transferring area and the volume of sound. When turned minusward, it raises the condenser plates 31, 31. This decreases the transferring area and so the volume of sound. They are also used to control the positions of my tone-controlling slides 17g and 17g'.

I have at 41a, 41a in Fig. 36 represented diagrammatically a set of fixed impedances in parallel. Each one differs from its neighbor in carrying capacity. One wire from each impedance is connected to a contact button 43 and the other wire from said impedance is connected to a common conductor. A conducting lever 44 slides over the contact buttons 43, 43 and so establishes contact with one or more of them as desired. All the levers 44, 44 in a harmonic set are connected to the common bar 44a, which imparts movement to them all. Each lever 44 is connected to a wire 21 or 21a in the switchboards, or else to one of the plates 14a to 14g of my multi-plate combining condenser illustrated in Fig. 20.

I have indicated on a larger scale at 17 in Fig. 37, one type of my tone-controlling cylinders for working in oil or other light fluid. By drilling the exhaust ports 17n, 17n, and 17n', 17n' spirally, the length of the tone-controlling cylinder 17 can be cut down as much as desired, since the top of one port may be above the bottom of the port just above it, and by using oil instead of air, the cross-section can be greatly reduced.

I have indicated at 17, in Fig. 38, my tone-controlling cylinder illustrated in Fig. 37. It has been cut down the center and straightened out flat to show the two rows of ports 17n, 17n and 17n', 17n'. It shows the shortening of the cylinder made possible by drilling the ports spirally part way around the cylinder. And more particularly, it shows one set of uniformly spaced ports, and another set of non-uniformly spaced ports, each of which will give the tone a different form of ending.

I have indicated at 22 in Figs. 39 and 40, a variation of the mechanism shown in Figs. 2 and 3. Figs. 39 and 40 also show my loud pedal mechanism, but they vary from Fig. 3, however, in that the front bar 22c of the frame 22 is at an angle to the horizontal, that is one end is higher than the other, and so the tones will be cut off successively and very rapidly, and without any transients or diagram cracks. Fig. 39 shows the frame 22 in the position it assumes when the pedal is down, and Fig. 40, its position when it is up.

If I were breaking in my instrument the working current from my sources of vibrations instead of the minute amount of voltage necessary to swing the grid of a small vacuum tube, possibly one-millionth of one ampere, I would have such diaphragm cracks, or key thumps, whenever keys on the keyboard were released and also whenever the loud pedal was released, while the tones were still sounding, and before the plates 12, 12 had dropped back completely out of the condensers, which would necessitate breaking the tones (circuits) at the switchboard, as to totally ruin the music, and make the playing of piano music impossible.

Fig. 41 is a consolidation of Figs. 27 and 27a of Patent No. 1,956,350, dated April 24, 1934. The scale has been reduced so as to get the two figures on one sheet. I have, however, inserted my tubes V4, V4 between the coils 430, 430 of the generators 424, 424, and the bus bars to which the high impedances 528, 528 are attached. Also at the right hand end of the sheet, I have inserted my tubes V5, V5 in the lines leading from the conducting bars 668, 669, 670, 671, 672, 673, 674, 675 and 676, and the taps of the primary 644 of the transformer 646, the lead wires being bent up and down to save space. When my tubes V4, V4 and V5, V5 have been inserted, as indicated in Fig. 41, there will be feeding through the switchboards from the tubes V4, V4 only enough voltage to swing the grids of the tubes V5, V5. There will, therefore, be no voltage drop, and no generator interactions, and so no robbing or weakening of the tones, and there will also be no need for the many, many voicing resistances 528, 528, and even without them there will be no robbing of any kind whatever. This will also completely and absolutely eliminate all diaphragm cracks or key thumps, and make the fastest music of this instrument as beautiful as its slow music now is. Even if my tubes V4, V4 are entirely omitted, and only my eight tubes V5, V5 are used, they will entirely and absolutely remove all traces of diaphragm crack from the music of this instrument.

I have at 21c and 21d in Fig. 42 illustrated the way I have cut slots into my bus bars 21c, 21c and insulation 21d, 21d to allow my shielding partitions 15f, 15f to pass well beyond the contact points 21a, 21a and 21b, 21b, so that any electrostatic disturbances which may be present when the contacts are made or broken, will not be picked up by any other switches.

It will be seen from Figs. 15, 16 and 42 that my switchboards are shielded by three-sided enclosures, almost a box of shielding material made up of a bottom indicated at 15g, a top 15d, a front 15e, which is perforated with holes for the current-carrying wires 15i, 15i to pass through, and partitions 15f, 15f between each switch and extending beyond same. This box will also prevent electrical disturbances outside the instrument from interfering with the music.

I have at 22 in Fig. 43 indicated a means for automatically opening all the inlet valves of my tone-controlling cylinders, as soon as the damper pedal starts to rise. It is largely similar to Figs. 39 and 40, but differs from them in that it is electrically operated. There is an electrical circuit with two breaks in it which operates a magnet, which in turn operates the frame 19, and so opens all the inlet valves of the tone controlling cylinders as soon as the loud pedal starts to rise. The arm 22e carries a sliding contact 22t. There is a segment of insulation 22r, on which is mounted a live contact 22s. There is a rearwardly and downwardly extending arm 22o' which carries a pawl 22p. As the pedal starts down this pawl raises the spring contact 22q, off the contact 22q' and so opens the circuit. When the contact 22t slides onto the segment 22s, no current can flow since the circuit is open at 22q and 22q'. The arcs of the pawl and the spring contact work in opposite directions, and so the pawl slides out from under the spring just as the contact 22t slides off the segment 22s. The spring when released snaps back and establishes contact with 22q'. With this arrangement no current can flow till the pedal starts to rise. As it does so the contact 22t slides on to the contact 22s, and the circuit is closed since the current can now pass through the contacts 22q and 22q'. The magnet 19i acts instantly and opens all the inlet valves 17c, of the tone controlling cylinders, and holds them open till the loud pedal has almost reached the top when contact between 22t and 22s is broken, and the pawl snaps back under the contact spring 22q, and all the parts are ready for a new cycle of actions. The instant the magnet acts the plungers snap out of the cylinders, carrying the movable plates with them, thus ending the tones almost instantly, but beautifully smoothly, and without any transients or diaphragm cracks, before the pedal has reached the top.

Fig. 44 is largely similar to both Figs. 40 and 43, and since they have both been described fully, it is thought to be unnecessary to describe Fig. 44 more at this point.

Figs. 45, 45A, 45B and 45C are largely similar to Fig. 43. I have shown, however, at 22v a holding magnet for holding the contact springs 22q and 22q' closed while the loud pedal is returning. At 22c' is indicated a downwardly and rearwardly extending arm which picks up the spring 22q' and lifts it into contact with the spring 22q just as the contact 22t which is moving rapidly, slides off the contact segment 22s onto the insulation 22r. As the pedal starts up, moving slowly, the springs are compressed as indicated in Fig. 45B. Just as soon as the contacts 22t and 22s close, both the magnets 22v and 19i are energized. The magnet 19i instantly opens all the inlet valves 17c, 17c of the tone controlling cylinders and the condenser plates 12, 12 immediately start dropping out of the condensers 14, 14. Meanwhile the holding magnet 22v continues to hold the contact closed at 22q, 22q' as indicated in Fig. 45C. It continues to hold them closed and the inlet valves 17c, 17c, open until the pedal has almost reached the top, and the contact 22t has slid off the live segment 22s and so broken the circuit.

I have indicated in Figs. 46, 46A and 46B one of my mechanisms for taking the place of the dampers of the piano. There are two magnets in series in a circuit which has two breaks in it. One or the other break is open while the key is going down, but both are closed most of the time while the key is rising.

Fig. 46 shows the key in its normal or up position.

Fig. 46A shows the key in its down position, with the contact springs bent upward, and the armature 46g pressed against the holding magnet 46b.

Fig. 46B shows the key part way up on its return toward normal position. The lever 46i is moving away from the contacts 46e and 46f, but the magnet 46b is holding them closed, and will continue to do so until contact is broken at 46k, and 46l. When the circuit is closed both the magnets are energized. The magnet 46a through the lever 46 instantly opens the large inlet valve 17c of the tone controlling cylinder which allows the plunger 17a of the cylinder 17 to drop to the bottom of the tone controlling cylinder 17, carrying the movable plates with it and so on account of the special logarithmic shape, ending the tone almost instantly, but very beautifully and without any extraneous noises such as the piano has.

Fig. 47 is an elevation partly in section, somewhat like the rear of Fig. 3. It shows a modification in that I have substituted a lightly revolving variable resistance 40c, whose resistance decreases very rapidly, about in a logarithmic ratio as it is moved by the action of the key. These resistances are mounted on a disk 40a and revolve lightly on a common shaft 40g. Each carries a spur gear 40h with fine teeth which is fast on the hub 40a, which in turn is fast on the disk 40b. The rack 40i sliding in guides 40k, 40k meshes with the pinion 40h and imparts motion to same. The rack 40i is connected through a link 40l with fly lever 10 which is actuated as in the previous drawings. It is perfectly evident that the resistance 40c could be carried on the rack 40i which could be insulated from the rest of the instrument and itself slide under contact brushes.

Fig. 48 illustrates a variation of my switchboard mechanism. I have there shown the contact wire switches 21, 21 horizontal where they pass through the bar 21k, then bent upward sharply, and then bent horizontally again near their contact points. Since these points are considerably above their point of attachment to the bar 21k, there will be a slight back and forth or sawing action at the contact points which will cut through any dust that may have accumulated.

Fig. 49 is a wiring diagram which differs from Figs. 1 and 2 in several ways. I have omitted all the voicing means, all the switch boards, all the variable condensers 12 and 14, 12 and 14, and all the harmonic controlling devices such as 30 and 31, 30 and 31, with all their appurtenant parts, and have substituted for them all only my compound variable condensers illustrated in Fig. 20, and yet have only sacrificed the power of tone building, which even the piano does not possess. I lead the wire 48 from each source of vibrations 45 to its own transferring plate 14a, and take connections from this generator lead to the other transferring plates 14b to 14g of the harmonically related tones lower down the scale. I am therefore able by the use of this special condenser to voice each tone in a series of tones by using the right size of plate; to voice each harmonic set to the exact strength desired to produce a beautiful and rich tone by using the right size of plates for that harmonic set; to combine all the harmonics into a tone without loss or interactions; to introduce and terminate the tone in the most beautiful manner possible and without any transients or diaphragm crack; and to control the tone while sounding with as great delicacy as can the violin bow. From the pickup and combining plates of these variable condensers, the currents representing all the octaves of a tone are led to and combined on a common conductor, after which they are recombined in any approved way, and the resulting vibrations led through a pedal control and thence to the amplifier and loud speakers. In this way I am able to produce a very simple, cheap and most meritorious form of instrument.

Fig. 50 is a still greater simplification, in which the sources of electrical vibrations are so designed as to produce rich waves, each of which contains many harmonics and will produce beautiful musical tone when translated into sound. The current from each generator goes to its vacuum tube V (not shown), and thence goes directly to its own variable condenser, where it is voiced by the size of transferring plate used and is introduced, controlled and dropped by the same. The currents from the pick-up plates of the condensers representing all the octaves of a tone are all combined on a common conductor, and are then recombined in any approved way, and led through a pedal control to the amplifier and the loud speakers. I am thus able to produce a very meritorious and exceeding simple instrument quite cheaply.

Long description

I initiate electrical waves of the frequencies necessary to produce the musical scale (whether that scale be in just intonation or in equal temperament), preferably by alternators as 45, 45, though any other method of producing electrical waves satisfactorily, such for instance as, by vacuum tubes, or combinations of generators and tubes, each generator feeding tubes which are used either as multipliers or dividers of the original frequency, so as to produce all the octaves of the tone initiated by the generator. Tuned vibrators or any other satisfactory means of initiating electrical musical waves may also be used.

I lead the voltage from each of my generators 45 to the grid of its own vacuum tube V, as a perfect one way electrical valve, whose plate circuit voltage passes through voicing means to its switch, or switches on the switchboard or switchboards, and from them to the grid or grids of the tubes V', V', or it may go directly to the plates 14a to 14g, of Fig. 20. Since vacuum tubes are perfect electrical one-way valves, several very important results are produced thereby.

By so doing, I completely eliminate all back leaks or generator interactions through other generators which are connected to the keyboards at the same time. I thus compel all the voltage or current from each generator to go forward productively in its own working path or paths. I thus prevent all the leaks back through other paths to other generators, with the resulting voltage drop, and consequent robbing of the tones, as more and more tones are sounded. This robbing has been very detrimental heretofore to the perfect addition of harmonics into tones, and of tones into chords, and of the different voices into an ensemble; and so that fullness and boldness of tones and chords, and ensemble, that are so necessary for the production of good music. This is true at all times, but particularly when working up to a climax. It has been signally lacking in all previous instruments, which have made music from alternating current generators.

Only voltage, and not amperage, is drawn from any one of my generators 45, 45 to feed the grid of its own small vacuum tube V. Since the generator grid circuit is always closed, no grid leak is necessary, and therefore there can never be any voltage drop in the generator grid circuit. The plate voltage of a tube V, whose grid is fed by a generator 45, feeds only voltage through voicing means and the switchboards to the grid or grids of the tubes V', V', one for each harmonic series being used in the tone, as $n$, $2n$, $3n$, etc., through a high resistance network, which has many times the resistance of the plate circuit and the constant recommended plate load through which direct current is fed to the tube. Since the resistance of this network, even when all the harmonic stops are drawn, is many times the recommended plate load of the tube, it is evident that if there is any voltage drop whatever here, it must be microscopically small, and so entirely negligible so far as the ear is concerned. Moreover, if there is any voltage drop whatever here, it only occurs when additional sets of harmonics are put into the tone—when more grids in the tubes V', V', which consume possibly a milliampere each—are fed from the plate of a tube V. Any microscopic voltage drop here can only effect the overall loudness of all the tones. It does not change in any way, so long as the same combination of harmonic elements is being used in the tone. It will only change minutely if a different combination of harmonics is used to create another tone quality. It cannot in any way effect the addition of harmonics into tones or tones into chords, or of the individual voices into an ensemble. I therefore have an absolutely perfect addition of harmonics into tones, and tones into chords, and of the various switchboards, or voices, into an ensemble.

For voicing purposes, I insert graduated resistances, as 40c, 40c of Figs. 26 and 27 or 41', 41' of Fig. 28, or condensers of the right current-carrying capacity, as illustrated at 42', 42', in Fig. 29, or I may insert impedances as 41a, 41a of Fig. 36, to pass the exact amount of current required in each circuit, between the plate of the vacuum tube V, through the switch, or switches 21, 21, or 21', 21' of the switchboards to the grid or grids of the tubes V', V'. I thus easily produce a perfectly voiced musical scale, which is entirely free from resonances, or unevennesses of any kind whatever, no matter how many tones, either as fundamentals or harmonics, are being drawn from the same generator; whether on one, or on each of several keyboards. They both voice the tones, and also control the power of a set of harmonics. This use of sources of electrical vibrations, which feed three electrode vacuum tubes as one-way valves, that feed my voicing means, and so my switchboards is, so far as I am aware, something entirely new in music.

I use switching means of the type disclosed in the said Thaddeus Cahill patents, controlled by the keys of the keyboard, for connecting the generators 45, 45 with the other appropriate parts of the instrument. Since their general type is already well-known in the art, the briefest possible description should suffice. I use a pick-up and combining bar or notched strips of conducting material 21c on every keyboard for every series of harmonics which the instrument contains or that particular keyboard is designed to use. (See Figs. 1, 2, 3, 11, 12, 13, 14, 15, 16, 17, 18, 19, 20, 42 and 48, but more particularly Figs. 2, and 3.) Each of these pick-up and combining bars 21c, 21c has a strip of notched insulation 21d, fast on one side, against which the contact springs 21, 21 normally rest, and a strip of silver, or other good contacting material 21b on the opposite side. Each of the spring wire switches 21, 21, or 21', 21', has a small section of silver tube 21a fast on its end, which contacts when the spring-carrying bar 21i rises, with the silver strip 21b on the pick-up and combining bar 21c, so closing the circuit. In the form of mechanism illustrated in the drawings, a spring 21m is normally held down by the rear end of a key 3, or 3a. When the musician depresses a key, its rear end rises and the spring 21m rises with it; and through the pin 21p, lifts the spring-carrying bar 21i, which closes the circuit (so far as the keyboard is concerned) of each of the harmonic series in the instrument. No current can pass, however, till the points of my movable plates begin to enter the condensers. Then the musical currents begin to flow and the tones to sound. Each of these bars 21i, 21i, is guided at the bottom by a link 21h, pivoted at one end to the spring-carrying bar 21i, and at the other to the supporting bar 21f, by pivots 21g, 21g. Its weight is carried by the pin 21p, which rests on the spring 21m. This is the mechanism I have illustrated for use on the upper keyboard.

The mechanism illustrated for the lower keyboard is largely the same, but instead of being in the rear of the keys of the upper keyboard, it is under the front of the lower keyboard, which necessitates some slight changes. In this case, the front ends of the springs 21', 21' are held fast in grooved strips of insulation 21y, 21y, and their rear ends are depressed, when the key is put down, by the adjustable screw 21v acting on the spring 21u, the forward end of which passes through the spring depressing strip 21x, and so presses the wires 21', 21' into contact with the silver strips 21b, 21b. I carefully shield all my switchboards.

From the foregoing, it will be seen that each switch at the switchboard is only breaking the minutely small amount of voltage necessary to swing the grid of a small tube V'. I am not using the amount of current necessary to magnetize and demagnetize a combining transformer with an iron core and many thousands of turns of wire, but only enough voltage to swing the grid of a small vacuum tube. It is, therefore, clear that since the voltage or current broken by each switch is entirely negligible, and the circuit is a non-inductive one, I have no arcs, and no transients, and hence no shocks to the circuits, and therefore no diaphragm cracks, or key thumps, of any kind whatever. So it is evident that I can make and break my currents at the switchboards if necessary (which it is not) with impunity. I have thus eliminated the two greatest stumbling blocks, robbing or weakening of the tones, and diaphragm cracks, to making music by an electrical musical instrument, which shall sound like the piano.

My tones when broken at the switchboards are broken with the most perfect and beautiful smoothness. Almost all the tones taken on the piano are cut off by the dampers before they have completely died away, before the strings have ceased to vibrate. In the cheaper forms of my instrument, under similar circumstances, however, my movable condenser plates would not in most cases have completely withdrawn from my variable condensers, just as the strings of the piano have not ceased to vibrate when the dampers fall on them, and so the remaining part of the tone, sometimes, of course, but a small part of the tone, since piano tones die away so quickly, immediately after the tone is taken, would be broken at the switchboards when the keys were released. If there were diaphragm cracks in these cases, they would occur on almost every tone that was sounded, and the beauty of the music would be completely ruined. On my instrument, however, I have no diaphragm cracks whatever, and so the musical effect is beautifully smooth and pleasing.

Referring to Figs. 3, 4, 5, 6, 20, 30, 31, 32 and 33, I use very easily operable means such for instance as the specially shaped and exceedingly light movable plate, or plates, 12, 12, or 14a to 14g, of small variable condensers, 14, 14, which are so designed as to bring the tones in gradually and smoothly, for delicately and accurately controlling the power of the electrical waves, and therefore to power of each individual tone at every instant of time while it is sounding. They will drop or decrease the tones in the same beautifully smooth way. It is also evident that specially designed resistances, whose resistance starts very low and gradually and smoothly increases to a very high value on about a logarithmic ratio, may be used as shown in Fig. 47, instead of the variable condensers. These may be revolved more or less either by the blow of a piano hammer, or a pressure touch. It is also evident, that instead of revolving the resistances, brushes of fine wires similar to those shown in Fig. 46, may be moved over the surfaces of the resistances which are stationary. I prefer the use of condensers, however, as I consider them better devices, both mechanically, and electrically.

I shape either the movable plates 12, 12, or the stationary plates 14, 14, or the plates 14a to 14g, one or both as desired, of my variable condensers; whether they be tubes or plates, or whatever their form, in such a way that the transferring area, or areas, of their surfaces increase very rapidly as they enter the condenser, so that the amount of electrical energy transferred shall increase from nothing to a maximum very rapidly with each increment of motion of the plates. They should start with almost needle points, and the increase in area should be such, as to furnish the ear that very rapid increase in the power of the aerial vibrations which it demands in order to feel the effect of a perfectly smooth and gradual growth in the volume or loudness of the sound. In other words, their area should increase in about a logarithmic ratio. (Note. The difference in the power, the dynamics, of the aerial waves necessary to produce in the ear, on the one hand a soft or weak sound, and on the other, a very loud sound, are tremendous. They are so enormous, it is exceedingly doubtful if more than a very, very few people realize them. Dr. Harvey Fletcher, Acoustical Research Director of the Bell Laboratories, and probably the greatest authority in this line in the world, says (Note. Bell System Technical Journal for 1934, vol. 13, page 242, lines 3, 4 and 5), "If this discussion were limited to the type of symphonic music that now is produced by the larger orchestras, the range would be about 10,000,000 to 1, or 70 db." Another authority has put it at 83,000,000 to 1. It is therefore evident, that for perfect control of the tone, the points of the movable plates must be very small as they begin to enter the condenser, and their transferring area must increase on a logarithmic ratio. When this is properly done, it gives the musician an easy, most beautiful, and perfect control over the introduction of the tone, its expression while it is sounding, and its termination or ending. Nothing now in the world compares with its powers. The above shows the value, the absolute necessity for properly shaping the movable plates. If it is not done correctly, good musical results are absolutely impossible.) See Figs. 6, 20, 31 and 33. When this is done properly, the effect produced on the ear is an absolutely gradual, smooth, and uniform increase in power, and the tones can be introduced as softly as can be heard, and carried up gradually and smoothly to maximum power, and the increase or decrease in the volume of sound on the ear will be perfectly gradual, and will vary in exact proportion to the movement of the movable plates, due to the movement of the key, or to the power of the piano hammer blow. These condenser plates are so shaped as to transfer current at such rate as, when translated into sound, to produce on the human ear the effect of the attack and/or the drop of any particular tone. If they are not so shaped, the tones will come in very much too fast at the beginning, and not nearly fast enough later as the movable plates move farther into the condenser; and it will be quite impossible to play soft and delicate passages with the smoothness and expression that is necessary for good music, because all the tones will be too loud when initiated, and will not increase in volume nearly fast enough thereafter. The mechanism above described is best suited for producing the effects of the pipe organ and the instruments of the orchestra, such as the strings, woodwinds, and brasses. By my method herein described, all shocks to the ears from diaphragm cracks, when the tones are initiated and ended by these plates, is absolutely eliminated, and the effects of taking and dropping the tones, or of varying their power, while they are sounding, is perfectly smooth, and very beautiful.

On the contrary piano tones, and the tones of the percussion instruments, are taken almost instantly with a percussive effect, or with more or less of a bang. For this class of tones I may use the type of plates 12″, 12″ illustrated in Figs. 30, 31, 32, and 33. Other tones such as those of most of the orchestral instruments, and the organ, start more slowly and grow gradually. It is perfectly evident that one type of movable condenser plate may not be equal to producing both types to perfection. I, therefore, provide more than one type of movable plate. For the piano, and the percussion instruments, I use a type of plate designed to bring the tone on instantly, or nearly so as illustrated at 12″, in Figs. 30, 31, 32, and 33. This form brings the tone on practically instantly.

I use my switchboards in the main merely to close dead circuits dead so far as the ear is concerned. The loud speaker circuits are not closed until after the points of the shaped condenser plates 12, 12 and 12″, 12″ begin to enter the condenser. The mechanism is such, that the switchboard circuits are closed practically instantly when the keys start down and before the piano hammers 26a, 26a have hit the fly levers 10, 10, and so throw the movable plates into the condensers. The adjustment is also such, that when playing like the instruments of the orchestra, or the pipe organ, the switchboards will have closed the circuits before the movable plates start to enter the condensers. Also it should be borne in mind, that the needle points of my movable plates as they enter the condensers are infinitesimally small in comparison with the whole area of the plates when they have entered the condensers fully. When the movable plates first begin to enter the condensers, their area is probably not the one millionth part of their total area. It will thus be seen, that when the circuits are made even if current instead of voltage is used, there is no possibility of any shock to the circuits such as makes the diaphragm cracks, found in other electrical musical instruments. The tones are also usually broken in this same beautifully smooth way. The shaped condenser plates drop down rapidly at first, and gradually slower and slower out of the condenser, so reducing the current, and therefore the sound, gradually and in the most beautiful and smoothest possible manner, and they have withdrawn largely, and in many cases entirely, from the condenser so that almost no voltage or current, or none at all, is passing when the circuits are broken at the switchboards. Since they are largely dead circuits, or altogether dead circuits, when broken, and since they never at any time transmit anything more than a microscopic amount of voltage or current, they cannot possible produce any disturbance. This is true in most cases except when the loud pedal is used. In this case, the circuits may be broken at the switchboards, but they will be broken without diaphragm cracks, as will be explained later.

By my switchboards, I pick up all the tones of any set of harmonics that are sounding at the same time, (each set of harmonics on its own pick-up and combining bar 21c, 21c). The wires 49, 49 then lead them to the grids of the vacuum tubes V', V', that feed my harmonic controls 30—31, 30—31, as indicated in Figs. 1, 2, 21, and 24.

Long experience has shown me, however, that tones taken gradually, but nevertheless very rapidly and smoothly as by the condenser plates 12, 12, illustrated in Figs. 4, 5, and 6, when struck by piano hammers, produce much more pleasing effects on the ear than do piano tones, with their instantaneous, and by comparison, very sharp attack.

Since the generator grid circuit is always closed, and since under these circumstances no grid leak is necessary, the number of tones sounding cannot possibly effect the voltage of the generator grid circuit, or the power of the tones which at a given speed must always remain constant.

I have two makes and breaks in my tone circuits. The first, at the switchboard, is a positive mechanical contact; the second is an electrostatic transfer of energy in a variable condenser. Since my movable plates 12, 12 terminate in points almost as sharp as needles, and since when at rest they lie outside of the condenser 14, and since my switchboard switches close the circuit first and before the movable plates start to enter the condenser, no current can possibly pass until the points have started to enter the condenser. In other words, no tone can sound until the movable plates begin entering the condenser. It is, therefore, evident that if there is any infinitesimal shock to the circuit when the switchboard switch closes the circuit to the grid of the small vacuum tube v', it has died away, before the points of the movable plates begin to enter the condenser. Even if I were using current instead of voltage the transients would have died away before the sharp points of the movable plates would have started to enter the condenser, and so they could not produce any audible diaphragm cracks. It is, therefore, clear that I have no transients and so no diaphragm cracks when the circuits are made.

It does not seem necessary to elaborate the above. Since the action is, of course, exactly reversed when the tones are ended, the movable plates drop down out of the condenser, so decreasing the tone rapidly at first and in the smoothest and most beautiful way, until it dies away completely when the movable plates have fallen entirely out of the condenser, after which the switchboard switches open and break the circuits of the grids of the vacuum tubes V', V'. It is just as impossible to have any real diaphragm cracks when my tones are ended and the circuits are broken as it is to have any when the circuits are made and tones are taken.

I have indicated in Figs. 46, 46A and 46B a mechanism which takes the place of the dampers on the piano. It does all they do and much more besides. It illustrates a circuit which has two magnets in series and also has two breaks in itself. There is a working magnet 46a and a holding magnet 46b, and a circuit with two breaks in it for every key of the instrument. I provide this mechanism since piano music is at times of very great rapidity. In these cases the tone-controlling cylinders would not have allowed the movable plates to drop all the way out of the condensers before the keys were released, and so there might be diaphragm cracks on what was left of the tones. In such an event the playing of rapid piano music would be unacceptable. The diaphragm cracks would be ruinous to piano music if my tubes V, V were omitted, and current was handled intsead of voltage. I have therefore provided this means of ending the tones rapidly and most smooth, whatever way of working is used. This mechanism in my instrument takes the place of the dampers of the piano. It is far superior to the piano, however, since when the dampers fall upon the strings, the vibrating strings hit them with considerable force and produce noises which are far from musical, and they are distinctly audible and detract from the beauty of the music. It is thought, however, that the amount of voltage or current broken at any individual switch due to the use of my tubes V, V is so small that there cannot be any diaphragm cracks under any circumstances whatever. The same remarks apply to the various mechanisms shown for the loud pedal. It is thought that they are entirely unnecessary, but out of caution I have provided them, and they can be used if it is found necessary to do so. In my instrument when desired the tones can by these means be made to drop rapidly, smoothly, and with the utmost beauty, and absolutely without any extraneous or non-musical sounds.

When the piano is being played by a good musician the damper pedal is used in many compositions on an average of once every second and a half, or two seconds. When the pedal is released, there are many tones sounding—anywhere from five to possibly twenty or more. If I were handling current instead of voltage, and if all of these tones were broken at the switchboards, without the use of my tubes as explained above, the diaphragm cracks would not be cracks, but crashes, and the hardness of these crashes would be rendered all the more unbearable by the beauty of the music between them, but since I have no cracks or crashes, the music is as beautiful when the pedal is released as at any other time, being very beautiful all the time.

Furthermore, to be certain that the breaking of the tones when the loud pedal is released, shall be perfectly smooth, and without any diaphragm cracks, I have cut the front bar 22c, of the frame 22 at an angle, as shown in Figs. 39 and 40. That is to say one end is higher than the other, being above the horizontal and so the latches 22k, 22k, normally stand out different distances from the notched blades 21¹, 21¹. When the pedal is depressed, it goes down far enough to allow all the latches 22k, 22k to touch the upwardly extending notched blades 21¹, 21¹. When any key at the keyboard is depressed, the notched blade 21¹ rises a short distance, and its latch 22k slips in and engages it and holds the spring-carrying bar 21i in its up position, so that the circuits of that note are closed and held closed, even after the key has been released. When the pedal is released, the front bar 22c, of the frame 22, rises under the weighted arms 22¹, 22¹ of the bell cranks, and successively pulls all the downwardly extending notched arms 22k, 22k from the ferrules 21¹, 21¹. It will be seen that these latches are not all released at the same instant, but that they are released successively, and very rapidly, so that if there are any slight microscopic disturbances from breaking the circuits, they will not all come at the same instant, but successively, though very rapidly. It is true that on an electrical musical instrument, where there is a considerable diaphragm crack, staccato music is greatly damaged and completely loses its charm. But, if one or more tones are sounding, when the circuits of the other tones are broken, the resulting diaphragm crack of the staccato music is almost completely masked, and the effect is very much more pleasing to the ear. To state it tersely, any tone that is sounding tends to mask, largely obliterate, the diaphragm crack of other tones of nearly the same intensity. I utilize this principle since ordinarily there would be a number of tones, perhaps ten, fifteen, or twenty, in different stages of drop, or decay, sounding when the loud pedal is released. It will therefore be seen, that if they are broken successively, any slight microscopic effect, if indeed I have any at all, due to the break will be masked by the other tones that are still sounding, and whose volume is many thousands of times as great, as any possible disturbances from breaking the circuits at the switchboards. This breaking process goes on very rapidly until at last there is only one tone sounding which is broken by itself. Since the time of the duration of the surge of current or transients due to the breaking of the circuit is exceedingly short, only a few cycles in duration, each one will have died out before the next is broken, even if they are all broken with very great rapidity.

To be absolutely sure that there shall be no shocks to the circuits, no surges, no transients, and therefore no diaphragm cracks of even the slightest or most microscopic degree, when the tones are broken by the loud or damper pedal, I have contrived another safety means. It is an automatic electrical device for opening all the inlet valves of my tone-controlling cylinders as soon as the pedal starts to return to its normal or up position. This allows all the movable condenser plates to instantly snap out of the condensers under both the influence of gravity and the much greater pull of their returning springs. It may be done in different ways, one example is illustrated in Figs. 43 and 44. Briefly stated, it consists in an electrical circuit in which there are two pairs of contact points, and a magnet. When the pedal is in its normal or up position, while it is going down, and while it is held down, one or the other contacts is always broken, but just as soon as the pedal starts to rise, both contacts are closed and the magnet acts. The magnet 19i is attached to the frame 19, and when it acts, it pulls the frame upwards. The frame 19 at its rear end, carries wires 19d, 19d, which rest immediately under the inlet valves 17c, 17c, or 17c', 17c' of the tone-controlling cylinders 17, 17. The action of the quick acting magnet 19i opens all the large inlet valves of the tone-controlling cylinders, and so the plungers 17a, 17a drop to the bottom almost instantly. This allows all the movable condenser plates, which are attached to the plungers by the wires 17d, 17d to snap out of the tone-controlling cylinders very fast under both the pull of gravity, and the very much greater pull of their returning springs 10c, 10c.

The arm 22e of the frame 22 carries a contact point 22t near its upper end. This contact, when the pedal is in its normal or up position, rests on a segment of insulation 22r. This segment also carries a live segment of contact material 22s. Just after the pedal starts down, the contact 22t slides on to the contact 22s, but no current can pass, since the pawl 22p has picked up the spring 22q, and so broken the contact with 22q'. The two arcs, that of the arm 22o, and that of the spring 22q, are working in opposite directions, and the proportions are such, that just as the contact 22t slides off the contact 22s, on to the insulation 22r, the pawl 22p will have withdrawn from under the spring 22q, allowing it to snap back into contact with 22q'. While this is happening, the contact 22t will have slid off the segmental contact 22s on to the insulation 22r for a short distance, where it rests until the pedal starts upward. When the pedal starts up, the contact 22t slides on to the contact 22s. Since contact has already been established between 22q and 22q', current flows immediately through the magnet 19i, and the frame 19 snaps upward opening all the large inlet valves of the tone-controlling cylinders 17, 17, and holds them open until the pedal has almost reached the top, when the contact 22t again slides on to the insulated segment 22r. Meanwhile, when the pedal has nearly reached the top, the pawl 22p, which moves lightly sideways, on a vertical axis, and whose side next to the spring is cut at an angle, has struck the side of the insulation on the spring, and been thrown sidewise by it. This allows it to clear the insulation and drop below it. A light spring then throws the pawl underneath the insulation on the spring, so that it will be ready to lift the spring just as soon as the pedal starts down again, and so open the contacts 22q, 22q', before contacts 22s and 22t can close. The spring 22q does not snap off the pawl 22p until just after the contact 22t has left the contact 22s, when the pedal has nearly reached the bottom. In this way, no circuit can ever be made through the magnet 19i, while the pedal is going down, but only while it is coming up. It will be seen from Fig. 44, that with this mechanism, the pedal bar 22c goes down much farther than it does in Fig. 39. This makes its return slower, and since the movements of the foot are not nearly so fast as those of the hand, it leaves plenty of time for the movable plates to snap out of the condensers. Even if there should ever be any rare cases, which it is believed there will not be, where the movable plates will not have withdrawn entirely from the condensers, it will make very little difference, since the areas of the plates increase in a logarithmic ratio as they enter the condensers, and so the areas of their sharp points as they withdraw are quite negligible.

In Figs. 45, 45A, 45B and 45C, I have indicated somewhat similar mechanism which carries this device a step farther. The circuit with its double breaks remains largely the same as in Fig. 43. I have however inserted a holding magnet 22v in the circuit in series with the magnet 19i, and I have placed a small armature on the end of spring 22q, and I have omitted the pawl 22p, and have substituted the arm 22o', with the necessary adjustments of the double arcs omitted. When the loud or damper pedal has gone down, almost to the bottom and is traveling fast, the arm 22o' which is fast on the rod 22a, presses the spring 22q' into contact with the spring 22q, just after the contact 22t slides off the contact segment 22s. When the pedal starts up, moving slowly, the instant the contact 22t and the live segment 22s, touch, the holding magnet 22v holds the armature, which is already in contact with it, and continues to hold it and so maintains contact between 22q and 22q' until the movable contact is broken by 22t sliding off of 22s, when all the parts return to their normal positions. The holding magnet 22v is an additional factor of safety.

Fig. 45 illustrates the parts in their normal or pedal up position.

Fig. 45A shows them when the pedal is nearing the bottom and just before the arm 22o' closes the contacts at 22q and 22q'.

Fig. 45B shows their positions when the pedal is all the way down with the armature in contact with the magnet and the contact springs bent upward.

Fig. 45C shows their positions when the pedal has nearly reached the top. It will be seen that the holding magnet 22v is still holding, and will continue to hold the spring contacts closed until the contact 22t slides off the live segment 22s and so breaks the circuit. These various devices of mine make transients and diaphragm cracks an absolute impossibility.

The transients which produce diaphragm cracks are a great many times stronger than the tones themselves after the transients have subsided. Since they are the result of arcs and shocks to the circuits, they produce totally foreign and disagreeable noises and not musical tones. They are a great offence to the ears of listeners and practically ruin any fine musical result. In electrical musical instruments where the tones are initiated and ended by making and breaking circuits, there is one crack at the beginning, and another crack at the end of every tone. Thus every tone begins and ends with, by comparison, a loud noise, which though of very short duration is many times louder than the tone itself. This produces a very disagreeable result and is the reason why these instruments can play slow music which at times, if the music is slow enough, may sound quite beautiful, but they cannot possibly play fast music acceptably, because on the fast music the proportion of diaphragm crack or harsh noise to good tone has increased to the point where it takes all the joy out of the music and makes many people so nervous that they will not listen to it. To my mind this is the greatest defect of these instruments. If they were to endeavor to play fast piano music the result would be tragic, and the audience would file out very quickly. I know that properly created and blended electrical musical tones are the best tones in the world, and that I have controlled them by the mechanisms shown in the drawings and described in the specification, with a delicacy and perfection which cannot be equalled by any musical instrument now in the world.

The electric music trade has found it convenient to call these noises "key thumps." This is a false name. They are not key thumps. The key has nothing to do with it except as it closes or opens the circuit. In reality they are diaphragm cracks.

Other electrical musical instruments have another very bad fault, besides diaphragm crack, and that is the instantaneous taking and dropping of their tones. This is something entirely new in the musical world. The tones of all other musical instruments are initiated and ended more or less gradually, and so they do not shock the ear. Piano tunes are initiated rather rapidly with a percussive effect, and rise to their maximum power in varying degrees of time according to their pitch, and the make of the piano. This time is about one one-hundredth of a second for the highest tones, three one-hundredths for the middle C register and about eight to ten one-hundredths or more accordingly to the piano for the lowest tones. Other instruments take different degrees of time. The large brass and woodwind instruments initiate their tones quite slowly, and the pipe organ is the slowest of all. The initation of the lower tones of the pipe organ is distressingly slow, and is a great strain on the organist, whose left hand has to play its tones slightly before his right hand plays its tones, if they are to sound at anything like the same time. The organist's problem is made doubly difficult by the fact that each tone as he goes down the scale responds slower than the last. If he plays an octave with his left hand, his little finger must go down slightly before his thumb, and they must both be depressed before his right hand is, and his feet on the pedals must keep still another time, if his tones are all to come in at the same time. On the other hand, an electrical circuit is made instantly in a fraction of a thousandth of a second, when the two contacts touch, and the tone is on immediately with a diaphragm crack which is many times the tone's maximum power. It does not grow gradually as other tones do, and it is broken in the same instantaneous manner with another crack or noise which is many times as loud as the tone was. Making and cutting tones off in this too sudden manner is a shock to our ears, which are not accustomed to hearing tones initiated and dropped instantly. I have entirely removed these faults by the methods herein described, and particularly by the use of my tubes V, V, and my logarithmically shaped variable condenser plates. It is, therefore, clear, that diaphragm crack is not the only bad fault, which must be removed and which I have removed, before electrically created music will become the finest music in the world, as by rights it should be.

It will be seen from the foregoing that I have provided seven different means for completely preventing any transients in my tone producing circuits, and so have completely eliminated every trace of diaphragm cracks, which are the greatest enemies of electrical musical instruments. It will also be seen that I have completely removed the shockingly sudden onset and ending of the tones due to making and breaking the circuits directly and have substituted therefor the most gorgeously smooth and velvety introduction, control and ending of the tones, by my specially shaped condenser plates. If any diaphragm cracks are present in an instrument, it is utterly impossible to play the rapid music of the piano acceptably. These different means have been explained in column 2, lines 15 to 55, and column 3, lines 5 to 45. It is certainly not necessary to use them all. Probably only one or two of them at the most are all that is necessary for perfect results. It is almost certain that the shaped movable plates of column 3, lines 35 to 40, and 50 to 55, and the two breaks in the circuits of column 3, lines 8 to 13, are a perfect answer. Whatever is necessary may be used, and what is not necessary may be left out.

Long experience over the years has convinced me that my method of introducing my tones from nothing to a maximum gradually and smoothly but very rapidly, as explained in column 2, lines 35 to 55, and column 3, lines 1 and 2, is vastly superior to any other method, now known in the world. It may sound to the musicians like sacrilege, but numerous people who have been accustomed for some time to hearing Cahill electrical tones so initiated and ended, have found the sharp attack of the piano unpleasant, and almost irritating. In fact they did not enjoy the piano again until they ceased to hear Cahill music, and as time passed they again gradually became accustomed to the piano once more. This in some cases took considerable time. My method of handling the tones introduces and drops them fast enough for the fastest music, and yet it does so with the utmost smoothness and delicate beauty. Also the time of introducing my tones is exactly the same for every tone on the instrument, from the lowest to the highest.

By inserting the tubes V, V, in the circuits of my generators 45, 45, see Figs. 1 and 2, I have made it possible, first, to feed through my voicing means and switchboards, only the infinitesimal amount of current necessary to charge the grids of the vacuum tubes V', V', and this second amplification raises the voltage of the generators to a point where condensers of reasonable sizes can be used in my harmonic controls 30—31, 30—31, and, second, which is of even more importance to the music, since they are perfect one-way valves and the current must always flow from grid to plate, there cannot be any interactions between the combining bus bars of the switchboard. If these tubes were omitted, as they might be in a cheap instrument, there would be interactions with their consequent weakening of the music and damage to its clarity.

*My accurate control of harmonics so as to produce the tone quality of practically any musical sound and all manner of new sounds*

It is a well-known scientific fact that any good and rich musical tone has to have harmonics in it. That is to say, the ear does not find any tone, no matter how pure the vibrations may be, interesting. A pure sinusoidal wave makes a perfectly smooth tone. This tone, however, is rather sad and uninteresting. Good musical tones usually contain several harmonics, that is, vibrations whose frequencies are as $n$, $2n$, $3n$, $4n$, $5n$, $6n$, etc. The quality of the tone depends upon the number of harmonics entering into it, and upon their relative strengths. Usually the more harmonics the tone contains, the brighter, richer, and more interesting it is. Sometimes even a slight variation of a single harmonic will change the quality of the tone widely. It is, therefore, impossible to have any scientific or accurate powers of creating tones, which do not permit each harmonic to be changed very accurately. If one has this accurate control of each harmonic set, practically any known musical tone can be quickly produced. Simply throwing the harmonics in in large chunks, such as $12\frac{1}{2}\%$, as some of the leading instruments on the market do, can never produce good or complete tone building. It is, therefore, necessary to have an accurate and easy control of these harmonics for the best results. I provide such controls.

By my switchboards, I pick up all the tones of any set of harmonics that are sounding at the same time (each set of harmonics on its own pick-up and combining bar 21c) and lead them to the grids of the vaccum tubes V', V' that feed my harmonic controls, as indicated in Figs. 1, 2 and 3. These tubes amplify the current again, and so raise the voltage to a point where condensers of reasonable size can be used in my harmonic controls.

It will be seen by referring to Figs. 21 and 24 that the plates 30, 30 and 31, 31 are a double acting variable condenser, both of whose plates (the upper set and the lower set) are movable by very accurate amounts. The upper plates may be moved either up or down by turning the dial 33b, which is fast on the rod 33a and which carries a worm 33 fast on its rear end. This worm engages with a segment of a worm wheel 31b carried by the arm 31a. The lower plates 30, 30 may be thrown up to very accurate amounts by depressing a tablet 35b. Since both the upper and the lower plates are movable by accurate amounts, it is possible (a) to create or recreate any desired quality of musical tone by turning the dials 33b, 33b, (b) to accurately create numerous beautiful pre-set tone qualities, any one of which may be produced instantly by depressing its tablet 35b, and (c) to alter quickly the tone quality of any pre-set tone widely by turning one or more of the dials 33b, 33b.

It is evident that the musician can by turning the dials 33b, 33b throw the plates 31, 31 down more or less over the plates 30, 30 by very accurate amounts. In this way he can build up a simple endless variety of tone qualities. He can easily recreate any of our present musical tone qualities and also create all manner of new tone qualities. When he experiments and produces a particularly beautiful tone, he should name it and write down the harmonics used and the numbers on each of the dials in use and put it on file. In this way, he will have it instantly available for future use.

My dials, as indicated in Fig. 34, are somewhat similar to radio dials. However, instead of being numbered from zero all the way around to 100, I number them both ways from zero, that is, one set of plus numbers goes half-way around the dial in one direction, and one set of minus numbers goes half-way around the dial in the opposite direction. Turning pluswards strengthens the tone, while turning minuswards weakens it. The dials 33b, 33b are normally set at zero. If any tablet 35b is depressed, some of the condenser plates 30, 30 will be thrown up into the condensers 31, 31 in varying degrees. If the musician wishes to change any pre-set combination of tone he can easily and almost instantly do so, and without any break in the music by turning one or more dials 33b, 33b. If it is desired to weaken any harmonic, turning its dial minuswards will raise the condenser 31 and so weaken that harmonic. Turning the dial pluswards will throw the condenser 31 down more over the plate 30, and so will strengthen that harmonic. Any change in a harmonic will make a corresponding change in the quality or color of that combination.

For making pre-set tones, I provide means such as the frames 34 or the strips 36 of Figs. 21, 22, 23, 24 and 25, for instantly producing the proper combination of harmonics, each harmonic of the exact strentgh required to create a number of musically beautiful and useful tones. These combinations are set at the factory, and the musician can produce any of them instantly at any time merely by the act of touching a tablet 35b. By cutting the steps 34c', 34c', or 36c', 36c', accurately to different heights, each harmonic can be introduced to a fraction of a per cent of the desired amount, and so it is easy to produce the exact quality of any good musical tone instantly. There are nine of these pre-set combinations in the chosen example available to the musician on each keyboard while he plays, and so he has eighteen different qualities of tone for instant use which he can blend or contrast as he wishes. My condenser plate 30 is the one that is moved in these cases. It will be noted that it is specially shaped, so as to transfer rapidly increasing amounts of electrical energy, with each additional increment of motion. This is necessary since the increasing amount of power required by the ear to produce the effect of a gradually and uniformly increasing volume of sound is a logarithmic one.

It will be seen by reference to Figs. 21 and 24 that the lower shaped condenser plates 30, 30, carried by the arms 30a, 30a all normally lie in a straight line on the stop 37a. The sharp tips of these plates 30, 30, when no tablet 35b is depressed, lie just underneath the plates 31, 31 when they are in their normal or zero dial position. The downward extension 34d on a strip 34c is normally touching its lever 35, which is raised by depressing its tablet 35b. If any step 34c' is high enough so that it is touching an arm 30a, that condenser plate will be thrown all the way up into the condenser 31 when its tablet 35b is depressed, and that harmonic will be introduced into the tone 100%. If some harmonic is not wanted in the tone, which that particular tablet represents, there is no step 34c' on the strip 34c for it, and it remains at rest on the stop 37a, and so its harmonic is not introduced into the tone. By cutting the steps 34c', 34c' for the harmonics desired in the tonal combination to the proper heights, any harmonic desired can be introduced anywhere from 1 to 100%, and so any tone desired can be built up accurately out of its harmonic elements, since each of them can be introduced into the tone with the greatest of accuracy. Any pre-set tone can be introduced instantly merely by touching a tablet 35b, which will throw up the condenser plates 30, 30, each of which represents a harmonic series, the exact distances necessary to produce each harmonic with just the strength necessary to blend them into the tone desired. A tablet when depressed is held down by the latch 35b, until some other tablet is depressed, which releases it, or else it is released by depressing the releasing tablet. The arms 30a and 31a are mounted on the rod 32. Their rear ends slide up and down between guiding partitions in the frame 37, the upper part of which is broken away in the drawing, but which is of sufficient height, so that when a condenser plate 31 is in its highest position, there will be the proper clearance between it and the point of the plate 30, when that plate is in its highest position.

When it is desired to introduce a particular harmonic, or to change its strength in some pre-set combination, the act of turning its dial 33b will move its condenser plate 31 to the exact position required. Referring to Fig. 34, the act of turning a dial minuswards moves the plate up and so weakens the harmonic, while turning it pluswards moves it down, which covers more of the plate 30 and so strengthens the harmonic. This gives me a micromatic control over the power of each harmonic, and therefore the ability to change the quality of any pre-set combination almost instantly, as well as the power to produce or reproduce accurately any desired tone color.

When any tablet 35b is down, the musician can almost instantly change the quality of the tone very widely by turning one or more of the dials 33b, 33b either forward or backward more or less, so throwing the condenser plate 31 down further, which will strengthen that harmonic, or else raising it up further which will decrease the transferring area and so weaken that harmonic, thus changing the quality of the tone. It is, therefore evident that in the chosen example the musician starts with nine distinct qualities of tone on each manual, any one of which he can change into many other qualities almost instantly by turning one or more of the dials 33b, 33b to predetermined numbers. In fact, due to my delicate and accurate control of the harmonics, the number of tone colors possible is limitless.

Piano music is very much faster and the length of the tones is very much shorter than is organ music. In an electrical musical instrument when playing like the piano, there are no soft felt dampers to drop upon the vibrating strings when the keys are released. Instead the circuits usually have to be broken at the switchboard, since the movable plate would not have had time to drop completely out of the condensers. If there were diaphragm cracks on these tones, which are probably nineteen twentieths of those sounded, the results would be impossible, and the instrument would sound more like a calliope than a piano. If I were breaking in my instrument the current from my generators instead of that amount of voltage necessary to swing the grid of a small vacuum tube, possibly one milliampere, I would have such diaphragm cracks or key thumps, whenever keys on the keyboard were released while the tones were still sounding—before the plates 12, 12 or 12", 12" had dropped back completely out of the condenser, which would necessitate breaking the tones (circuits) at the switchboard or whenever the pedal was released, as to totally ruin the music, and make the playing of piano music impossible.

When a key is depressed on the piano, the hammer is thrown against the string and the tone begins to sound, and rapidly to die away. When the key is released, the felted damper drops upon the string and rapidly damps its vibrations. It will therefore be seen that the tone thus dies away very fast, but fairly smoothly, that is without much extraneous noise such as the diaphragm crack or key thump of other electrical musical instruments when the circuits are broken. There is, however, a fuzzy sound when the felt of the damper falls upon the vibrating string, whose vibrations throw it off, and it rebounds and is hit up again several times by the vibrations of the string before the damper has succeeded in damping them completely. In an electrical musical instrument, when playing like the piano and using the loud or damper pedal, however, these tones heretofore have been ended abruptly and instantly by breaking the electrical circuits somewhere, usually at the switchboard, which produces a very disagreeable diaphragm crack or key thump when current, instead of voltage, is broken. Diaphragm crack is not the only bad result of cutting electrically produced tones off instantly. All sounds from other musical instruments are terminated more or less gradually. Even neglecting the diaphragm crack, the abrupt and instantaneous ending of electrically produced sounds is a shock to the ear. It is true that all tones taken on the piano drop or decay rapidly. The same is true on my instrument, due to my tone-controlling cylinders. It is also true, that on the piano when playing rapidly and using the damper, or loud pedal, many tones are sounding at the same time, in different stages of decay, some of which are cut off abruptly, almost as soon as they are taken, at almost maximum power. When it is considered that in many musical compositions the loud pedal is used on an average every second and a half, or two seconds, and that there may be anywhere from five to twenty tones sounding whose circuits must be broken when the loud pedal is released, it is evident that a diaphragm crack or key thump on every tone sounding in these cases due to the use of amperage from the generator, instead of only voltage from a tube to another small tube would completely ruin the music, and in fact would render it almost unbearable. I have overcome this difficulty by having my switches break, not the current, the amperage coming from the generator, but instead break only the voltage coming from the plate of my tube V, and passing through the switchboards to the grid of the tube V'. Instead of breaking the amount of amperage coming from the generators that is necessary to operate the combining and output transformer, with its iron core, and many thousands of turns of wire, as some of the leading instruments on the market do, I break only the microscopic amount of voltage which is necessary to charge the grid of a small vacuum tube, a very infinitesimal amount indeed. Thus while I cut the tones off very rapidly, I cut them off beautifully and smoothly, and completely eliminate any extraneous noises such as diaphragm cracks or the string and damper noises of the piano.

Furthermore, the loud or damper pedal, which is used very frequently, almost incessantly in some music, when playing on the piano, has to be produced in an electrical musical instrument by breaking the current at some point, preferably at the switchboards, instead of by dropping felted dampers on vibrating strings. Since in these cases there are usually a large number of tones sounding, the beautiful effect of the chords or arpeggios would be utterly ruined by the loud diaphragm crashes or key thumps, which would occur every time they were all broken instantly by releasing the pedal. When one considers that in many beautiful piano pieces the damper pedal is used almost incessantly on an average every second, second and a half or two seconds, it is easy to see how ruinous these crashes would be. I have completely eliminated them by the method above described by breaking only microscopic amounts of voltage.

Furthermore, to be certain that the break when the loud pedal is released shall be perfectly smooth, I have cut the front bar 22c of the frame 22 at angle, as shown in Figs. 39 and 40. That is to say, one end, preferably the treble, is higher than the other, being above the horizontal, and so the latches 22k, 22k, normally stand out different distances from the notched blades 21', 21'. When the pedal is depressed, it goes down far enough to allow all the latches 22k, 22k to touch the upwardly extending notched blades 21', 21'. When any key at the keyboard is depressed, the notched blade 21' rises a short distance, and its latch 22k slips in and engages it and holds the spring-carrying bar 21t in its up position, so that the circuits of that note are closed and held closed, even after the key has been released. When the pedal is released, the front bar 22c of the frame 22 rises under the weighted arms 22', 22' of the bell cranks and successively pulls all the downwardly extending notched arms 22k, 22k from the ferrules 21', 21'. It will be seen that these latches are not all released at the same instant but that they are released successively, and very rapidly, so that if there are any slight microscopic disturbances from breaking the circuits, they will not all come at the same instant, but successively, though very rapidly. It is true that on an electrical musical instrument, where there is a considerable diaphragm crack, staccato music is greatly damaged and completely loses its charm. But, if one or more tones are sounding when the circuits of the staccato tones are broken, the resulting diaphragm crack or key thump of the staccato music is almost completely masked, and the effect is very much more pleasing to the ear. To state it tersely, any tone that is sounding tends to mask and partially obliterate the diaphragm crack or key thump of other tones of nearly the same intensity. I utilize this principle since ordinarily there would be a number of tones, perhaps ten, fifteen or twenty, in different stages of drop or decay, sounding when the loud pedal is released. It will, therefore, be seen that if they are broken successively, any slight microscopic effect, if indeed I have any at all, due to the break, will be practically masked by the other tones that are still sounding, and whose volume is many thousands of times as great as any possible disturbances from breaking the circuits at the switchboards. This breaking process goes on very rapidly until at last there is only one tone sounding, which is broken by itself. Since the time of duration of the surge of current or transients due to the breaking of the circuit is exceedingly short, perhaps one five thousandth of a second, each one will have died out before the next is broken, even if they are all broken with very great rapidity.

By inserting the tubes V', V' in the lines coming from my switchboards and leading to my harmonic controls, I have made it possible to feed through my switchboards only the amount of voltage necessary to charge the grids of the vacuum tubes V', V', and this second amplification raises the voltage to a point where condensers of reasonable sizes can be used in my harmonic controls.

The plates of these tubes then feed my sensitive harmonic control means, such for instance as variable condensers 30—31, 30—31, as indicated in Figs. 21, 22, 23, 24 and 25, or variable resistances, as illustrated in Figs. 26, 27 and 28, or variable impedances, made up of individual units of varying impedance 41a, 41a, either in series or in parallel, which are controlled by the sliding contact 44, (see Fig. 36) or variable condensers made up of individual units, of varying capacities 42', 42', Fig. 29, either in series or parallel, which are controlled by the sliding contact 44. All four of these mechanisms govern the exact power which each harmonic shall contribute to the strength of the resulting tone, and therefore the precise quality of that tone. In all of these cases, Figs. 26, 27, 28, 29 and 36, the controls may be used both for voicing the tones by setting the contacts 40e or 44 at the right spot and for controlling the power of the harmonic as well.

I then combine all the currents coming from my harmonic controls in any approved way, as for instance in vacuum tubes V2 (see Figs. 1 and 2) or in multiple plate condensers which have a separate transferring plate 14a, 14b, 14c, 14d, 14e, 14f and 14g for each set of harmonics (see Fig. 20) and one common pick-up plate 12' on which they are all combined; or I may, as indicated in Fig. 35, combine them in transformers which have a primary winding for each set of harmonics, and one secondary winding for combining these various harmonic elements into more complex waves, and therefore richer and more beautiful tones.

I then lead the resulting complex current coming from my combining means (the plate of the combining tube V2, or the combining plate of the condenser 12', or the secondary of the transformer) to the grid of another tube V3 for greater amplification.

The very complex current coming from the plate of this last tube V3, is fed through a common lead 51 to the small variable condensers 12, 12 or 12", 12", operated by the individual keys of the keyboard. These are the final condensers which govern the expression of the tones, with the utmost delicacy at all times while they are sounding. By the various steps of amplification before mentioned, I have raised my voltage high enough so that the condensers which the keys of the keyboard operate can be quite small and light.

From these key-controlled variable condensers, the current goes to the amplifier 53, where it is amplified.

From the amplifier 53, the current goes to another sensitive control 54 for hand, foot or knee operation. The combination of these two very delicate controls, those operated by the keys of the keyboard, and this equally delicate second control for micromatic action, throw open to the musician totally new and remarkably beautiful possibilities of expression in music.

From the micromatic control, the current then goes to the translating devices 55, 55, which turn the electrical waves into corresponding sound waves or music.

It is exceedingly difficult to run very rapid scales or arpeggios and other rapid passage work very softly on the piano. It is one of the things which on the piano takes years of practice to accomplish. Unless the touch is perfectly even, some tones will be much too loud and will stand out above the rest, while others will drop out altogether. In some of this work, the hammers are just to touch or caress the strings; and if the touch is not perfectly uniform, some will be too loud and some may even drop out altogether. With the micromatic control, which I obtain through my soft or una corda pedal 54, the total volume of sound may be cut down to a mere thread, and the keys put down hard. No matter how hard they are put down, the amount of electricity which the control allows to pass-through will be just sufficient to produce the slightly audible effect desired. My soft pedal, which cuts the tone down through a thousand imperceptible changes, simplifies piano technique greatly, not only in this respect, but in many other ways. It also introduces totally new powers of expression, and therefore new effects in music, particularly on the piano, which musicians will not be slow to utilize. It is also of very great value to musicians when using the pressure touch, for it enables them to play like the orchestral instruments much more easily than they could without it. With it playing like or better than the orchestral instruments, it becomes a very simple matter.

Since my movable plates are very small and light, I have found it advisable and convenient to mount and carry both types in the same insulating carrier 12a, best shown in Figs. 4, 30, and 32.

For certain types of music, and particularly when it is desired to play like a piano, I use a piano action actuated by the keys of a piano keyboard, as indicated in Figs. 2 and 3. The hammers 26a, 26a, of this action strike the fly lever 10, 10 which are attached to plate holders 12a, 12a, which carry the movable plate or plates 12, 12, and 12", 12", of small variable condensers, and so throw the movable plates more or less into the condensers 14, 14, in exact proportion to the power of the touch on the keys, and so govern the power or loudness of each individual tone with the utmost delicacy.

In the mechanism illustrated in the drawings, I have for greater structural convenience inserted a fly lever 10, between the piano hammer 26a, and a movable condenser plate carrier 12a, as indicated in Figs. 2, 3, 3a, 4 and 30. The lower end of the wire 17d is fast in the plunger 17a, and its upper end is fast to the elliptical plate 17f. The lower end of the guide wire 17f' is also fast to the elliptical piece 17f, and the upper end of this guide wire slides through a guiding bushing 17e, which is fast in the shield 15, and the insulation 16 of my variable condenser 14. The lever 10, and the elliptical piece 17f, are joined by a pin 10b, and since said pin oscillates around the center 10a, the felted slot in the elliptical piece 17f is elongated to make up for the slightly back and forth motion of the pin 10b, due to its arc motion. Thus the movable plates always move up and down in a straight line. A felt or leather piece 10f is inserted in the fly lever 10 to take the most of the shock off the pin 10b. The carrier 12a, is firmly held to the wire 17d' by the projecting rings on same, around which the carrier is cast or molded.

At times, and particularly when it is desired to play like the piano, or the percussion instruments, some mechanism is necessary to control the time of the return of my movable variable condenser plates, and so the length of the drop, or decay, and the envelope of the tone. I, therefore, use my tone-controlling cylinders with their numerous exhaust ports, and exhaust port-controlling slides to accomplish these results, and so as indicated in Figs. 2, 3, 10, 37 and 38, I connect my movable circuits 12, 12 and 12'', 12'', to tone-controlling cylinder plungers 17a, 17a, working in their cylinders 17, 17, so as to regulate the speed of their return movement in anyway desired. I thus automatically control the drop or decay of the tone accurately, and within wide limits, as to the character of the decay, and the time it shall occupy. This gives me complete control over the envelope of the tone as it dies away.

Besides the large main inlet valve 17c, or 17c', for admitting air or fluid easily and quickly to my tone-controlling cylinders 17, 17, I have a row of small holes or exhaust ports, or rows of small holes or exhaust ports 17n, 17n, down the side, or sides of my tone-controlling cylinders, which the plunger 17a covers or closes automatically on its return movement. By using a sufficient number of exhaust ports, say fifteen in each set, and by properly proportioning the sizes and spacings of these ports, I can easily control automatically the envelope, or the character and the time of the decay, or dying away of the sound, to almost any extent desired.

It is very desirable not only to produce the characteristic, logarithmic drop of the piano, but also the characteristic drops of other instruments. It is also most desirable, and vitally important for the production of new musical effects to be able to control these drops within wide limits.

By the use of a slide or exhaust port controlling valve 17g, which fits snugly to, and is held against the side of the cylinder 17, by the retaining guides 17h, 17h, and which slide moves more or less over these ports, and which itself has exactly corresponding ports 17p, 17p, the openings of my tone-controlling cylinder exhaust ports may be made anything from wide open to completely closed, and so the drop or decay of the tone may be easily controlled within very wide limts. It may be made much faster than that of the piano, which would make the tones short-lived, and so produce a very staccato effect, or it may be the same as the piano, or it may be very much slower than the piano, so sustaining the tone much longer than the piano does. This produces a much more singing tone, and so a more powerful instrument. These things so far as I am aware are new with me. They are entirely new and revolutionary powers in music.

By using two or more sets of exhaust ports 17n, 17n, and 17n', 17n', whose time constants differ, and their corresponding slides 17g, and 17g', whose ports may or may not correspond exactly in their sizes or spacings with the other sets of ports in my tone-controlling cylinders, the length of the tone as well as the rate and the time of the decay of the tone, and therefore the shape of the envelope may be made almost anything desired. This puts under the fingers of the musicians entirely new and very great powers for creating beautiful new effects, which they can and will use almost at once, since no additional technique is required. All that is necessary to do to make these changes in the time of the decay, or in the shape of the envelope of the tone is to turn dials at the keyboard more or less, or pull a stop or two. These slides are controlled from the console either by the act of turning a dial, or else by moving a stop.

As the tones go up the scale higher and higher, one set of slides and the corresponding cylinder ports should be so made as to shorten the life of the tones more and more just as the piano strings do. In this way, I preserve the exact balance between bass and treble of the piano, so that all existing piano music can be naturally and perfectly played. Another set of ports and their corresponding slides may have one size of exhaust ports from the top to the bottom. This would make an instrument in which the highest notes could be prolonged as long, if desired, as the lowest notes. This would give the effects of a totally new instrument, a much brighter and more cheerful instrument, since a strong treble always imparts brightness and cheer to the music, and one that would be able to produce many new and very meritorious results.

In Fig. 10 is shown one of the tone-controlling cylinders with two rows of ports at opposite sides thereof. The ports on the left-hand side are materially larger than those on the right-hand side, being, in the disclosed embodiment of the invention, about one-half larger in diameter than those at the right-hand side, making them each two and a quarter times the area of those on the right-hand side. This constitutes a marked improvement over the construction shown in Fig. 24 of my Patent No. 2,308,051, wherein only one row of ports is shown in the cylinder illustrated.

Fig. 51 is a wiring diagram illustrating one of my methods and mechanisms for making a very simple, cheap and meritorious instrument. I use twelve generators 45, 45, each of which creates one of the twelve tones of the octave, such as $c$, $c\#$, $d$, $d\#$, etc. Each of these generators, or a generator controlled tube V, feeds a succession of tubes and tuned circuits, each of which consists of a tube and an inductance, a capacitance and a resistance so arranged as to tune the tube sharply to bring out and amplify one of the harmonics that are in the original tone. In this way all the octaves of that tone which it is desired to use can be produced from the one generator merely by adding a tube and its tuning mechanism for each octave it is desired to use in the instrument. It is therefore clear that with only twelve generators and seventy-two tubes and their tuning controls I can produce the eighty-four tones of the piano. Where this system is used the generator 45, 45, should be so designed as to produce very complex waves, which will produce very rich tones when translated into sound. It is, of course, also clear that if tone buiding is desired, it is obtained merely by adding an extra tuned circuit for each of the harmonics desired, as $3n$, $5n$, etc.

I have so designed my instrument that the act of moving a handle 11p, Fig. 3, from one position to another effects a number of changes. Moved one way, it pulls the piano keyboard slightly forward and connects the capstan screws 3b, 3b with the piano action. It also allows the inlet valves 17c, 17c of my tone-controlling cylinders 17, 17 to close, and through the frame 11 puts tension on my set of springs 10c, 10c, which are used when playing like the piano, and it also releases the tension of the set of springs 10c', 10c'. Moving it in the opposite direction, shoves the keys of the keyboard underneath the push-ups 7, 7, so connecting the keys directly with the movable condenser plates 12, 12, so they both shall move as one. It also raises the rear bar 19a of the frame 19, whose wires 19d, 19d open, and hold open the inlet valves 17c, 17c of my tone-controlling cylinders 17, 17. It also releases the tension on the frame 11, which rises under the pull of its returning spring 11e, and it raises the rear bar 11a' of the frame 11', and so puts tension on the set of springs 10c', 10c', which are used when playing like the orchestral instruments or the pipe organ.

By inserting the tongues 23a, 23a, of my set of momentum pieces 23, 23, as indicated in Fig. 3, between the piano hammers and the movable plates, I transfer the blow of a hammer 26a, to a momentum piece 23, and through the momentum piece to a lever 10, and so to a movable condenser plate carrier 12a. The momentum piece being heavy stores up the power of the hammer blow in itself. It, therefore, starts up slowly but keeps on going till it has expended its stored up power. This action practically reverses that of the piano. Instead of the tone starting at maximum power and dying away gradually as the piano does, it will start at minimum power and gradually swell to a maximum, and then die away like the piano. It will, however, retain perfectly the delicate individual tone touch control of each tone of the piano, but the tones will sound in reverse. I have thus opened to the musicians a wide field of totally new powers in this direction also.

When the momentum pieces are being used, I materially decrease the tension on the returning springs 10c, 10c of my variable condenser plates. If I did not do so, the tones would not be nearly as loud as if the momentum pieces were not being used. This is due to the fact that the condenser plates are not struck up instantly, as in the piano, but are shoved up gradually, and so the pull of the springs is exerted over a longer time. This would prevent their going up as far as they would if the momentum pieces were not in use. The lighter spring tension compensates for this.

Fig. 52 is a diagrammatic view partly in section, showing a complete shielding means for an electrical musical instrument, or an electrostatic musical instrument. I have indicated a main shield at 15e which covers and shields all the electrically live parts of the instrument up to the amplifier or loud speaker, and so protects everything inside it from outside electrical disturbances. I have at 15f indicated a subsidiary shielding box or enclosure for shielding the generators 45, 45 and their tubes V, V with their appurtenant parts, another at 15g for shielding the voicing means and the switchboards, another at 15h for shielding the vacuum tubes VI, VI and their controls, another at 15j for shielding the harmonic control condensers 30 and 31, 30 and 31, and at 15k one for the key controlled condensers 12 and 14, 12 and 14. There should be partitions between individual units in these subordinate enclosures wherever necessary, as, for instance, between the generator units, the harmonic series control units and the key controlled variable condensers, etc.

Since the generators when properly designed and geared together will always remain in perfect tune with each other, and since the harmonics produced by the generators and amplified by the tubes must be in perfect tune with their fundamentals it is evident that all the tuning, which is of the greatest importance in music, is perfect in a sense that is absolutely impossible where tubes are used as generators.

*My electrical piano with its improvements over the piano*

If it is desired to play music on an electrical musical instrument, which shall sound exactly as the piano does, and which besides can create all manner of new and meritorious musical effects, many new things difficult to do and not done heretofore in the art are absolutely essential, some of which I will now specify, and then show how I accomplish, or provide these things, and many more besides.

It is necessary to have a perfect control of the power of every harmonic entering the tone, so that it can be introduced not in large chunks, but in microscopic amounts. In this way, the tone color of a piano, as well as that of any other musical instrument, whether gut string, woodwind, brass, percussion instruments, or pipe organ, can be produced easily and exactly, and also an endless variety of totally new tones. Moreover this wealth of new tones can be played upon with all the delicacy of expression of the piano and the bowed instruments and with an almost endless variety of new and meritorious musical effects never produced in the world before.

It is necessary to have the exceedingly delicate, sympathetic and responsive, individual tone, touch control, and powers of repetition, combined with the ability to play very rapid music, which the piano has, and this can only be produced by using a piano keyboard whose hammers strike my tone controlling devices in exact sympathy with the touch on the keys.

It is also necessary to produce a mechanism on which a given touch or pressure on a key will produce a like tonal response on both instruments. Merely using a piano action is by no means enough. Very much more besides is required. I provide the necessary means and mechanisms by which it can be done easily.

It is also necessary to have means for controlling the drop of the tones exactly, so that their duration and drop, or dying away shall be the same as that of a good piano—so that the envelopes of like tones on each of the two instruments shall be the same. This is easy on my instrument and I can easily provide a large variety of different tonal endings or envelopes.

Vastly greater power is required to produce loud effects on the piano, than is required to produce soft effects. I maintain this exact relation on my electrical musical instrument, so accurately that a pianist can produce good piano results the first time he sits down to it. I can also lighten the touch through wide limits.

It is also necessary to have the following.

A proper soft, or una corda pedal.
A proper bass or sustaining loud pedal.
A proper sustaining, or loud pedal.

I can easily introduce any harmonic to a fraction of a per cent of the desired amount, by turning a dial 33b, which controls the movement of a specially shaped movable variable condenser plate 30, shown in Figs. 2, 21, 22, 23, 24, and 25. This gives me complete control over the quality of the tones. It is a well-known fact, that the quality of the tone depends upon the number of harmonics composing it, and their relative strengths, but their relative strengths must be precisely proportioned and maintained exactly, since a little too much or too little of a harmonic at the critical point may change the quality of the tone widely. My method and mechanisms for changing the qualities of the tones by controlling the power of each harmonic series, is as follows.

It will be seen by reference to Figs. 21 and 24 that the lower shaped condenser plates 30, 30 all normally lie in a straight line on the stop 37a. It will also be seen that the upper condenser plates 31, 31, may be moved up or down by accurate amounts by turning the dials 33b, 33b, said dial 33b, being fast on the front end of its rod 33a, which also carries a worm 33, fast on its rear end. This worm meshes with a section of a worm wheel 31b, cut on a short arm on the lever 31a, carrying the condenser plate 31, which is also movable, by microscopic amounts. The arms 30a, and 31a, which carry the plates 30 and 31 are mounted on the rod 32. They slide up and down between guiding partitions in the frame 37, the upper part of which is broken away in the drawing, but which is of sufficient height, so that when a condenser plate 31 is in its highest position, there will be the proper clearance between it and the point of the plate 30, when that plate is in its highest position. When it is desired to introduce a particular harmonic, or to change its strength in some preset combination, the act of turning its dial 33b, will move its condenser plate 31 up or down, over or away from, the lower plate 30, whether that plate be in its highest or lowest position, to the exact position required. Referring to Fig. 34, the act of turning the dial one way, moves the plate up, and so weakens the harmonic, while turning it the other way, moves it down, which covers more of the plate 30, and so strengthens the harmonic. This gives me a micromatic control of the power of each harmonic, and therefore the ability to change the quality of any preset combination almost instantly as well as the power to produce or reproduce accurately any desired tone color.

I produce my delicate individual tone touch control of the piano by using a keyboard, whose keys 3, 3, and 3a, 3a, operate a piano action, whose hammers 26a, 26a, strike the fly levers 10, 10, and through them the specially shaped movable plates 12, 12, or 12'', 12'', of variable condensers, which they throw up into the condensers 14, 14, more or less in exact proportion to the power exerted by the fingers on the keys, and thus govern the power or loudness of each individual tone with the utmost delicacy. Or they may strike specially designed variable resistances whose resistance varies in a logarithmic manner.

The hammers 26a, 26a will be thrown against the movable condenser plates 12, 12, or 12'', 12'' with all the shadings of delicacy, or power with which they now hit the strings of pianos. These movable plates will be thrown up more or less in exact proportion to the power of the hammer blows, and so they will produce results corresponding exactly in power to the power of the tones of the piano, when its keys are struck with similar degrees of force.

When it is desired to play like the piano with the same logarithmic drop I connect my movable circuits 12, 12, or 12'', 12'', by wires 17d, 17d to plungers 17a, 17a working up and down in my tone-controlling cylinders 17, 17. I am thus able to control their return movement in any way desired. It is also most desirable, and vitally important for the production of new musical effects to be able to control these drops within wide limits. I can do this easily. These tone-controlling cylinders have one large inlet port 17c, for easily and quickly admitting air or fluid to the cylinder 17, on the up stroke, and rows of small exhaust ports 17n, 17n, and 17n', 17n' down their sides for venting the air or fluid from the cylinder, which the plunger automatically covers or closes, on its return movement. When the plunger is at the top of my tone-controlling cylinder 17, the exhaust ports 17n, 17n—desirably about fifteen in number—are all wide open and so the plunger under the influence of both gravity and the much greater pull of its returning spring 10c starts down very fast; but as it descends, it automatically closes first one exhaust port and then another and another, and so slows the drop or decay of the tone until they are all closed when the plunger reaches the bottom and the tone ceases. By using a sufficient number, say fifteen, of ports 17n, 17n, whose sizes and spacings apart have been accurately calculated, the drop of the tone may be made exactly like that of a good piano, or like almost any thing else desired, and the plunger in its return movement will automatically control the movable plate so as to produce the effects desired. In this way, fifteen ports in the chosen example are open at the top, then 14, then 13, then 12, then 11, then 10, and so on. Every port that the plunger passes reduces the area of the exhaust ports remaining open, and so the speed of the plunger by just so much. By using a sufficient number of ports, and by properly proportioning the sizes of the ports, and by spacing them properly, the speed of the drop of the plunger (whose position represents the power of the tone) and so the duration and the envelope of the tone may be controlled within very wide limits.

The use of my tone-controlling cylinders has many advantages and merits not mentioned above, which are not found in any other instrument so far as I am aware. I use one or more slide values or sections of tubes 17g, 17g and 17g', 17g', which fit snugly against the sides of the tone-controlling cylinders 17, 17, as indicated in Figs. 10, 37 and 38. These slides are drilled with holes or exhaust ports 17p, 17p, and 17p', 17p', whose spacing and sizes may or may not correspond exactly with the ports 17n, 17 n, or 17n', 17n' in my tone-controlling cylinders. The movement or position of these slides is easily controlled from the keyboard by turning dials 33b, 33b. By moving them, the exhaust ports of the tone-controlling cylinders may be of any area from wide open to completely closed. In this way, while still maintaining the general shape of the envelope of the tone, its duration or length may be very greatly changed. In fact, it may be made very short or of medium length, or several times as long as it is on the piano or whatever other length is desired. It is also possible, by the use of these slides to change the envelope as well as the duration of the tones very widely. The exhaust ports 17n, 17n, in both my tone-controlling cylinders 17, 17 and in one of the sets of slides 17g, 17g may be made so large that the tone will drop, if the ports are wide open, in a fraction of the time it does on the piano. This would make a far more staccato instrument. While when they are partly closed, the tone will last just as long as it does on a good grand piano, and when they are almost closed, the tone will sound a great deal longer than it does on any piano. This makes a much more powerful instrument than the piano. Another set of slides may be made, whose exhaust ports are of such a number, size and spacing, as to give a totally different envelope or drop of the sound from that of the piano—one which starts down slowly instead of very fast. By combining the use of the two slides many other and different results may be obtained.

As the tones go up the scale higher and higher, one set of slides and the corresponding cylinder ports should be so made as to shorten the life of the tones more and more, just as the piano strings do. In this way, I preserve the exact balance between bass and treble of the piano, so that all existing piano music may be played perfectly. Another set of ports and their corresponding slides may have one size of exhaust ports from the top of the instrument to the bottom. This would make an instrument in which the highest tones could be prolonged as long, if desired, as the lowest tones. This would give the effect of a totally new instrument, a much brighter and more cheerful instrument, since a strong treble always imparts brightness and cheer to the music, and one that would be able to produce many new and meritorious results.

It is a well-known fact that pianists have to exert a great amount of force in order to produce their loudest results. The amount of force is out of all proportion to the effects of power produced on the ear of the listener. This is due to two facts.

First, the amount of power of the aerial vibrations, which is required to affect the ear as a louder volume of sound, increases in a logarithmic ratio to the direct effect produced on the ear.

Second, piano strings respond to weak vibrations more easily than they do to very loud vibrations because the great tension on the strings opposes the louder vibrations, the greater amplitude swing of the string, more in proportion than it does weaker vibrations. It is necessary for me to preserve this exact relation, so that pianists can play on my instrument with ease the first time they sit down to it. This necessitates heavier and heavier blows from the hammers 26a, 26a to produce additional power. Since my moving parts are very light, and move but a short distance, I therefore attach to the movable plates specially designed weights or springs as 10d, 10d, whose resistance to movement, whether to stretching or to compression, increases very rapidly with movement. I thus make the musician work hard, and harder to get his loud, louder and loudest effects, just as he does now on the piano. If he did not have to do so, his dynamic effects would at first be all out of balance, very low and delicate effects would be impossible, and all of his results would be much louder than they ought to be; but by properly proportioning these springs, a very exact balance can be obtained, and the musician can play perfectly easily and naturally the first time he sits down to my instrument.

It is a great weakness in the piano, however, that only very strong hands can produce the loudest results. It is a very great bar, an almost insuperable bar to those with musical souls but weak hands. In my instrument, however, since the moving parts are light and their motion small, the principal resistance is a spring resistance as 10c, or else a weight resistance. Therefore, as the pianist becomes accustomed to the instrument, he can merely by turning a knurled master turnbuckle 11ta, Fig. 3, make the touch lighter and lighter until a woman with a weak hand and a musical soul can produce as loud effects as some great male pianist with powerful forearms and fingers; and all this can be done while still preserving the exact relationship between the strength of the touch and the power of the tone. No tools are required, just finger and thumb.

I also build my instrument in such a way, that the musician can by turning one or two knurled turnbuckles, easily and quickly adjust the stiffness of the sets of springs 10c or 10c' to suit the strength of his hand, stiff for a strong man's hand and very flexible for a delicate woman's hand. By the use of three turnbuckles, I can easily and almost instantly make any adjustment desired in the tension of my springs. The master turnbuckle 11ta, Fig. 3, changes the tension uniformly on both the sets of springs 10c and 10c'. The minor turnbuckle 11t' changes the tension on the set of springs 10c for the piano action, while the other minor turnbuckle 11t'' changes the tension on the set of springs 10c' for playing like the instruments of the orchestra.

My soft or una corda pedal does not cut the tone down by just one step. Instead, it can cut the tone down by a thousand imperceptible changes, since the pedal moves my specially shaped plate of a variable condenser into the condenser more or less, or it may vary a properly designed resistance. It may cut the tone down by infinitesimal shadings from the loudest effects of which the instrument is capable, to the very softest sound that can be heard. This, of course, is a great improvement over the piano's soft or una corda pedal which has just one change of power. It allows the musician to produce all sorts of shadings of power or volume with the pedal as well as with the fingers on the keys. This gives the musician a very vital and valuable micromatic control over the power of his tones. It has many merits, one of which is that it enables a musician, without much technique, to play exceedingly rapid and very delicate or soft passages with as much finish as that of an accomplished artist. These passages are very difficut to play on the piano, since it is hard to put the keys down with very great speed, and at the same time with such delicacy as to have the hammers just touch the strings. On my instrument however, the musician can cut the tone down as far as he wants by the pedal, and put the keys down very fast and hard without any endeavor to control the volume of the tones by his keys. So long as he depresses the keys to the bottom every time, he can soften the sounds to a whisper no matter how hard the keys are struck, and by slight movements of the pedal, he can vary the power and expression of the tones very widely while still putting the keys down hard. He can thus produce difficult kinds of expression very easily. If, on the contrary, it is desired to produce a much louder effect than that of the piano, all that is necessary is to depress the heel of the foot instead of the toe. This will bring in additional amplification, which will make the results much louder than anything the piano can produce; thus I provide for another totally new power in music. Or I may if desired have a special pedal for these extra loud effects.

I produce my sustaining bass or loud pedal as follows:

When the pedal is depressed, the rod 22i shown in Figs. 3, 39 and 40 pulls the upwardly extending arm 22e of a bell crank away from its stop 22g'. When it does so, the forwardly extending arms 22b, 22b, which carry the non-horizontal front bar 22c of the frame 22 are moved down from under the weighted arms 22', 22' of bell cranks whose downwardly extending members 22k, 22k carry notchs or latches on their forward side. These swing against the upwardly extending notched blades 21', 21' of ferrules 21k, 21k on the top of the spring-carrying bars 21i, 21i. They cannot engage, however, until some key is depressed, and its corresponding bar 21i rises under the influence of the spring 21m. As soon as any key or keys are depressed, while the pedal is down, the latch or latches on the downwardly extending arms 22k, 22k of the bell cranks will swing forward slightly and so engage with the corresponding upwardly extending notched blades 21', 21' of ferrules 21k, 21k, and thus they will be held in their upward position, so making contact with the bus bars 21d, 21d of the switchboards. This closes the circuits and brings on the tone or tones, which will be held after the keys have been released, until the pedal is released. Releasing the pedal allows the front bar 22c of the frame 22 to rise and so lift the weighted arms 22', 22' successively, so knocking out the latches 22k, 22k and breaking the circuits beautifully smoothly and without any of the annoying noises of the piano caused by the vibrating strings hitting the felt dampers as they fall upon the rapidly vibrating strings.

I produce my sustaining or loud pedal in the manner just described above. This pedal when moved through a coupler (not shown in the drawings) also moves the bass or sustaining loud pedal with it, so that all the tones up and down the line will be sustained until this pedal is released.

*The playing of my instrument like the instruments of the orchestra or the organ*

By a slight push on the lever 11p, shown in Figs. 3 and 47, the piano keyboard is shoved inward under the push-ups 7, 7. This moves the capstan screws 3b, 3b away from the whips 25, 25, which actuate the piano action. At the same time, the rods 20a, 20a are shoved under the cams 19g, 19g on the arms 19b, 19b of the frame 19. This raises the frame 19 whose wires 19d, 19d open and hold open the large inlet valves 17c, 17c or 17c', 17c' of my tone-controlling cylinders. This leaves the plungers 17a, 17a free to move up and down easily. It also, through the wire 11i, shoves the long arm 11f of the bell crank backwards, so raising the pin 11ff in the short arm of the bell crank. This releases the frame 11.

The spring 11e then lifts the front bar 11a of the frame 11 high enough so that the springs 10c, 10c can slide up and down freely through the same. The wire 11i, when shoved backward, carries the lower end of the lever 11' with it, so throwing the upper end of said lever forward. This, through the wire 11i', pulls the long arm 11f' of the bell crank forward, and raises the pin 11ff' carried in the short arm of the bell crank upwards, so raising the rear bar 11a' of the frame 11' high enough to put tension on the set of springs 11c'.

The orchestral instrument players, or the organists, have ready at hand a wide variety of beautiful musical tone colors, any one of which they can obtain instantly by the act of touching its tablet. They can also by turning one or more dials 33b, change any one of these preset tones into a great variety of other tones, or they can build up any tone color they desire by turning the proper ones of my dials 33b, 33b, to the right numbers to give the necessary harmonic sets the exact amount of power which each should have to create the desired tone. By turning these dials, they can build up a simply endless variety of beautiful tones.

It is a fact, proved by long years of experience with many musicians, that it is far easier to control musical tones delicately by the depression of keys if only the resistance of the keys to depression increases rapidly as the keys are depressed, than it is to control them by the bows of stringed instruments. But this easy and perfect control of the tones can only be obtained where the depression of the keys is opposed by properly designed springs or weights as 10c', 10c', whose resistance to movement increases rapidly with each added increment of motion. But if there is no resistance which increases as the key is depressed, the proper control of the tone is impossible. It is also a well-known fact, that it takes years of practice, and a great amount of skill to play a bowed instrument, such as the violin artistically. The difficulties of playing the violin are tremendous. I will mention only two out of many, many difficulties, and will not go into the intricacies which are only for masters, and of which there are many, but instead will consider only the first two stumbling blocks which every beginner who attempts to play the violin must face whether they master them or not. It is clearly evident that the difficulties of bowing are almost insuperable. I will refer to only one out of many. There are the enormous difficulties of ever changing leverages. When a violinist starts to bow a long tone, the hairs of the bow rest upon the string immediately underneath the thumb, and forefinger. This is a leverage of one to one, but before he finishes the tone, the bow may be resting on the string thirty inches from his thumb and fingers. This is a leverage against the thumb and finger of thirty to one, and so would require thirty times as much pressure from the thumb and finger to keep a uniform volume of tone sounding. How is it possible for anyone to produce a smooth and uniformly loud tone under these conditions without many years of laborious practice? I am informed in fact, that careful experiments made by one of the greatest laboratories in the world, with many of the country's best violinists, have proved it cannot be done.

Since the maintaining of long violin tones at uniform power is of great importance to them in the making of records, they have adopted a very practical solution. They tune a violin and an accordion to the same pitch, and as the violinist plays a long tone, and the tone begins to weaken, due to the increasing leverage against the bow, the accordion comes in softly, and swells louder and louder as the violin tone weakens. The result is that they have the finest violin records I have ever heard. I have forever removed all of these difficulties, since the power of the tone corresponds exactly to the pressure of the finger on the key.

To the difficulties of bowing a tone properly are added the difficulties of stopping the string at precisely the exact lengths necessary to get the pitches of the tones exactly right. A little additional pressure on the finger tips in stopping a string will flatten the flesh of the finger tip unduly, and so broaden the part resting on the string enough to sharpen the pitch slightly, even though the finger may have been placed on the string at precisely the right spot. It is, therefore, necessary not only to stop the string at precisely the right spot, a thing almost impossible to do, but also to use an absolutely uniform amount of pressure each time in stopping. I have therefore also forever removed all difficulties of finding the exact spot on the string, and of exerting just the right amount of pressure by the fingers. Even some great violinists cannot do this, and so do not play in exact pitch. Since the pitch of the tones on my instrument is already absolutely correct, there is nothing to learn and no skill to be acquired on this score. So long as the musician depresses the right key, his pitch is perfect. Since the volume of the sound of my instrument depends upon the depth of depression of the key, and since more pressure is required for each added increment of the depression of the key, it is perfectly evident that almost no skill is required to produce most all the effects of the bow including the crescendo, diminuendo, and vibrato. I thus save the players of bowed instruments years of arduous labor, and I completely eliminate the great difficulties of bowing, and the exceedingly difficult matter of correct stopping to get perfect intonation which many violinists are never able to obtain. On my instrument most of the other great difficulties of violin playing likewise disappear into thin air, and besides the musicians can do many things on my instrument which cannot be done on the violin. The skill required to play on my instrument, with delicate expression, the parts of stringed instruments, is but a mere fraction of that required to play the bowed instruments themselves, as is evident from a comparison of the difficulties of bowing, and stopping above, with the exceeding ease of controlling the tone by a light pressure touch on the key, when the volume of the sound corresponds exactly with the pressure on the key.

Any reasonably good pianist can with a few weeks' practice produce very beautiful violin effects. The same is true of the other bowed instruments. Since the results of the stringed instruments can be so easily obtained on my instrument, it is perfectly easy for a good musician to play string duets, such as the violin, and cello; and an accomplished musician can produce acceptable string quartette effects, though where the expense of two musicians can be afforded, it is better, and they can produce the most beautiful results.

Since the strengths of all the necessary harmonics are under instant and very delicate control on my instrument, it is easily possible to produce not only the tone colors of steel strings, gut strings, bells, drums, etc., and also the tones of the brass, and woodwind instruments as well. By the instantaneous control of the strengths of the various harmonics illustrated in my said Patent No. 2,308,051, and also in this application it is easy for the musician to produce their characteristic sounds and expressions on taking or dropping the tone, etc.

So far as the organist is concerned, he may depress his keys just as usual. But instead of having only organ tones, he will have at his disposal all manner of other tones, which he has never had before, as well as all manner of new tones. He will also have all manner of new powers of expression which no organist has ever had before. He can play just as he does now on the organ, or he can let his keys up slowly, and since the strength of the tone is in exact proportion to the depression of the key, he can by letting his keys up properly, simulate the drop of the piano's tones to a very considerable degree. Or he can, by using the piano action and dash pots, play just like a piano, while using all manner of different tone qualities. He can also, and very easily, simulate the expression of the stringed instruments by his touch, since the crescendo, diminuendo, and vibrato, can easily be produced by varying the pressure exerted upon the keys.

My tone-controlling pedals accomplish far more than the organ's swell pedal. One of my pedals cuts the tones down by a thousand shadings when the toe is depressed. But if the heel is depressed, more amplification is brought in, and the effect can be made much louder than the normal maximum.

Since the response of my instrument is instantaneous, and the taking of the lowest tones is just as fast as that of the highest tones, there is no time lag, and since there is no wheeziness or breathiness anywhere, the shackles have been removed from the hands and souls of the organists who are now free to play the lightest and most airy as well as the heaviest, the fastest as as well as the slowest music.

The various principles or inventions explained in this application, and particularly the use of vacuum tubes as perfect electrical one-way valves to prevent generator interactions and voltage drop, with their very objectionable rubbing or weakening of the tones, as well as absolutely to eliminate diaphragm cracks or key thumps by feeding through the switchboards, only that microscopically small amount of voltage or current necessary to swing the grids of small vacuum tubes and by the use of my shaped condenser plates are equally applicable, in the use of my invention and within the scope thereof, to other electrical musical instruments besides mine. By their use in accordance with my invention, other electrical music instruments can derive the same benefits that I do, and so greatly improve their music.

As a specific example of what I mean, since there is not space to refer to all the different types of instruments, and indeed that is not necessary, I will now show how my inventions, if applied to instruments built under Patent No. 1,956,350, dated April 24, 1934, would greatly improve the music, this statement being in no sense derogatory of the music produced by instruments now manufactured under that patent.

For the purposes stated, I insert one of my vacuum tubes V4 in each of its generator circuits, as shown at V4, V4, in my Fig. 41, between a coil 430 of a generator 424 and its bus bar to which are attached all the voicing impedances 528, 528 which that generator feeds, and I also insert other of my vacuum tubes V5, V5 in the lines leading from its conductor bars 668, 669, 670, 671, 672, 673, 674, 675 and 676, to the different steps of the primary 644 of its transformer 646. Therefore all back leaks or generator interactions and all voltage drop, with their consequent robbing or weakening of the tones are totally eliminated. These changes also absolutely and completely remove all of its diaphragm cracks, or key thumps, and improve its musical results at slight cost. These improvements involve only the small cost of a tube and its socket for every tone in the instrument, plus a tube in the lead to each step in the primary 644 of its transformer, ninety-five tubes and sockets in all.

Alternatively, for the purpose stated, I insert only my tubes V5, V5 in the leads from the conducting bars to the steps of the primary of the transformer, just eight tubes in all, and I thus completely and forever remove the greatest weakness of such instrument (diaphragm crack or key thump) at a most trifling cost, so that such organ or instrument will then be able to play the fastest and liveliest music more beautifully and smoothly than it now plays the slowest, and its slow music will be more beautiful than it is now, since it now has diaphragm crack on the making and breaking of every tone. The transients which make the diaphragm crack are noises that are many times louder than the tones themselves, and therefore the proportion of noise to beautiful tone is very much less on slow music than it is on fast. This is the reason why slow music is so much more satisfying than fast music on instruments which have bad diaphragm crack. This result would follow, since the generators would not have to furnish through the switchboards enough current to magnetize and demagnetize the iron core of its transformer, with its many thousands of turns of wire, but instead would only have to change the voltage of the grid of a small vacuum tube. All improvement can be had at a cost for the tubes and their sockets of probably less than five dollars. No additional model is required with its heavy costs of experimenting, designing and tooling, since the eight vacuum tubes involved can be slipped into the instrument in any place where a little bit of space can be found. Of course, in making these changes, the impedances of the circuits are to be recalculated and made to match the vacuum tubes.

My Fig. 41 is a copy, on a smaller scale, of Figs. 27 and 27a of said patent, both consolidated onto one sheet, with the exception, of course, that I have inserted my tubes V4, V4 between the generators 424 and the high impedances 528 of said patent. Also I have inserted my tubes V5, V5 between its conductor bars 668, 669, 670, 671, 672, 673, 674, 675 and 676, and the steps of the primary 644 of its transformer 646 with only the slight rearrangement in wiring made in order to work in these tubes in the limited space available. The lettering is, of course, copied from the drawings of said patent, with the exception of my tubes V4, V4 and V5, V5, which are new.

The above example illustrates the great improvements my inventions make possible in other electric music instruments to which they are applied.

There are many kinds of electronic tubes on the market. For the sake of convenience and brevity, I have referred in this application only to three electrode vacuum tubes, but I wish it to be distinctly understood that within the scope of my invention I may use any kind or type of tube or any other electrical valve whatever, which will produce the results set forth in the foregoing application.

At points throughout the specification I have used the term "variable condensers" and also the term "multiple plate variable condensers." I have used these two terms interchangeably, and desire it to be understood that the variable condensers need not necessarily be of the multiple plate type.

This application is in part a continuation of my copending application Ser. No. 244,114, filed December 5, 1938, now Patent No. 2,308,051 dated January 12, 1943, particularly with respect to (1) the provision of shielding material for live parts of the instrument, (2) the shaping of the plates in the variable condensers to vary the area of said plates for the purposes set forth herein and in said patent, (3) the tone-controlling cylinders, referred to as dash pots in said application, (4) the vacuum or electronic tubes, and (5) the art or method of producing musical tones from electric currents substantially as claimed in original claim 22 of said application now patented, not disclosed in the prior art, and carried forward into this application, without any dedication to the public by reason of cancellation from said original application now patented.

Having thus described the art or method of my invention and a number of illustrative embodiments of means or mechanism for practicing the same, I desire it to be understood that although specific terms are employed, they are used in a generic and descriptive sense and not for purposes of limitation, and that the scope of my invention is set forth in the following claims.

I claim:

1. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: a set of vacuum tubes respectively receiving current from said generators, and constituting one-way valves and also acting as voltage boosters; a plate circuit extending from each of said vacuum tubes; voicing means and switchboards through which passes plate voltage from said vacuum tubes, and at least one other set of vacuum tubes each having a grid to which such plate voltage respectively passes, and a set of small-sized variable condensers respectively receiving current from said last referred to set of vacuum tubes, such specified combination of elements constituting a construction in and by which there is fed to the voicing means and the switchboards only the infinitesimal amount of current necessary to charge the grids of the last referred to set of vacuum tubes, which latter, by raising the voltage of the generators, permit the use of the said set of small sized variable condensers.

2. A combination according to claim 1, but wherein there is a set of variable condensers serving as harmonic controls to the grids of the first mentioned vacuum tubes, and to which herein specified set of variable condensers passes respectively plate voltage from said first set of vacuum tubes.

3. A combination according to claim 1, but wherein there is a set of multiple-plate variable condensers to whose transferring plates voltage from the first set of vacuum tubes passes and is combined on the pick-up plates of each into a more complex vibration, and wherein there are other similar condensers corresponding to other musical tones of the scale.

4. A combination according to claim 1, but wherein there is a switchboard and voicing means back of the upper manual of the console, and wherein there is another switchboard and voicing means under and toward the front of the lower keyboard.

5. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: piano-action means, and means for playing like the bowed and other orchestral instruments and the organ, tone-controlling cylinders each having at least two sets of exhaust ports which are of different size in one of said sets from those in another set of the same cylinder, said cylinders having inlet openings and said cylinders cooperating with the manual, and means for opening and holding open the large inlet valve openings of said cylinders, when the keyboard is in position for playing, with a pressure touch, like the orchestral instruments or the organ.

6. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has a series of condensers to receive and act upon complex waves produced by the said instrument, and also has means to amplify and to translate such waves into sound, the following elements in combination, viz: a variable plate in each such condenser of the series, piano-action means, and means for playing like the bowed and other orchestral instruments and the organ, and cooperating means under the manual control of the operator while positioned to manipulate the manual and constituting a part of the instrument for changing the tension or resistance to the movement of the said variable plates when playing like the piano, but without changing the tension or resistance on said movable plates while playing with a pressure touch, like the orchestral instruments, said cooperating means including oppositely acting coiled springs connected at all times to said variable condenser plates.

7. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: variable plates in each such condenser, piano-action means, and means for playing like the bowed and other orchestral instruments and the organ, tone-controlling cylinders with inlet valves and exhaust ports and cooperating with the manual, and means in said instrument manipulable by movement of the hand of the player in one direction to move the keyboard into position to play like the piano, to initiate the tones, the tone-controlling cylinders co-acting to end said tones.

8. A combination according to claim 7, but wherein means is provided by which a movement of the player's hand in the opposite direction opens the tone-controlling cylinder inlet valves and moves the keyboard away from the piano-action means and into operative relation with the mechanism for playing like the orchestral instrument or the organ.

9. A combination according to claim 7, but wherein means is provided by which a movement of the player's hand in the opposite direction opens the tone-controlling cylinder inlet valves and moves the keyboard away from the piano-action means and into operative relation with the mechanism for playing like the orchestral instruments or the organ, and wherein means is provided whereby a pressure touch may be used to initiate control and end the tones.

10. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: a variable plate in each such condenser, piano-action means, and means for playing like the bowed and other orchestral instruments and the organ, tone-controlling cylinders cooperating with the manual, each such cylinder having a plurality of sets of exhaust ports, each of which sets of a cylinder has a different spacing and different size of ports from the other set or sets of such cylinder.

11. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: a variable plate in each such condenser, piano-action means, and means for playing like the bowed and other orchestral instruments and the organ, tone-controlling cylinders cooperating with the manual, each such cylinder having a plurality of sets of exhaust ports, each of which sets of a cylinder has a different spacing from the other set or sets of such cylinder.

12. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: a variable plate in each such condenser, piano-action means, and means for playing like the bowed and other orchestral instruments and the organ, tone-controlling cylinders cooperating with the manual, each such cylinder having a series of exhaust ports, a slide valve for said series of ports, and means to operate said slide valve so as to uncover the said ports faster at one part of the cylinder than at another part, thereby producing a drop or ending of the tones which is not logarithmic and therefore is unlike the drop of piano tones.

13. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has variable condensers to receive and act upon complex waves produced by the said instrument, each such condenser having two members, one of which is a movable plate, and also has means to amplify and to translate such waves into sound, the following combination of elements, viz: means for accurately combining harmonics, each of a different strength, into tones instantly, said means consisting of members having steps of varying heights upon their edges, the height of each step controlling the position of the said movable plate of the corresponding one of such condensers, and therefore controlling the power of the harmonic series it represents, and tablet-means at the console controlling the movement of said members.

14. A combination according to claim 13, but wherein means is provided to move more or less the other member of at least one such condenser over the member of such condenser that is controlled by said tablet-means at the console, to change the tone quality.

15. A combination according to claim 13, but wherein a worm and worm wheel, controlled by a dial at the console, are provided to move one member of such variable condenser over the other member thereof by minute amounts, there being one such mechanism for each harmonic set in the instrument.

16. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: each such condenser having a plate of one type constituting one of the movable members thereof and having another shape of plate constituting the other movable member thereof, and gang switches operatively connected to functioning parts of the instrument, the said operative connections being such that when thrown one way said gang switches make contact with all the plates of one type in the movable members of such condensers, and when thrown the other way make contact with another shape of plates in all the movable members of such variable condensers.

17. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has variable condensers to receive and act upon complex waves produced by the said instrument, and also has means to amplify and to translate such waves into sound, the following combination of elements, viz: a series of variable condensers for such purpose, each having at least one member thereof provided with a plate shaped so that as its area enters the condenser it transfers current at a rate such that when translated into sound there is produced upon the human ear the effect of the attack or the drop of any particular tone, the area of each such plate increasing in a quasi-logarithmic ratio with respect to the direct motion of the key.

18. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has variable condensers to receive and act upon complex waves produced by the said instrument, and also has means to amplify and to translate such waves into sound, the following combination of elements, viz: a set of variable condensers for such purpose, each having a plate, all of said plates differing in shape among themselves, for producing different forms of musical attack.

19. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: variable plates in each such condenser, piano-action means, and means for playing like the bowed and other orchestral instruments and the organ, and tone-controlling cylinders cooperating with the manual, each cylinder having a series of exhaust ports spirally arranged, with the top of each port above the bottom of the port next above it.

20. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: tone-ending means for breaking the circuits successively and very rapidly of all tones sounding when the loud or damper pedal is released, said means including a pedal-operated tone-ending member having a working edge at a slight angle to the horizontal, while the working surfaces of the other members of the tone-ending means are in a horizontal line.

21. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: variable plates in each such condenser, piano-action means, and means for playing like the bowed or other orchestral instruments and the organ, tone-controlling cylinders cooperating with the manual, said cylinders having inlet openings of different sizes, valves therefor, and means for opening the large inlet openings of all said cylinders when the loud or damper pedal starts to rise, so that the tones will be ended rapidly and smoothly, said means including a magnet in a circuit controlled by said pedal, a side circuit having two pairs of contact points, one or the other of which is open while the said pedal is going down, and while it is held down, but both of which pairs of contacts are closed, thereby energizing the magnet when the pedal starts to rise.

22. A combination according to claim 21, but in which there is a magnet-operated-inlet-port-opening strip, and a set of holding magnets to hold one of the pair of contacts closed while the pedal is rising, said magnets being in series with each other and being in a circuit having two pairs of contact points, one or the other pair of contacts being always open while the pedal is going down and while it is at the bottom, both pairs of contacts being closed as soon as the pedal starts to rise, and the holding magnets holding closed, until the pedal has nearly reached the top, that pair of contacts which were closed just before the pedal reached the bottom, the circuit being then broken at the other pair of contacts.

23. For use in an electric musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument and also has means to amplify and to translate such waves into sound, the following elements in combination, viz: twelve such generators of electrical vibrations, the frequencies corresponding to the twelve half tones of the octave, one such generator producing the frequency representing C, the next generator producing the frequency representing C sharp, the next generator producing the frequency representing D, and so on for the other nine half tones of the octave; a series of tubes and impedances in series fed by each generator, arranged and tuned so that each tube and impedance unit will multiply the speed of the generator frequencies so as to bring out a particular harmonic as $2n$, $3n$, $4n$, $5n$, etc., thereby to produce from each generator all the desired octaves of that tone and all the harmonics of that tone, for use where tone-building is desired, and whereby the tuning is kept perfect because of the gearing of the said generators, and because the tubes are in perfect tune with the generators, since they merely amplify the harmonics of the generators or generator controlled tubes.

24. For use in an electrical musical instrument producing musical tones from a set of sources of electrical vibrations, which instrument has a manual brought into circuit with such set of sources of electrical vibrations, the keys of which manual control through circuits the output from such set of sources of electrical vibrations, and which instrument has high resistance means to limit the current flow from such set of sources of electrical vibrations, has variable condensers to receive and act upon complex waves produced by the said instrument and also has means to amplify and translate such waves into sound, the following elements, viz: at least three sets of vacuum tubes, the first of which sets receives voltage from said set of sources of electrical vibrations and acts as one-way valves and voltage boosters, voicing means and a switchboard to which voltage is fed from said first set of vacuum tubes, said switchboard having bus-bars on each of which all the vibrations of a single harmonic of each key that is depressed are first combined and which bus-bars feed the grids of said second set of vacuum tubes acting as voltage boosters, and also acting as one-way valves to prevent any interactions between the combining bus bars of the switchboard, variable condensers fed from the plates of said second set of vacuum tubes and each of which condensers controls the power of a specific set of harmonics and acts to feed a grid in one of said third set of vacuum tubes on the plates whereof said harmonics are recombined into a resultant wave, and key-controlled variable condensers and an amplifier to which the current is passed from said third set of vacuum tubes.

25. For use in an electrical musical instrument producing musical tones from a multiplicity of alternating current generators, which instrument has a manual brought into circuit with such generators, the keys of which manual control through circuits the output from such generators, and which instrument has high resistance means to limit the current flow from such generators, has one or more condensers to receive and act upon complex waves produced by the said instrument, and also has means to amplify and to translate such waves into sound, the following elements in combination, viz: piano-action means, and means for playing like the bowed and other orchestral instruments and the organ, tone-controlling cylinders each having at least two sets of exhaust ports, the ports of one such set being differently spaced from the ports of another such set in the same cylinder, said cylinders cooperating with the manual, and said cylinders each having an inlet valve at the bottom portion thereof.

26. For use in an electrical musical instrument producing musical tones from a multiplicity of alternating current generators, which instrument has voicing coils, switchboards, amplifiers, pedals, and a loud speaker, the following elements, in combination, viz: a set of vacuum tubes respectively receiving current from said generators and constituting one-way valves and also acting as voltage boosters; harmonic variable condensers controlling the power of the sets of harmonics; multiple-grid vacuum tubes for combining the harmonics into a tone and key-controlled variable condensers.

27. In combination, in an electrical musical instrument, a set of generator sources of musical electrical vibrations, a set of vacuum tubes, the grids whereof are respectively fed from said set of generator sources, said vacuum tubes constituting one-way valves and also acting as voltage boosters, a plate circuit extending from each of said vacuum tubes, voicing means and switchboards through which pass plate voltage from said vacuum tubes, whereby there is fed through the voicing means and the switchboards only the infinitesimal amount of voltage necessary to charge the grids of the said set of vacuum tubes, and whereby the second amplification raises the voltage of the generators to a point permitting variable condensers of a relatively small size to be used in the harmonic controls, together with and including such variable condensers, the plates of said vacuum tubes feeding the plates of said harmonic controls whose output feeds the grids of multiple-grid combining vacuum tubes on whose plates they are all combined into more complex waves to be fed to small key-controlled variable condensers, together with and including such mutiple-grid combining vacuum tubes and such small key-controlled variable condensers.

28. An electrical musical instrument in accordance with claim 24, but wherein there are provided multi-plate combining, voicing and controlling condensers acting as switchboards, whereby the current will go from the generators through the first set of vacuum tubes, directly to the small voicing and transferring plates, to the large combining variable plates, and thence to the other sets of vacuum tubes or to the combining transformers or to the combining variable condensers.

ARTHUR T. CAHILL.

REFERENCES CITED

The following references are of record in the file of this patent:

UNITED STATES PATENTS

| Number | Name | Date |
|---|---|---|
| 9,559 | Piffaut | Jan. 25, 1853 |
| 1,448,533 | Harris | Mar. 13, 1923 |
| 1,993,395 | Beers | Mar. 5, 1935 |
| 2,001,708 | Curtis | May 31, 1935 |
| 2,055,719 | Fisher | Sept. 29, 1936 |
| 2,215,709 | Miessner | Sept. 24, 1940 |
| 2,216,513 | Hammond | Oct. 1, 1940 |
| 2,224,729 | Hammond | Dec. 10, 1940 |
| 2,229,759 | Mohler | Jan. 28, 1941 |
| 2,241,933 | Roberts | May 13, 1941 |
| 2,245,337 | Hammond | June 10, 1941 |
| 2,250,066 | Manatt | July 22, 1941 |
| 2,266,030 | Hammond | Dec. 16, 1941 |
| 2,296,125 | Troub | Sept. 15, 1942 |
| 2,302,457 | Midgeley et al. | Nov. 17, 1942 |
| 2,308,051 | Cahill | Jan. 12, 1943 |
| 2,314,496 | Hammond | Mar. 23, 1943 |